United States Patent
Jungnickel et al.

(10) Patent No.: US 11,324,038 B2
(45) Date of Patent: May 3, 2022

(54) COMMUNICATION TECHNIQUES

(71) Applicant: Fraunhofer-Gesellschaft zur Foerderung der angewandten Forschung e.V., Munich (DE)

(72) Inventors: Volker Jungnickel, Berlin (DE); Kai Lennert Bober, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/197,898

(22) Filed: Mar. 10, 2021

(65) Prior Publication Data
US 2021/0195632 A1    Jun. 24, 2021

Related U.S. Application Data

(63) Continuation of application No. PCT/EP2019/074147, filed on Sep. 10, 2019.

(30) Foreign Application Priority Data

Sep. 10, 2018 (EP) .................................. 18193567
Nov. 14, 2018 (EP) .................................. 18206353
Mar. 11, 2019 (EP) .................................. 19162055

(51) Int. Cl.
*H04W 74/00* (2009.01)
*H04B 10/11* (2013.01)
(Continued)

(52) U.S. Cl.
CPC .......... *H04W 74/008* (2013.01); *H04B 10/11* (2013.01); *H04B 10/25* (2013.01);
(Continued)

(58) Field of Classification Search
CPC .... H04W 74/008; H04W 74/02; H04B 10/11; H04B 10/25; H04B 10/116; H04L 5/0048; H04L 7/0075
(Continued)

(56) References Cited

U.S. PATENT DOCUMENTS 6,006,271 A * 12/1999 Grabiec ................ H04L 12/413
  370/229
9,992,772 B2   6/2018 Liu et al.
(Continued)

FOREIGN PATENT DOCUMENTS

| WO | 2011034383 A2 | 3/2011 |
| WO | 2017156748 A1 | 9/2017 |
| WO | 2018078323 A1 | 5/2018 |

OTHER PUBLICATIONS

Chong, Han, et al., "IEEE P802.15 Working Group for Wireless Personal Area Networks (WPANs)", Text proposal for LB OFDM PHY.
(Continued)

Primary Examiner — Dalzid E Singh
(74) Attorney, Agent, or Firm — Perkins Coie LLP; Michael A. Glenn

(57) ABSTRACT

Techniques (e.g., method, apparatuses, etc.) for permitting communications, e.g., optical communications are described.
In one example, a first communication apparatus for the communication with a second communication device may obtain a channel state information from the reception of one or more reference signals and/or beacon signals from one or more frontends of the second apparatus. The first communication apparatus may transform the channel state information from a frequency domain to a time domain, to obtain a time domain channel state information. The first communication apparatus may encode the time domain channel
(Continued)

state information. The first communication apparatus may transmit the time domain channel state information to one or more frontends. The first communication apparatus may transmit channel information for association and updated channel information for network coordination in a contention access period and collision-free period, CFP, respectively.

19 Claims, 40 Drawing Sheets

(51) Int. Cl.
*H04B 10/25* (2013.01)
*H04L 5/00* (2006.01)
*H04L 7/00* (2006.01)
*H04W 74/02* (2009.01)

(52) U.S. Cl.
CPC .......... *H04L 5/0048* (2013.01); *H04L 7/0075* (2013.01); *H04W 74/02* (2013.01)

(58) Field of Classification Search
USPC ........................................................ 398/118
See application file for complete search history.

(56) References Cited

U.S. PATENT DOCUMENTS

| | | | | |
|---|---|---|---|---|
| 2007/0058665 A1* | 3/2007 | Ho | ........................ | H04W 74/02 370/447 |
| 2008/0171550 A1* | 7/2008 | Zhao | ..................... | H04W 74/02 455/445 |
| 2013/0216233 A1* | 8/2013 | Kim | ..................... | H04B 10/116 398/103 |
| 2016/0278088 A1* | 9/2016 | Cheng | ................... | H04W 28/18 |
| 2017/0331552 A1* | 11/2017 | Castor | .................. | H05B 47/195 |

OTHER PUBLICATIONS

Cosart, Lee, "Precision Packet Delay Measurements Using IEEE 1588v2", IEEE Int. Symp. on Precision Clock Synchronization for Measurement, Control and Communication, (20070000), XP031161283, pp. 85-91.

Jungnickel, Volker, "IEEE P802.15 Working Group for Wireless Personal Area Networks (WPANs)", Text proposal for High Bandwidth PHY.

Jungnickel, Volker, et al., "IEEE P802.15, Wireless Personal Area Networks", Text proposal for Pulsed Modulation PHY.

Scheiterer, Ruxandra Lupas, et al., "Synchronization Performance of the Precision Time Protocol in the Face of Slave Clock Frequency Drift", 4th IEEE Conference on Automation Science and Engineering, Key Bridge Marriott, Washington DC, USA, Aug. 23-26, 2008, Aug. 2008.

Schulz, Lars, et al., "Adaptive Feedback Compression for Joint Transmission Coordinated Multi-Point", 2013 IEEE 77th Vehicular Technology Conference (VTC Spring), Dresden.

Serafimovski, Nikola, "IEEE P802.15 Wireless Specialty Networks", IEEE 802.15.13, Text input for non-beacon-enabled MAC.

Wang, Zhong, et al., "Full-duplex MAC protocol based on adaptive contention window for visible light communication", Journal of Optical Communications Ano Networking, Institute of Electrical and Electronics Engineers, US, vol. 7, No. 3, Mar. 1, 2015 (Mar. 1, 2015), XP011575957, ISSN: 1943-0620, 001: 10.1364/JOCN.7.000164, [retrieved on Mar. 18, 2015], pp. 164-171.

P802.15.13™/D4, Draft Standard for Multi-Gigabit per Second Optical Wireless Communications (OWC), with Ranges up to 200 Meters, for both Stationary and Mobile Devices, Oct. 2020.

* cited by examiner basic star topology distributed MIMO star topology unidirectional star topology coordinated star topology architecture and interfaces
of the IEEE 802.15.13 standard request, confirm and indication
primitives of a SAP the MAC transmit process the MAC receive process superframe structure including exemplary number of superframe slots flow chart of an association request in the CAP flow chart of a GTS request in the CAP timing relative to the beacon frame
reception at every device application of the guard time and TAIFS
between adjacent GTSs association procedure message exchange Fig. 38 disassociation initiated by the device (a) and the coordinator (b)

aggregation and fragmentation reassembly and disaggregation fields and elements in the MAC frame MAC frame or element representation example width specefecation example

Fig. 44

| octets: 2 | | |
|---|---|---|
| frame control | type dependent MAC header | subtype-specific payload | FCS |

MAC frame header (MHR)

general MAC frame format/MPDU structure

Fig. 45

| octets: 2 | 0/3 | 2/6 | 2/6 | 0/2/6 | 0/2 | 0/6 | variable | variable | 4 |
|---|---|---|---|---|---|---|---|---|---|
| frame control | ACK information | receiver address | transmitter address | auxiliary address 1 | sequence control | auxiliary address 2 | auxiliary security header | MSDU/ A-MSDU payload | FCS |

MAC frame header (MHR)

data frame structure

Fig. 46

| octets: 2 | 0/3 | 2/6 | 2/6 | 0/2 | variable | 4 |
|---|---|---|---|---|---|---|
| frame control | ACK information | receiver address | transmitter address | sequence control | management information payload | FCS |

MAC frame header (MHR)

management frame structure

| octets: 2 | 2/6 | 2/6 | variable | 4 |
|---|---|---|---|---|
| frame control | receiver address | transmitter address | control information | FCS |
| MAC frame header (MHR) | | | payload | |

Fig. 47

| bits: 0-1 | 2-3 | 4-7 | 8 | 9 | 10 | 11 | 12 | 13 | 14 | 15 |
|---|---|---|---|---|---|---|---|---|---|---|
| frame version | type | subtype | to backhaul | from backhaul | security enabled | ACK request | ACK info | short addressing | more fragments | reserved | frame control element

Fig. 48

| bits: 0-3 | 4-15 |
|---|---|
| fragment number | sequence number | sequence control element

Fig. 49

| octets: 6 | variable | | 2 | 1 | |
|---|---|---|---|---|---|
| device MAC address | capability list | listen interval | OWPAN ID | supported rattes | extended supported rattes | association request element

Fig. 50

| octets: 6 | 1 | variable | 2 | 2 | variable | 1 | ? |
|---|---|---|---|---|---|---|---|
| device MAC address | status code | capability list | OWPAN ID | short address | authenti-cation information | supported rattes | extended supported rattes | association response element

Fig. 51

| octets: 1 | 2 | 2 |
|---|---|---|
| reason code | OWPAN ID | device short address | disassociation notification element

Fig. 52

| octets: 1 | 2 | 1 | 0/128 |
|---|---|---|---|
| authentication algorithm | authentication transaction token | status code | challenge | authentication request element

Fig. 53

| octets: 2 | 2 | 1 | 1 | 1 |
|---|---|---|---|---|
| superframe number | total superframe slots | superframe slot duration | CAP slot width | CAP slot | superframe descriptor element

Fig. 54

| <= 32 octets | 2 octets | 6 octets | 1 |
|---|---|---|---|
| OWPAN name | OWPAN ID | coordinator address | security type |

OWPAN descriptor element

Fig. 55

| 1 octet | 0-255 octets |
|---|---|
| bitmap width | capability bitmap | capability list element

Fig. 56

| bits: 0-7 | 8 | 9 | 10 | 11-15 | variable | variable | | |
|---|---|---|---|---|---|---|---|---|
| GTS descriptor count | validity present | devise address present | directions present | reserved | GTS directions | GTS descriptor N | ... | GTS descriptor N |

GTS descriptor list element

Fig. 57

| 2 octets | 2 octets |
|---|---|
| GTS start slot | GTS length |

GTS descriptor element

Fig. 58

| bits: 0-3 | 4-7 | variable | | |
|---|---|---|---|---|
| number of OFFs (N) | TAP format | OFE feedback descriptor element 1 | ... | OFE feedback descriptor element N | multi-OFE feedback element

Fig. 59

| bits: 0-2 | 4-7 | 8-15 | variable | | |
|---|---|---|---|---|---|
| pilot symbol number | division | number of Taps (N) | Tap descriptor 1 | ... | Tap descriptor N |

OFE feedback descriptor element

Fig. 60

| variable | variable |
|---|---|
| strength | delay |

Tap descriptor element

Fig. 61

| 2 octets | 1 | 4 bits | 11 bits | variable | 4 octets |
|---|---|---|---|---|---|
| MSDU length | ACK request | reserved | MSDU sequence number | MSDU | MSDU FCS |

MSDU aggregation element

Fig. 62

| bits 0-15 | bits 16-27 | bits 28-31 |
|---|---|---|
| device short address | sequence number | reserved |

ACK information element

Fig. 63

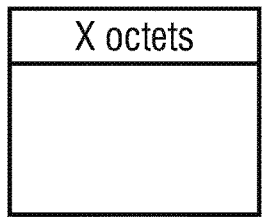
block ACK request element
Fig. 64
| 5 bits | 11 bits | 1-31 octets |
|---|---|---|
| bitmap width | first sequence number | ACK bitmap |
block ACK element
Fig. 65
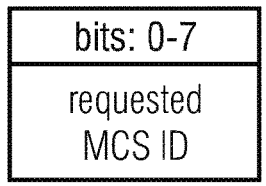
MCS request element
Fig. 66
| bits: 0-23 | 24-28 | 29-31 | 32-34 | 35-39 | variable | | |
|---|---|---|---|---|---|---|---|
| valid BAT bitmap | updated BAT | FEC block size | FEC code rate | reserved | BAT group 1 | ... | BAT group N |
BAT request element
Fig. 67

| bits: 0-3 | 4-7 |
|---|---|
| grouping | loaded bits |

BAT group element

Fig. 68

| X octets |
|---|
| XXX | queue state element

Fig. 69

| 1 octet |
|---|
| HCM mask |

HCM allocation element

Fig. 70

| 1 octet | 1 bit | 1 bit | 1 bit | 5 bits | 0/2 octets | 0/2 octets |
|---|---|---|---|---|---|---|
| signal power | decodable | same MAC mode | OWPAN ID clash | reserved | foreign OWPAN ID | foreign device address | alien signal element

Fig. 71

| 1 octet | variable |
|---|---|
| PHY ID | PHY rates element | supported MCS element

Fig. 72

| |
|---|
| |

OFE selection element

Fig. 73

| 8 octets | 6 | 8 | 1 |
|---|---|---|---|
| timestamp | OWPAN ID | switching time | new waveform | waveform control element

Fig. 74

| 1 bit | 4 | 1 | 4 | 1 | 4 |
|---|---|---|---|---|---|
| adaptive loading | eU | RPO | relaying | MIMO | MIMO channel number | advanced modulation control element

Fig. 75

| 8 octets | 2 | 2 | 6 | variable | variable | variable |
|---|---|---|---|---|---|---|
| timestamp | random access interval | capability information | OWPAN ID | supported rates | country | extended supported rates | random access element

Fig. 76

| 1-32 octets | variable |
|---|---|
| attribute ID | new value | attribute change request element
Fig. 77

| 2 octets | variable | 1 octet |
|---|---|---|
| attribute ID | new value | status | attribute change response element
Fig. 78

| bits: 0- | 1 | 2-7 | variable ||||
|---|---|---|---|---|---|---|
| element count | size prefix | reserved | type 1 | contained element 1 | type N | contained element N | variable element container element
Fig. 79

COMMUNICATION TECHNIQUES

CROSS-REFERENCE TO RELATED APPLICATIONS

This application is a continuation of copending International Application No. PCT/EP2019/074147, filed Sep. 10, 2019, which is incorporated herein by reference in its entirety, and additionally claims priority from European Application No. 18193567.7, filed Sep. 10, 2018, from European Application No. 18206353.7, filed Nov. 14, 2018, and from European Application No. 19162055.8, filed Mar. 11, 2019, all of which are incorporated herein by reference in their entirety.

TECHNICAL FIELD

Hereinbelow, techniques are disclosed for the communication between at least one first apparatus and at least one second apparatus. For example, a second apparatus may be an arrangement (e.g., with wireless frontends, e.g. optical frontends), and the at least one first apparatus may be one or more devices (e.g., wireless devices, e.g. optical devices). In some examples, the arrangement (or the second apparatus) is fixed (at least in one frontend(s)) and the and one or more first devices may be mobile. Techniques for bitloading are also discussed. Techniques for medium access (MAC) are also discussed. Multiple-input/multiple-output, MIMO, techniques are here discussed.

BACKGROUND OF THE INVENTION

Wireless communications (e.g., visible light communications, VLCs and other communications, e.g. radio frequency, RF, communications, ultrasound communications, etc.) are known, e.g., between an arrangement (e.g. with fixed relays or frontends) and one or multiple devices (e.g., mobile devices).

Low reliability may impair these communications, e.g., by virtue of the modification of the communication channel and/or the movement of the devices. Hence, techniques for increasing reliability are in general requested.

In some cases, it may be difficult to define bitloading. For example, it may be difficult to define the frequencies (e.g., subcarriers) at which each frontend (e.g., relay) and each device (e.g., mobile device) will transmit. Hence, techniques for enhancing the communications are in general requested.

SUMMARY

An embodiment may have a first communication apparatus for the communication with a second communication device, configured to:
obtain a channel state information from the reception of one or more reference signals and/or beacon signals from one or more frontends of the second apparatus;
transform the channel state information from a frequency domain to a time domain, to obtain a time domain channel state information;
encode the time domain channel state information; and
transmit the time domain channel state information to one or more frontends, wherein the first communication apparatus is configured to transmit channel information for association and updated channel information for network coordination in a contention access period and collision-free period, CFP, respectively.

Another embodiment may have a second communication apparatus, coordinated by a coordinator connected to frontends,
wherein the second communication apparatus is configured to send one or more reference signals and/or beacon signals from one or more frontends;
wherein the second communication apparatus is configured to receive the channel information,
wherein the second communication apparatus is configured to receive channel information for association and updated channel information for network coordination in a contention access period and collision-free period, CFP, respectively.

According to another embodiment, a method for the communication between a first communication apparatus and a second communication apparatus may have the steps of:
from the second communication apparatus, sending one or more reference signals and/or beacon signals from one or more frontends;
at the first communication apparatus, receiving the one or more reference signals and/or beacon signals from the one or more frontends;
at the first communication apparatus, determining a channel information on the basis of the reception of the one or more reference signals and/or beacon signals;
from the first communication apparatus, transmitting the channel information;
at the second communication apparatus, receiving channel information for association and updated channel information for network coordination in a contention access period and collision-free period, CFP, respectively.

In accordance to examples, there is disclosed a first communication apparatus, configured to receive one or more reference signals and/or beacon signals from one or more frontends (e.g., optical frontends);
wherein the first communication apparatus is configured to determine a channel information on the basis of the reception of the one or more reference signals and/or beacon signals;
wherein the first communication apparatus is configured to transmit the channel information in a contention access period, CAP.

In accordance to examples, there is disclosed a communication method, including
at an first communication apparatus, receiving one or more reference signals and/or beacon signals from one or more frontends (e.g., optical frontends);
at the first communication apparatus, determining a channel on the basis of the reception of the one or more reference signals and/or beacon signals;
from the first communication apparatus, transmitting the channel information in a contention access period, CAP.

In accordance to examples, there is disclosed a second communication apparatus, coordinated by a coordinator connected to frontends,
wherein the second communication apparatus is configured to send one or more reference signals and/or beacon signals from one or more frontends (e.g. optical frontends);
wherein the second communication apparatus is configured to receive the channel information in a contention access period, CAP.

In accordance to examples, there is disclosed a communication method comprising:
- sending one or more reference signals and/or beacon signals from one or more frontends (e.g., optical frontends); and
- receiving the channel information in a contention access period, CAP.

In accordance to examples, there is disclosed a central unit, configured to:
- perform an initial, coarse synchronization among a plurality of frontends;
- command a transmission of a reference signal and/or a beacon signal to the plurality of distributed frontends;
- obtain a channel information measured by a first communication apparatus; and
- subsequently, perform a second, fine synchronization on the basis of the channel information, by synchronizing the frontends.

In accordance to examples, there is disclosed a second communication apparatus for transmitting and/or receiving through a plurality of frontends, configured to:
- perform an initial, coarse synchronization among a plurality of frontends;
- transmit a reference signal and/or a beacon signal through the frontends to one or more first apparatuses;
- obtain a channel information measured by the first communication apparatuses; and
- on the basis of the channel information, synchronize the frontends using a second, fine synchronization.

In accordance to examples, there is disclosed a second communication apparatus for transmitting and/or receiving through a plurality of frontends, configured to:
- perform an initial, coarse synchronization among a plurality of frontends;
- transmit a reference signal and/or a beacon signal through the frontends to one or more first communication apparatuses;
- obtain a channel information measured by the first communication apparatuses; and
- on the basis of the channel information, synchronize the frontends using a second, fine synchronization.

In accordance to examples, there is disclosed a method including:
- perform an initial, coarse synchronization among a plurality of frontends;
- commanding a transmission of a reference signal and/or a beacon signal to the plurality of frontends (e.g., optical frontends);
- obtaining a channel information measured by a first communication apparatus on the basis of the reference signal and/or a beacon signal; and
- on the basis of the channel information, synchronizing the frontends.

In accordance to examples, there is disclosed a communication method for transmitting and/or receiving data through a plurality of frontends (e.g., optical frontends), the method including:
- performing an initial, coarse synchronization among a plurality of frontends;
- transmitting a reference signal and/or a beacon signal through the frontends to one or more first communication apparatuses;
- obtaining a channel information measured by the first communication apparatus;
- on the basis of the channel information, synchronizing the frontends.

In accordance to examples, there is disclosed a first communication apparatus for the communication with a second communication apparatus, configured to:
- obtain a channel state information from the reception of one or more reference signals and/or beacon signals from one or more frontends;
- transform the channel state information from a frequency domain to a time domain, to obtain a time domain channel state information;
- encode the time domain channel state information; and
- transmit the time domain channel state information to one or more frontends.

In accordance to examples, there is disclosed a second communication apparatus for the communication with a first communication apparatus, configured to:
- receive a CSI encoded so as to comprise:
  - a string of second values and first values, each being associated to a time domain representation of the CSI;
  - for each second value in the string, an encoded value of the amplitude of the time domain representation at the particular sample;
  - for each first value in the string, no sample value being encoded and being considered as 0; and
- reconstruct the CSI on the basis of the sample values associated to the second values.

In accordance to examples, there is disclosed a communication method for the communication of a first communication apparatus with a second communication apparatus, including:
- Obtaining a channel state information from the reception of one or more reference signals and/or beacon signals from one or more frontends;
- Transforming the channel state information from a frequency domain to a time domain, to obtain a time domain channel state information;
- Encoding the time domain channel state information; and
- Transmitting the time domain channel state information to one or more frontends.

In accordance to examples, there is disclosed a communication method for the communication between a second communication apparatus and a first communication apparatus, comprising:
- Receiving a CSI encoded so as to comprise:
  - A string of second values and first values, each being associated to a time domain representation of the CSI;
  - For each second value in the string, an encoded value of the amplitude of the time domain representation at the particular sample;
  - For each first value, no sample value being encoded and being considered as 0;
- Reconstructing the CSI on the basis of the sample values associated to the second values.

In accordance to examples, there is disclosed a first apparatus configured to:
- receive a plurality of reference signals from a plurality of frontends;
- obtain a channel state information, CSI, based on an evaluation of the received reference signals,
- encode the CSI, in order to provide an encoded CSI; and
- provide information describing a selection of an encoding resolution used for encoding the CSI, out of a plurality of possible encoding resolutions.

In accordance to examples, there is disclosed a method [e.g., performed by a first communication apparatus, such as a transmitter, mobile device, an optical transmitter, e.g., such as one as any of the above or below examples] including:
  receiving a plurality of reference signals from a plurality of [e.g. optical] frontends [e.g., OFEs];
  obtaining a channel state information, CSI, based on an evaluation of the received reference signals,
  encoding the CSI, in order to provide an encoded CSI; and
  providing [e.g. signal] information [e.g. TAP format] describing a selection of an encoding resolution used for encoding the CSI, out of a plurality of possible encoding resolutions.

In accordance to examples, there is disclosed a second communication apparatus configured to:
  receive an encoded channel state information, CSI;
  receive an information describing a selection of an encoding resolution used for encoding the CSI, out of a plurality of possible encoding resolutions;
  decode the encoded CSI in dependence on the information describing a selection of an encoding resolution used for encoding the CSI.

In accordance to examples, there is disclosed a system comprising a device according to any of the above or below examples and a device according to any of the above or below examples.

In accordance to examples, there is disclosed a method [e.g., performed by a first communication apparatus, such a as a receiver, device, optical receiver, and/or a device according to any of the above or below examples], comprising:
  receiving an encoded channel state information, CSI;
  receiving a [e.g. signal] information [e.g. TAP format] describing a selection of an encoding resolution used for encoding the CSI, out of a plurality of possible encoding resolutions;
  decoding the encoded CSI in dependence on the information [e.g. TAP format] describing a selection of an encoding resolution used for encoding the CSI.

In accordance to examples, the first communication apparatus and/or the second communication apparatus may be a device for performing optical communications.

In accordance to examples, the first communication apparatus and/or the second communication apparatus may be a device for performing a communication through visible light communication, VLC.

In accordance to examples, the first communication apparatus and/or the second communication apparatus may be a movable device.

In accordance to examples, the first communication apparatus and/or the second communication apparatus may be at least partially a fixed device (e.g., at least one frontend may be fixed).

In accordance to examples, the first communication device and/or the second communication apparatus may include a plurality of optical frontends.

In accordance to examples, the first communication apparatus and/or the second communication apparatus may include a fronthaul between a coordinator and/or a plurality of frontends.

In accordance to examples, the second communication apparatus may have a star topology.

In accordance to examples, different frontends may be configured to relay DL transmissions from a coordinator to external first apparatuses ad/or to relay UL transmissions from external first apparatuses to the coordinator.

In accordance to examples, different frontends may be configured to simultaneously relay at least one DL transmission using different orthogonal sequences.

In accordance to examples, different frontends configured may be to relay UL received transmissions towards a coordinator.

In accordance to examples, there is disclosed a first communication apparatus for communicating with a second communication apparatus, the first communication apparatus being to send a bit allocation table, BAT, message, the BAT message including at least one of:
  validity information signalling which one or more BATs out of a plurality of BATs is valid and/or
  updated BAT information signalling which BAT out of a plurality of BATs is to be updated,
  the first communication apparatus being to:
  expect a confirmation, the confirmation being derived from usage of the bit allocation according to the at least one of the updated BAT as provided by the updated BAT information and a valid BAT as provided by the validity information; and
  in case of non-reception of a valid confirmation from the second communication apparatus, resend the BAT message.

In accordance to examples, there is disclosed a first communication apparatus for communicating with a second communication apparatus, the first communication apparatus being to send a bit allocation table, BAT, message,
  wherein the BAT update information includes a BAT update information signalling update information for updating a BAT which is signalled to be updated,
  wherein the BAT update information is variable in length.

In accordance to examples, there is disclosed a second communication apparatus for communicating with a first communication apparatus, configured to receive, from the first communication apparatus, a bit allocation table, BAT, message comprising at least one of:
  validity information signaling which one or more BATs out of a plurality of BATs is valid;
  updated BAT information signalling which BAT out of a plurality of BATs is to be updated,
  the second communication apparatus being to:
  send a confirmation, the confirmation being derived from usage of the bit allocation according to at least one of the updated BAT as provided by the updated BAT information and a valid BAT as provided by the validity information.

In accordance to examples, there is disclosed a second communication apparatus for communicating with a first communication apparatus, the second communication apparatus being to receive a bit allocation table, BAT, message,
  wherein the BAT update information includes a BAT update information signalling update information for updating a BAT which is signalled to be updated,
  wherein the BAT update information is variable in length.

In accordance to examples, there is disclosed a method for the communication between a communication device and a communication arrangement, the method including sending a bit allocation table, BAT, message comprising:
  validity information signalling which one or more BATs out of a plurality of BATs is valid;
  updated BAT information signalling which BAT out of the plurality of BATs is to be updated; BAT update information signalling update information for updating the BAT which is signalled to be updated.

In accordance to examples, there is disclosed a method for the communication between a second communication apparatus and a first communication apparatus, the method including sending a bit allocation table, BAT, message comprising at least one of:

updated BAT information signalling which BAT out of a plurality of BATs is to be updated, and validity information signalling which one or more BATs out of a plurality of BATs is valid, the method further comprising:

sending, from the communication arrangement to the communication device, a confirmation, the confirmation being derived from usage of the bit allocation according to at least one of the updated BAT and a valid BAT; and in case of the communication device non-receiving a valid confirmation from the communication arrangement, resending the BAT message from the communication device to the communication arrangement.

In accordance to examples, there is disclosed a method for communicating between a first communication apparatus and a second communication apparatus, the method including sending from the first communication apparatus a bit allocation table, BAT, message, wherein the BAT update information includes a BAT update information signalling update information for updating a BAT which is signalled to be updated, wherein the BAT update information is variable in length.

In accordance to examples, there is disclosed a non-transitory storage unit storing information which, when executed by a processor, causes the processor to perform a method according to any of the above or below examples.

In accordance to examples, there is disclosed a system comprising a communication arrangement according to any of the above or below examples and a communication device according to any of the above or below examples.

BRIEF DESCRIPTION OF THE DRAWINGS

Embodiments of the present invention will be detailed subsequently referring to the appended drawings, in which:

FIGS. 41-79 show examples of frames.

DETAILED DESCRIPTION OF THE INVENTION

EXAMPLES

Figure 1:
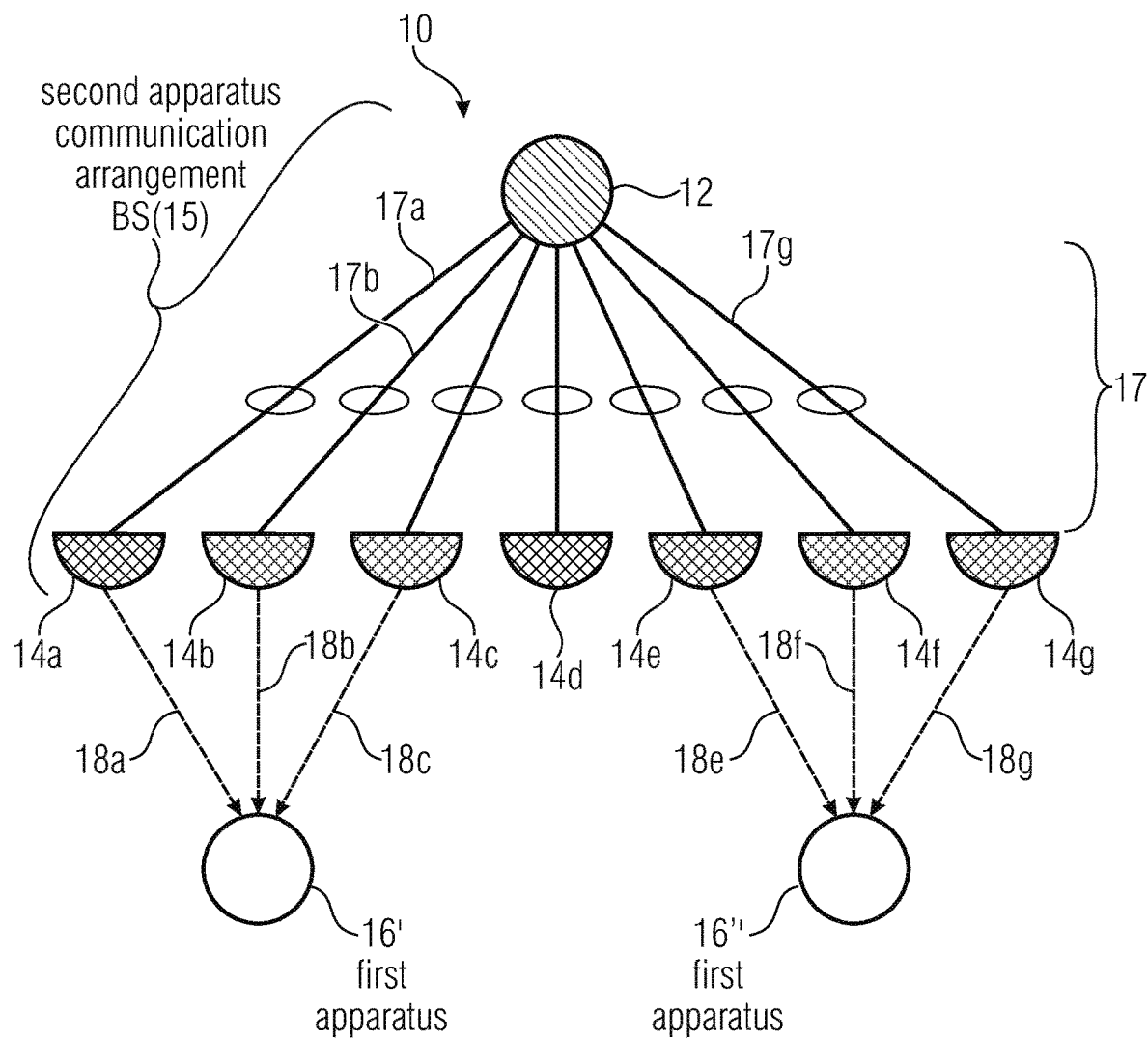
FIGS. 1 and 2 show examples of arrangements and devices.

In examples below, reference signs for devices of the same class are often referred to with the same reference numeral (e.g., 16, 14) and by distinguishing them using the apex (e.g., 16', 16") or using different letters (14a, 14b, 14c, etc.). When referring to properties associated in general to all the devices of the same class, the reference numeral may be used to refer to the whole class (e.g., 16, 14), or, in alternative, by using multiple references (e.g., 14a . . . 14g)

Examples below and above are mainly explained as being mainly directed to communications based on visible light communication, VLC, but in some examples may be generalized, e.g. to wireless communications (e.g., using RF, ultrasounds, etc.).

Examples below and above are explained as being mainly directed to communications between a second apparatus which may be an arrangement having fixed frontend(s), such as optical frontend(s), and first apparatus, which may be mobile devices. However, in some particular cases, they may be generalized, e.g. to examples of the first apparatus(es) being mobile (e.g., with at least one mobile frontend) and/or with at least one fixed-position device (e.g., with a plurality of frontends). In some examples, at least one of the first apparatuses may be mobile. In addition or alternative, at least one of the first apparatuses may be fixed.

Examples below and above are explained as being mainly directed to choosing the configurations for downlink (DL) transmissions of the payload (e.g., from the arrangement to the device). However, in examples it is also possible to define the configurations for uplink (UL) transmissions of the payload (e.g., from the device to the arrangement).

Examples below and above are explained as being mainly intended as being associated to networks, e.g. in which multiple devices (e.g., mobile devices) may be transmitting and receiving data to and from the arrangement for communications for industrial automation or for similar applications. The communications may be intended to and/or from other devices in the network or in a different network. Some examples below refer to multiple-input/multiple-output, MIMO, networks.

In examples below and above, payload transmissions may refer to sensed values, actuation values, feedback values, e.g. in an industrial environment. In addition or alternative, payload transmissions may refer to voice data, web page data, etc., e.g. for voice communications. In the following examples, attention is mainly drawn to the control signalling, and the use of the payload data for the application is mainly left free.

Examples below and above are explained as mainly being directed to a second apparatus embodied by a distributed arrangement having a coordinator (e.g., one single coordinator) and multiple frontends (e.g., optical frontends, OFEs) connected to the coordinator in a star topology. E.g., the coordinator may be the center of the star, multiple frontends being at the vertexes of the start though a star connection formed though a backhaul). Other topologies (e.g., bus topology, wireless topology, point-to-point topologies etc.) are possible.

In examples below and above, at least some of the frontends are in general regarded as relays, which retransmit packets obtained from the coordinator of the arrangement and/or retransmit to the coordinator wireless packets obtained wirelessly. In some cases, the frontends may notwithstanding slightly "personalize" their transmissions (e.g., by using different sequences, such as orthogonal sequences, and/or by using different identifiers). Therefore, even when different frontends simultaneously relay the same signal as acquired from the coordinator, they may transmit signals which are at least slightly different and/or their transmissions may be distinguished.

FIG. 1 shows a network 10 (system) for a wireless communication (e.g. light communication, or visible light communication, VLC) between at least one second communication apparatus, which is here a communication arrangement 15 (which may be, for example, a base station, BS), and at least one first communication apparatus. Here, the at least one first communication apparatus includes at least one communication device (e.g., user equipment(s), UE(s), relay endpoint(s), REPs, mobile device(s)).

The second apparatus (communication arrangement) 15 may include a coordinator 12, which may be a computer-based system (e.g. a processor-based system). The coordinator 12 may be understood, in some examples, as the (or an) intelligent part of the communication arrangement 15. In industrial automation examples, the coordinator 12 may also be part of a fixed equipment associated to some machinery or coordinating (or associated to a device coordinating) a plurality of machineries.

The second apparatus (communication arrangement) 15 may include at least one or a plurality of frontends (e.g., relay endpoints, REPs) 14a . . . 14g. The frontends 14a . . . 14g may be, for example, optical frontends (OFEs). In the case of OFEs, each OFE may include a photo transceiver, photo diode, transmitting diode, light emitting diode, LED. In case of RF, each frontend may include a RF transceiver. In case of ultrasound, each frontend may include an ultrasound transceiver.

In examples, a plurality of frontends 14a . . . 14g may be part of the communication arrangement 15. The optical frontends 14a . . . 14g may be spatially distributed (e.g. in known positions) so as to transmit and receive in different portions of an environment, so as to transmit/receive communications through channels (e.g., optical channels) 18a . . . 18g. In examples, the frontends 14a . . . 14g may have a position which is fixed and/or known.

The frontends 14a . . . 14g of the second apparatus 15 may be connected to the coordinator 12 through a fronthaul 17. The fronthaul 17 may be constituted by (or at least comprise) a communication channel(s) (e.g., 17a, 17b . . . 17g) for permitting transmissions between the frontends 14a . . . 14g and the coordinator 12. The fronthaul 17 may comprise at least one communication network. The fronthaul 17 may support a star topology. The fronthaul 17 may comprise a plurality of point-to-point connections. The fronthaul 17 may be wired (e.g. using metal conductors) or cabled (at least for some connections), at least for the connection with one frontend (in some examples, all the connections with the frontends are wired and/or cabled). In some examples, the fronthaul 17 is wireless (at least for the connection with one frontend). In some examples, the fronthaul 17 may be based on ethernet.

Figure 13:
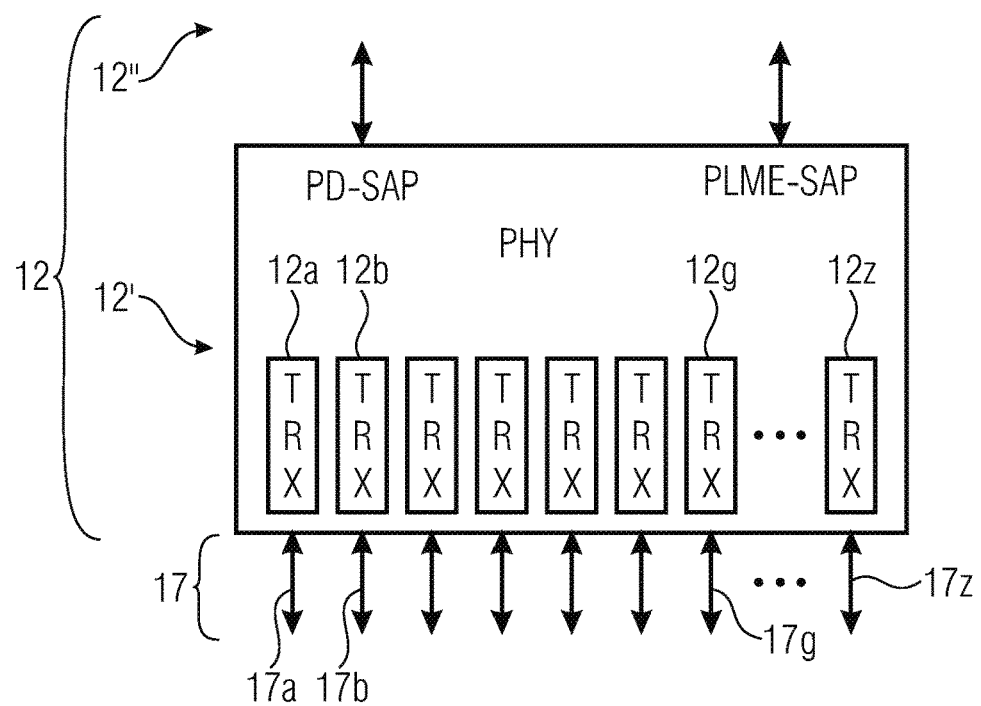
FIG. 13 shows partial example of a coordinator.

FIG. 13 shows an example of physical layer 12' of a coordinator 12, while the higher layers 12" of the coordinator 12 are not shown. The coordinator 12 may include a plurality of transmission ports 12a . . . 12z (transmission chains). Each transmission port 12a . . . 12z may be connected to a communication channel 17a . . . 17z for a transmission directed toward a respective frontend. The transmission may be performed per PLCP Service Data Unit (PSDU) via PD-SAP. RX configuration (not shown in the figure) may be through PLME-SAP (PLME: physical layer management entity).

The frontends 14a . . . 14g may perform transmissions with the communication device(s) 16 (e.g., 16', 16") through wireless links, e.g., optical links 18a . . . 18g, such as VLC links or other wireless links. The different links are collectively indicated with 18, while the communication between each frontend 14a . . . 14g and the respective mobile device 16', 16" is indicated with a letter associated to the respective frontend. For example, in FIG. 1 (at least in the instant depicted by the figure):

The frontends 14a, 14b, and 14c happen to communicate with the mobile device 16' through three optical connections (channels) 18a, 18b, and 18c, respectively.

The optical frontend 14d is not communicating with any mobile device.

The optical frontends 14e, 14f, and 14g are communicating with the mobile device 16" through wireless connections 18e, 18f, and 18g, respectively.

Each frontend 14a . . . 14g may relay data packets towards and from external devices. For example, the signals transmitted by the coordinator 12 to the frontends 14a . . . 14g through the fronthaul 17 may be immediately retransmitted (e.g., optically or more in general wirelessly). Analogously, the signals received (e.g., optically or more in general wirelessly) by the frontends 14a . . . 14g are immediately retransmitted to the coordinator 12 through the fronthaul 17. In some cases, different frontends 14a . . . 14g simultaneously retransmit the signals from the coordinator 12 using different sequences (e.g., orthogonal sequences) and/or using an identifier which identifies each frontend. For example, a first frontend 14a may retransmit a signal from the coordinator 12 using a first sequence, while simultaneously a second frontend may retransmit the same signal from the coordinator 12 using a different sequence orthogonal to the first sequence (also different identifiers may be used). The same may be applied by using different sets of subcarriers which do not overlap.

At least one mobile device 16 (e.g., 16' and 16"), which may be the first communication apparatus, may be described as a user equipment and/or an apparatus which may be mobile (moveable) with respect to the frontends 14a . . . 14g or at least one of them. Accordingly, the mutual position between the mobile device(s) 16', 16" and at least one of the optical frontends 14a . . . 14g may vary, hence implying that the channel conditions for the links 18a . . . 18g vary. A fast connection(s) and reconnection(s) between each mobile device 16', 16" and each frontend 14a . . . 14g is notwithstanding possible. For example, while at the instant depicted by FIG. 1 the mobile device 16" happens to be connected to the frontends 14e . . . 14g by virtue of its position, the mobile device 16", after moving, may reach a position closer to the mobile device 16': in that case, the mobile device 16" will be probably disconnected from the frontends 14e . . . 14g, but will be connected to the frontend 14a . . . 14c: this is by virtue of the fact that the optical channels 18a . . . 18c are probably better (e.g., less noisy and/or with an increased signal to noise ratio) than the optical channels 18e . . . 18g at that position.

The communication between the frontends 14a . . . 14g and the different first apparatuses (e.g. communication devices 16', 16") may be performed using a scheduling which assigns different resources to different mobile devices, so as to avoid collisions between different signals from different communication devices 16', 16".

In examples, at least some of the resources may be time slots. In examples, at least some of the resources may selected frontends out of the frontends 14a . . . 14g.

In examples above and below, the coordinator 12 may request some simultaneous transmissions (e.g., beacon transmissions, reference signals, etc.) to a plurality of frontends. Therefore, the different frontends may relay the beacon or reference signal simultaneously. In examples above and below, the coordinator 12 may request scheduled transmissions, e.g. so that at least two different frontends transmit and/or receive different data to and/or at the same time.

Figure 3:
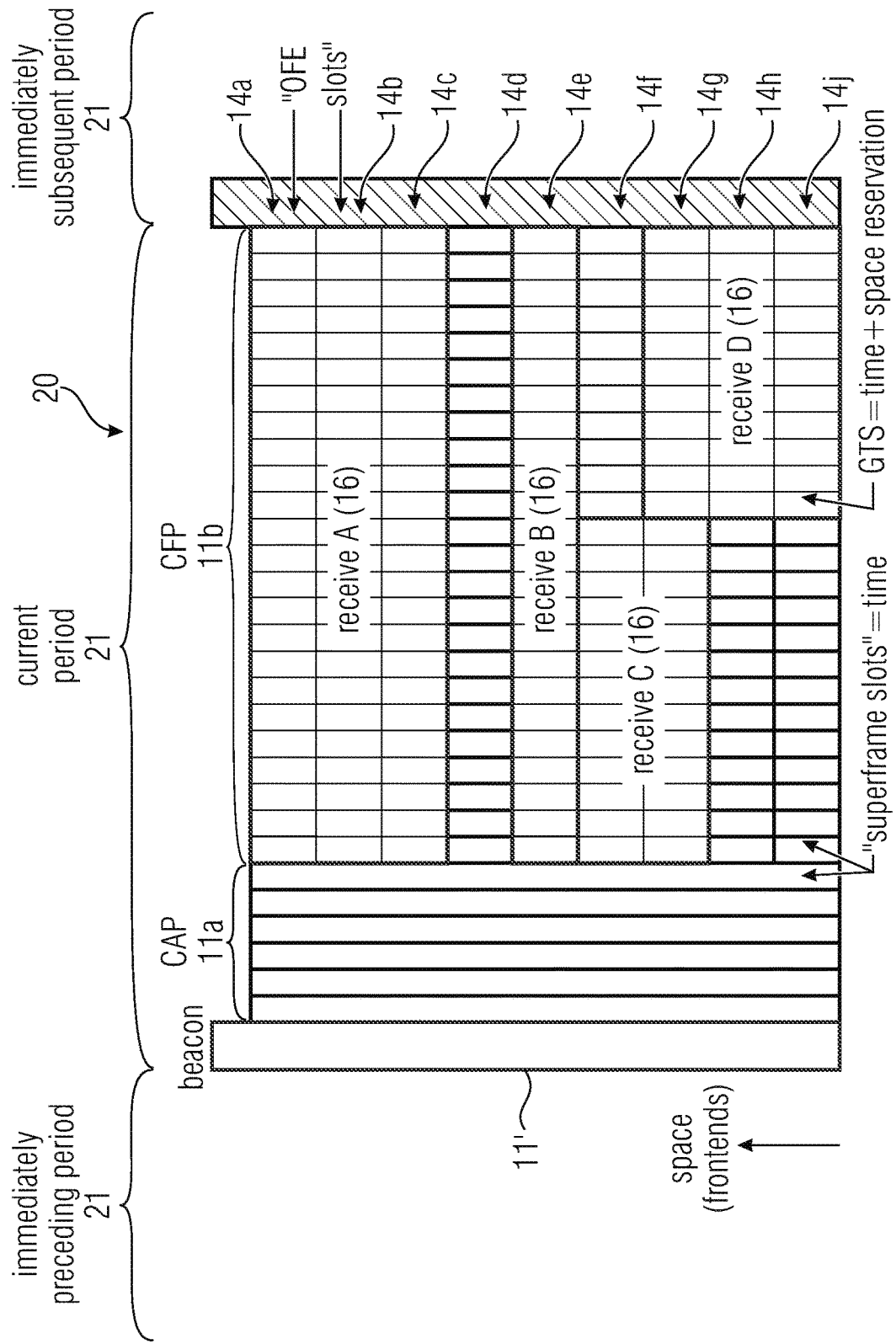
FIG. 3 shows an example of scheduling.

FIG. 3 shows a communication scheme 20 mapping time slots and frontends as assigned to different mobile devices 16 (here indicated with A, B, C, and D, but at least one of them may be one of the devices 16' and 16"). With the scheme 20, time is scheduled according to a time period 21. E.g., A current period 21 follows an immediately preceding period and precedes an immediately subsequent period. The period 21 may start with a first beacon transmission 11' (beacon transmissions for the current period) and/or end with a second beacon transmission 11" (beacon transmissions for the immediately subsequent period). The beacon transmission (also referred to as "beacon") may be indicated with 11 when it is not necessary to indicate if the beacon is the initial or is the beacon starting the core period of the subsequent period. In examples, the beacon 11 may be transmitted by a plurality (e.g., the totality) of the optical frontends 14a . . . 14g, e.g., simultaneously (at the same time, in the same slot). The beacon 11 may be transmitted by different frontends at different frequencies (e.g., carriers, subcarriers): for example, each fronted 14a . . . 14g may transmit the beacon at a plurality of signals at different frequencies, e.g. simultaneously and/or at different time instants and/or over multiple time slots. In addition or in alternative, in the beacon 11 may simultaneously present different subcarriers.

During the transmission of the beacon 11 from the totality of the frontends 14a . . . 14g, each mobile device 16 may perform measurements for determining the condition of the respective wireless link 18. For example, if, either accidentally or intentionally, an opaque element happens to be interposed between the frontend 14a and the device 16', the optical link 18a will result obstructed, thus preventing the mobile device 16' from receiving a beacon 11. This impossibility of receiving the beacon 11 may cause the determination of a bad channel connection associated to the optical link 18a. The same can apply, according to the shape and the position of the interposed opaque elements, between the mobile device 16' and the frontends 14b, 14e, 14f, 14g: the beacon 11 as received from the frontends 14b, 14e, 14f, 14g will cause a bad reception, which will imply that the mobile device 16' acknowledges a non-correct reception of the beacon 11 from those frontends.

Each beacon 11 may be transmitted at different frequencies (e.g., subcarriers), e.g., by sweeping along different frequencies, hence permitting each mobile device 16 to acquire measurements associated to each subcarrier. Measurement(s) may be associated, for example, to the amplitude of the beacon signal, and/or to the power of the beacon signal as received, and/or to the energy, and/or to the power, and so on. The measurement(s) may be obtained, for example, by decoding a particular pilot sequence (e.g., known by the device 16), and by measuring the errors in the pilot sequence, and/or by analyzing the signal. A good performance will be provided, for example, by those receptions of the beacon 11 which are associating to have a high energy and/or high power and/or high amplitude and/or low error rate in decoding the pilot sequence, and so on. In some examples, the more the pilot sequence as received corresponds to the pilot sequence as pre-defined, the higher is the quality.

In some examples, the beacon 11 is relayed by different frontends 14a . . . 14g slightly differently. For example, different frontends 14a . . . 14g may retransmit the same beacon 11 by using different orthogonal sequences and/or different frequencies and/or different identifiers, so that each device 16 may distinguish between the different pilot sequences as obtained by each frontend 14a . . . 14g.

Subsequently, each device 16 (first apparatus) may perform a measurement of each of the pilot signals as obtained from multiple frontends 14a . . . 14g, to obtain the quality of different channels 18a . . . 18g.

Among the transmission of two consecutive beacons 11' and 11", according to the scheduling the period 21 has time slots for permitting the communication of data (e.g., payload) and/or control signals between the communication arrangement 15 and the mobile device(s) 16. For example, a part of the period 21 may be associated to a contention access period (CAP) 11a (e.g., subdivided into time slots). The CAP 11a may be understood as a random access frame. In examples, the CAP 11a may be immediately subsequent to the beacon 11'. The CAP 11a may be controlled by a listen-before-talk, LBT, medium access strategy. For example, protocol Aloha may be used. At each time slot of the CAP 11a, there is the possibility that each mobile device 16' transmits data or control signals after having detected that in other mobile device has not started a transmission. Several known LBT protocols have been developed for avoiding or solving collisions.

According to the scheduling 20, the period 21 may include a collision-free period (CFP) 11b (e.g., subdivided into time slots). The CFP 11b may be immediately subsequent to the CAP 11a and/or immediately preceding the subsequent beacon 11". During each time slot in the CFP 11b, a communication in uplink (UL) and/or downlink (DL) may be performed with each of the mobile devices 16 (A, B, C, D).

As can be seen in FIG. 3, the space may also be understood as being partitioned according to the different frontends 14a . . . 14j. For example, in the scheduling 20 shown in FIG. 3, the whole CFP 11b for three frontends 14a, 14b, 14c happens to be assigned to the mobile device A. A different, fourth frontend 14e occurs to be uniquely associated to the mobile device B. A frontend 14f may be assigned, during some time slots (the first thirteen time slots in the CFP 11b) to the mobile device C, while subsequent slots (the last eleven time slots of the CFP 11b before the subsequent beacon 11") of the frontend 14e are assigned to a different mobile device D (16). Notably, the first slot of the CFP 11b occurs to be assigned to both the mobile devices A, B and C (the frontends 14a . . . 14c are assigned to the mobile device A; the frontend 14d is assigned to the mobile device B; the frontends 14e and 14f are assigned to the mobile device C; no frontend is associated to the mobile device D; and the frontends 14d, 14h and 14j are associated to no mobile device at all).

By virtue of the fact that each time slot is in general associated to a plurality of different frontends 14a . . . 14j, and different frontends may transmit to different devices, reference may be made to "superframe slots": not only the time, but also the space results to be granularized into a plurality of resources, each of them being used for a transmission by a device 16 or by the arrangement 15. Basically, for each CFP 11b, each mobile device 16 (A, B, C, D) is assigned to a combination of one or more time slots and at one or more frontends 14a . . . 14j. This concept is indicated by the acronym GTS for guaranteed time slot.

The scheduling 20 may be defined in real time by the coordinator 12 which may assign, to each mobile device 16 (A, B, C, D) the necessary time slots and/or frontends 14a . . . 14j to be used for the communications. The particular scheduling may be performed on the basis of signaling information provided by each communication device 16 (A, B, C, D) to the coordinator 12 (or more in general, the communication arrangement 15) and/or may be based on at least one criterion. The at least one criterion may be chosen (either statically or dynamically, by the coordinator 12) among one of several criteria. One criterion may be based on the feedback provided by the communication devices 16 (which may also not be considered for the present strategy); one criterion may be based on the urgency of the transmissions; one criterion may be based on the requests by the device(s) and so on.

Several interesting aspects are discussed hereinbelow. In some cases, different aspects may be combined with each other for a same example.

Aspect I

Here, for "device" may be generalized to "first apparatus (16)", and "arrangement" may be generalized to "second apparatus (15)", even if in variants they may be exchanged. The frontends may be optical frontends. The device 16 may be a mobile device. the arrangement may be fixed and the frontends of the arrangement may be distributed. The coordinator 12 or central unit may be an intelligent part of the arrangement.

In particular when the devices 16 (16', 16") are movable, the possibility may arise that the scheduling 20 does not fit anymore with the position of the device(s) after a movement of at least one of the devices. For example, in FIG. 1, if the device 16" is moved towards the position of the device 16', a situation can arise in which the device 16" would probably be better served by frontends 14a, 14b, 14c, rather than by the frontends 14e, 14b, and 14g. However, the frontends 14a, 14b, 14c are probably assigned, by the scheduling 20, to the device 16'. Hence, it may arise the situation according to which:

The device 16" is reached by DL transmissions which are actually meant for the device 16'.
The device 16" tries to transmit (in UL) to the frontends 14e, 14b, and 14g in the time slots assigned by the scheduling 20, and, in doing this, it actually superposes its transmissions to simultaneous UL transmissions performed by the device 16' in the same time slots; as a consequence, the frontends 14a . . . 14c received the transmissions of the device 16' with the interference of the simultaneous transmissions of the device 16". At the same time, the frontends 14e . . . 14g remain uselessly waiting for the transmissions from the device 16".

However, some techniques have been developed that permit to cope with such and similar inconveniences.

Basically, it has been understood that it is possible to perform communications according to a strategy which provides for (in UL and/or in DL):
first, static or semi-static slot grantings (e.g., which do not expire, and which remain valid until they are overridden); and/or
second, dynamic grantings, (e.g., which have limited validity and are therefore temporary).

Accordingly, it is possible for the device 16 to have granted time slots, either fixed or temporary. For example, a device 16, while moving, may be assigned (totally or prevalently) with dynamic, second time slot grantings; a non-moving (e.g., fixed) device 16 may be assigned (totally or prevalently) with semi-static, first time slot grantings. Here the slots (first time slots or second time slots) may be superframe slots, which imply that, at the same time, different frontends 14a . . . 14g may transmit or receive different data packets to or from different (or the same) device(s) 16', 16". In order to inform the devices 16', 16" of the allocations of first time slot grantings and/or second time slot grantings, the arrangement 15 may transmit first time slot granting information for communicating the allocations of the first time slot grantings and/or second time slot granting information for communicating the allocations of the second time slot grantings. Accordingly, the devices 16', 16" may determine when they may receive and/or transmit data packets to and from the arrangement 15.

It is possible to communicate the first time slot granting information (for the static or semi-static first time slot grantings) as a part of a management frame.

It is possible to transmit the second time slot granting information (for the dynamic first time slot grantings) in control frames (e.g., using dynamic descriptors).

It has been noted that it is possible for the arrangement 15 to send the management frames with lower priority with respect to the control frames. Hence, the communication of the dynamic, second time slot granting information has higher priority with respect to the communication of the semi-static first time slot granting information.

In some examples, the device 16 may request new granted time slots (GTSs) to the arrangement 15 (e.g., after having movement). If, at the devices request, no response is provided from the arrangement 15, the device 16 may consider its request to have failed. This can be carried out, for example, after a predetermined number of periods (e.g., superframes) has elapsed. For example, after five superframes have elapsed without any transmission of first time slot granting information and/or second time slot grating information from the arrangement 15 to the device(s) 16, the request is considered failed by the device(s) 16, which may, for example, transmit a new request to the arrangement 15.

Figure 14:
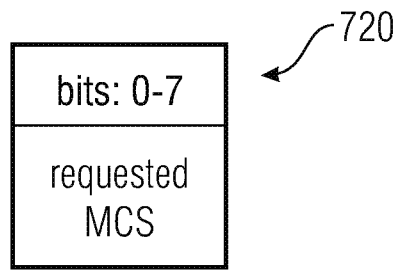
FIGS. 14-18 show examples of frames.
Figure 15:
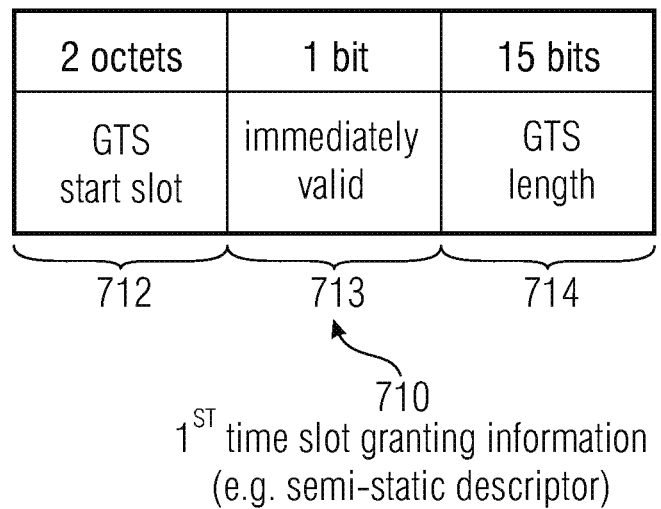
Figure 16:
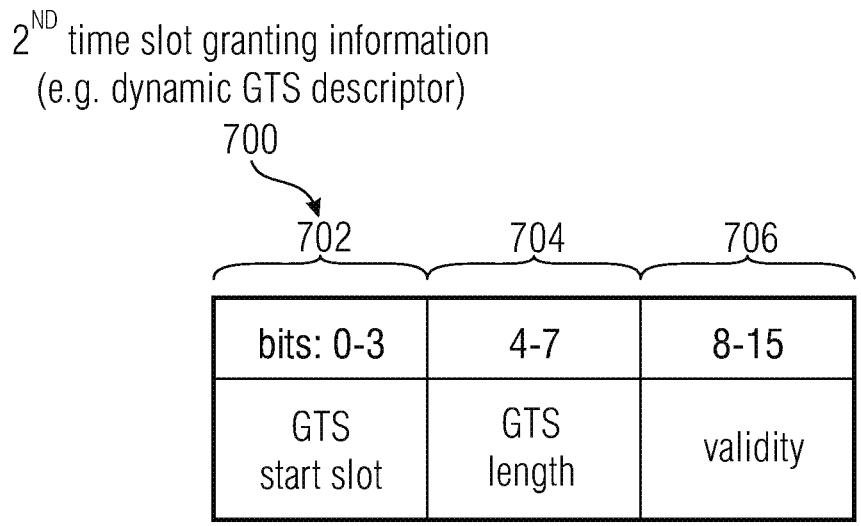

FIGS. 14-16 shows signaling information which is exchanged between the device(s) 16 and the arrangement 15 for communicating to each other the allocations based on the first and second time slot granting information.

FIG. 14 shows a request 720 as provided by a device 16 to the arrangement 15. The request 720 may indicate a requested MCS, for example (in addition or alternative, other data may be inserted in the request 720).

FIG. 15 shows an example (static or semi-static GTS descriptor) of first time slot granting information 710, e.g., as transmitted by the arrangement 15. The first time slot granting information 710 may be sent to the device to which the static or semi-static time slot is assigned. The first time slot granting information 710 may include a GTS start slot field 712, which may indicate the starting point of the first GTS (e.g., when the first GTS starts, e.g. in the period 21). The first time slot granting information 710 may include an immediate-validity field 713, which may indicate whether the granting is immediately valid (in the same period 21) or non-immediately valid (and will be valid in the subsequent period). The first time slot granting information 710 may include a GTS length field 714, which may indicate the length of the first GTS. Once the first time slot granting information 710 is received by the device 16, the allocation as signalled in the first time slot granting information 710 will be used by the device 16 to permanently modify the scheduling (at least, up to the subsequent reception of first time slot granting information 710). Hence, the first time slot granting information 710 will not expire, if not requested by the arrangement 15 (e.g., if not overridden).

FIG. 16 shows an example (dynamic GTS descriptor) of second time slot granting information 700, e.g., as transmitted by the arrangement 15. The second time slot granting information 700 may be sent to the plurality of devices. The second time slot granting information 700 may lack the indication of an address (e.g., multiple devices 16 will receive it). The second time slot granting information 700 may include a GTS start slot field 702, which may indicate the starting point of the dynamic, second GTS (e.g., when the dynamic, second GTS starts, e.g. in the period 21). The second time slot granting information 700 may include a GTS length field 704, which may indicate the length of the dynamic, second GTS. The second time slot granting information 700 may include a validity field 706, which may indicate for how many subsequent periods 21 the dynamic, second GTS will be assigned to the particular device 16.

Once the second time slot granting information 700 is received by the device 16, the allocation as signalled in the second time slot granting information 700 will be used by the device 16 to temporarily modify the scheduling (e.g., for a number of periods indicated in the validity field 706). Hence, the first time slot granting information 710 will not expire, if not requested by the arrangement 15.

It is to be noted that the information 710 and 700 (GTS descriptor) is information associated to one single GTS.

Figure 17:
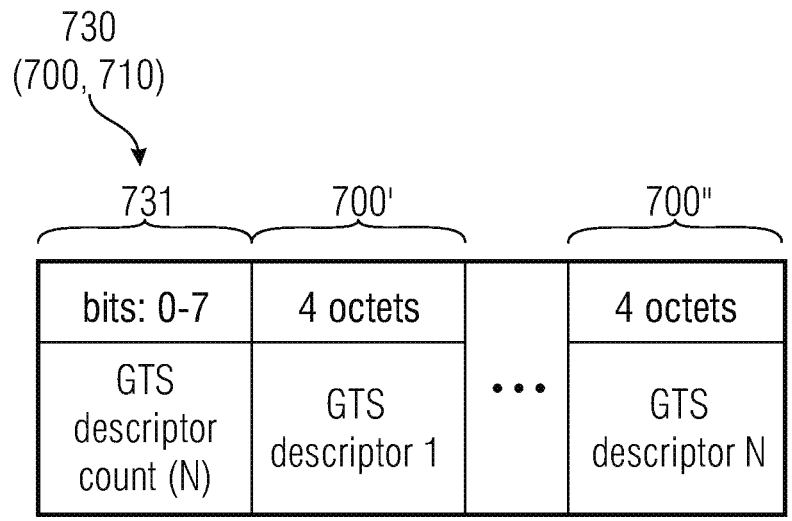

However, it has been understood that it is possible to encode a plurality of GTS descriptors in the same frame (control frame or management frame), so as to provide information 710 and 700 regarding multiple slots with one single frame, hence reducing payload. As shown in FIG. 17, in some examples, multiple descriptors may be chained in one single list 730 (e.g., 700', 700", or 710', 710" . . . ).

The list 730 may include a GTS descriptor count field indicating how many GTS descriptors 700', 700", or 710', 710" are included in the list.

Figure 18:
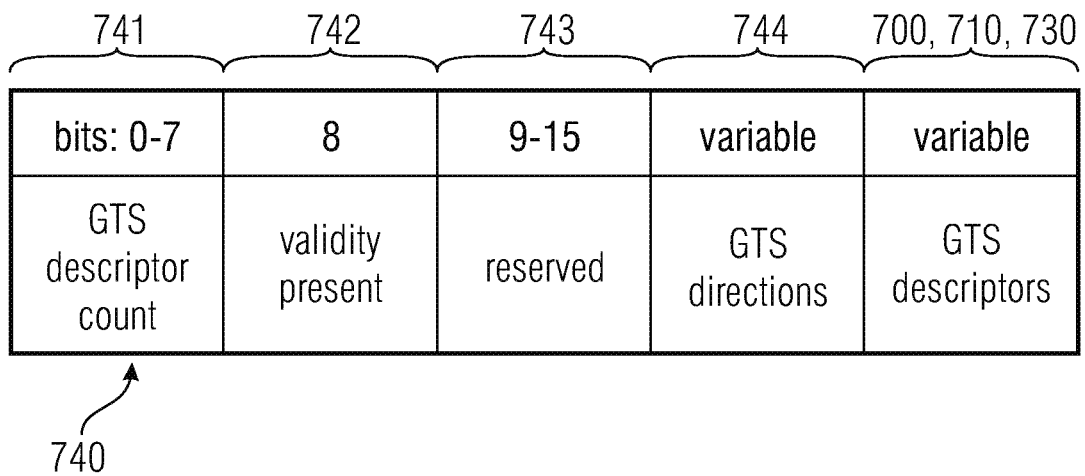

In addition or alternative, a message 740 (FIG. 18) may be transmitted. The message 740 may include the information 710 and 700 and/or a list 730. The message 740 may include a GTS descriptor count field indicating how many descriptors are in the list 730. The message 740 may include a GTS descriptor count field indicating how many GTS descriptors 700', 700", or 710', 710" are included in the list 730. The message 740 may include a validity present indication 742, which indicates whether the validity field 706 is included in the frame (see descriptor 700). The message 740 may include reserved bits 743. The message 740 may include a GTS direction field, which indicate the directions (e.g., DL, UL) of the GTSs.

By using the information 700, 710, 730, and/or 740, the arrangement 15 may indicate new scheduling information to the device(s) 16, hence reallocating dynamic, static or semi-static GTSs to different devices.

In some examples, the scheduling 20 may be modified by the arrangement 15, and/or the information 700, 710, 730, and/or 740 is provided to the device(s) 16, on the basis of feedback provided by the device(s) 16 regarding the channel(s) 18. The feedback may be based on measurement(s) on the beacon 11 as received from the multiple frontends 14.

Figure 4:
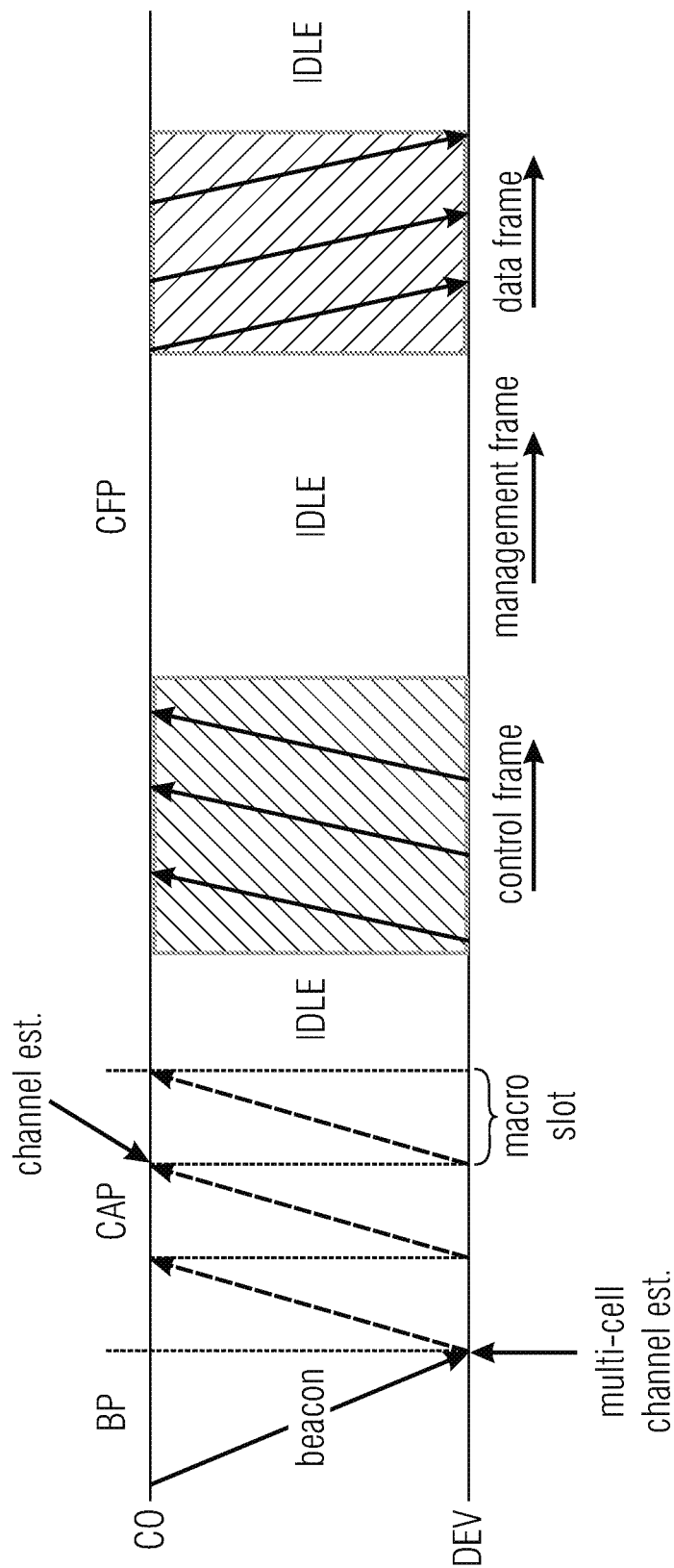
FIGS. 4-7 show examples of communications.

An example is provided by FIG. 4. Another example is provided by FIG. 3: a beacon 11 is simultaneously provided by the frontends 14a . . . 14g. Measurements 31 are performed on the different versions of the beacon 11 as received from the multiple frontends. Then, feedback 32 (e.g., channel state information, CSI, 32) is provided from the device(s) 16 to the arrangement 15. The arrangement 15 may redefine the scheduling on the basis of the obtained feedback 32. Hence, the arrangement 15 may provide the configuration information 33 (700, 710, 720, 730, etc.) to the device(s) 16 (even if in FIG. 5 only "dynamic GTS" is written, it is also possible to provide information on "static GTS" or "semi-static GTS"). Examples of the feedback 32 are provided below (see further aspects).

Figure 5:
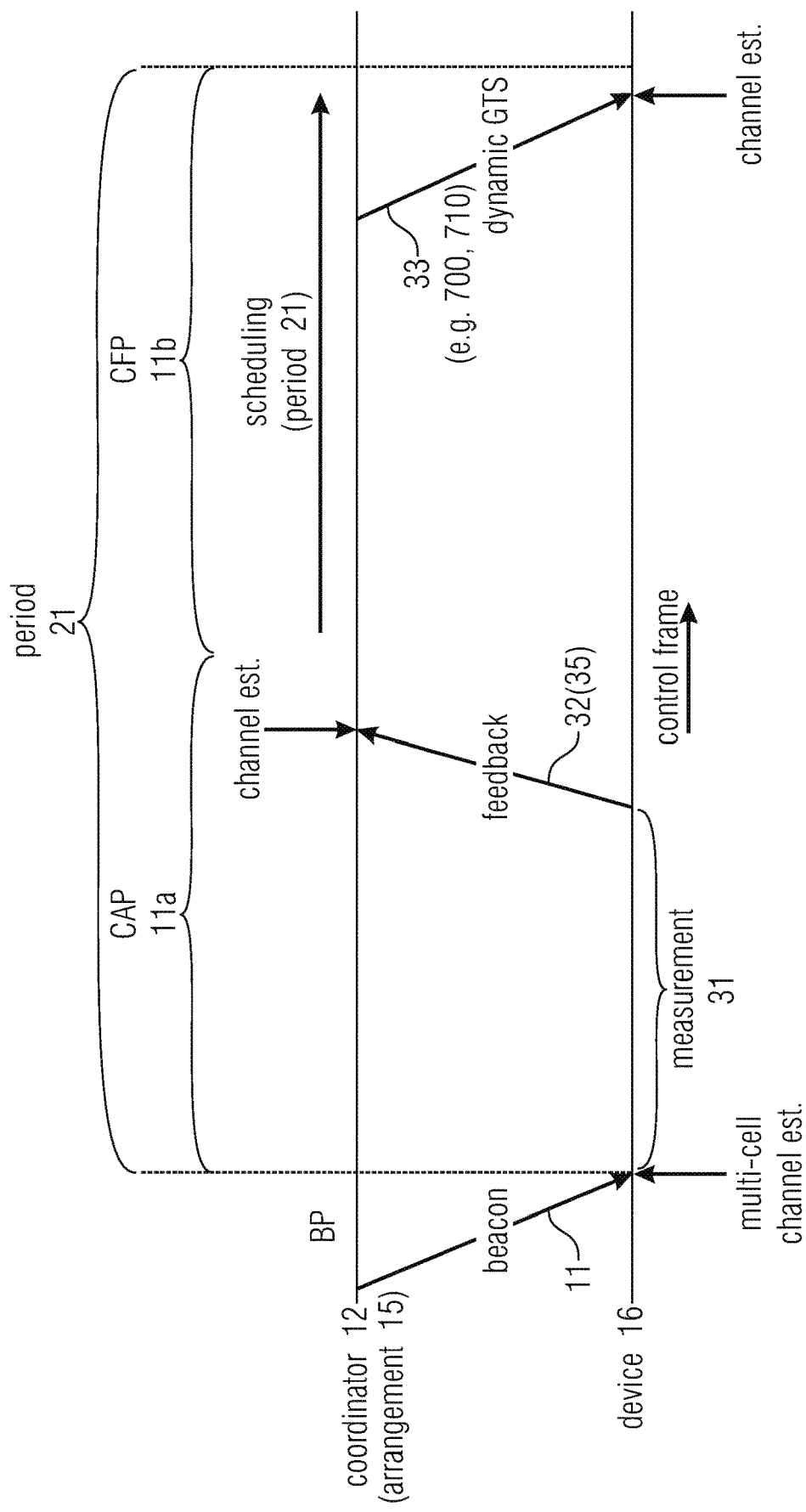

In examples above, the GTSs which are allocated with the information 33, 700, 730, 740, etc. may be the GTSs of the CFP11b as shown in FIGS. 3 and 5.

Accordingly, there is provided a communication arrangement (15), wherein the communication arrangement (15) is configured to transmit information in allocated time slots, wherein the communication arrangement (15) is configured to send a configuration information (700) which is included in one or more management frames (740); and wherein the communication arrangement (15) is configured to send a configuration information (710) which is included in one or more control frames (740); wherein the communication arrangement (15) is configured to send a first time slot granting information (710), which is included in the management frames and wherein the communication arrangement (15) is configured to send a second time slot granting information (700) included in the control frames (740), which comprises a limited time validity; and wherein the communication arrangement (15) is configured to allocate one or more time slots for communication in dependence on the first time slot granting information (710) and in dependence on the second time slot granting information (700).

Aspect II

Here, for "device" may be generalized to "first apparatus (16)", and "arrangement" may be generalized to "second apparatus (15)", even if in variants they may be exchanged. The frontends may be optical frontends. The device 16 may be a mobile device. the arrangement may be fixed and the frontends of the arrangement may be distributed. The coordinator 12 or central unit may be an intelligent part of the arrangement.

In order to allocate the superframe slots (e.g., to appear as in FIG. 3, for example, and/or how explained for the Aspect I), a mechanism may be used to provide, to the arrangement 15, feedback 32 regarding the reception of the transmissions from the frontends 14a-14g (e.g., optical frontends) of the second apparatus (e.g., arrangement) 15 to the first apparatuses (e.g. devices) 16 (16', 16", A, B, C, D, etc.). In general terms, the first apparatus (e.g., arrangement) 15 (and in particular, the central unit or coordinator 12) may define the most appropriated granted slots and/or the most appropriated frontends to each first apparatus (e.g. device) 16 (e.g., 16', 16", A, B, C, D).

Figure 6:
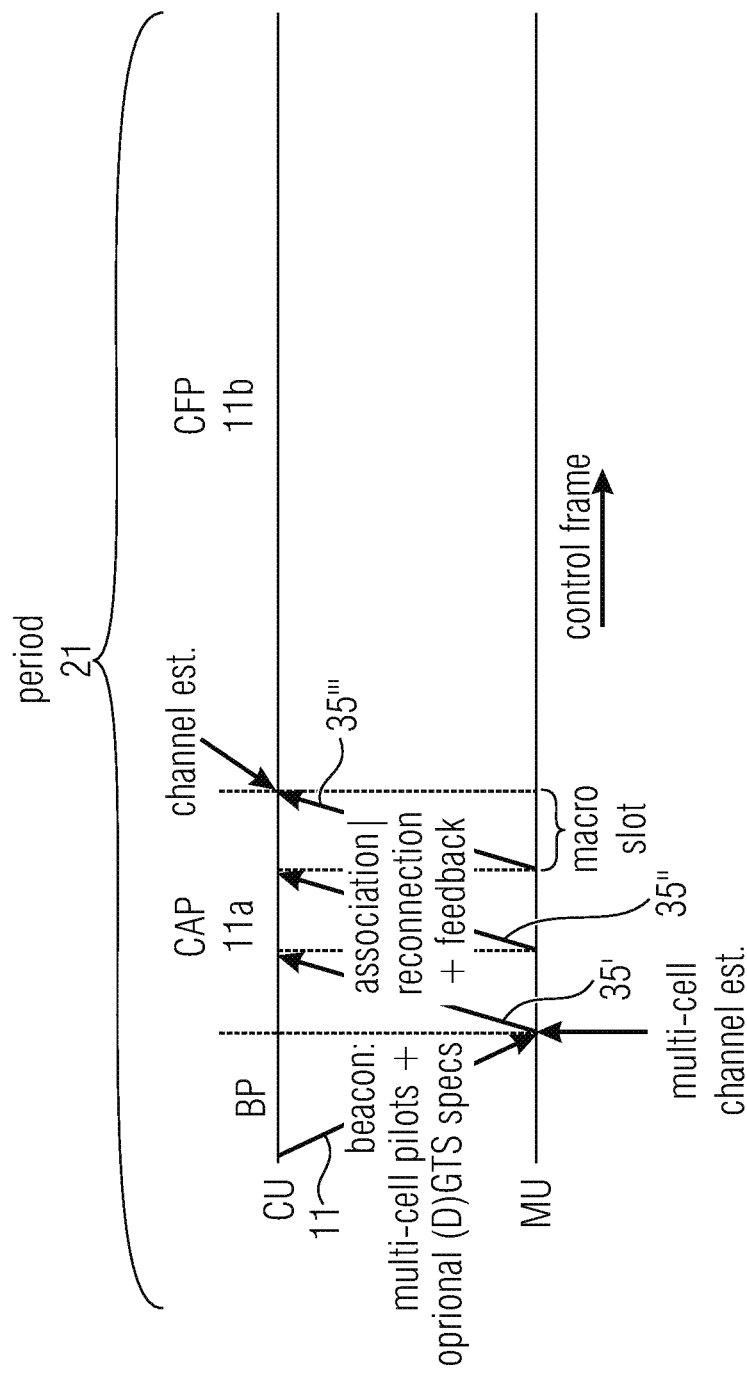
Figure 7:
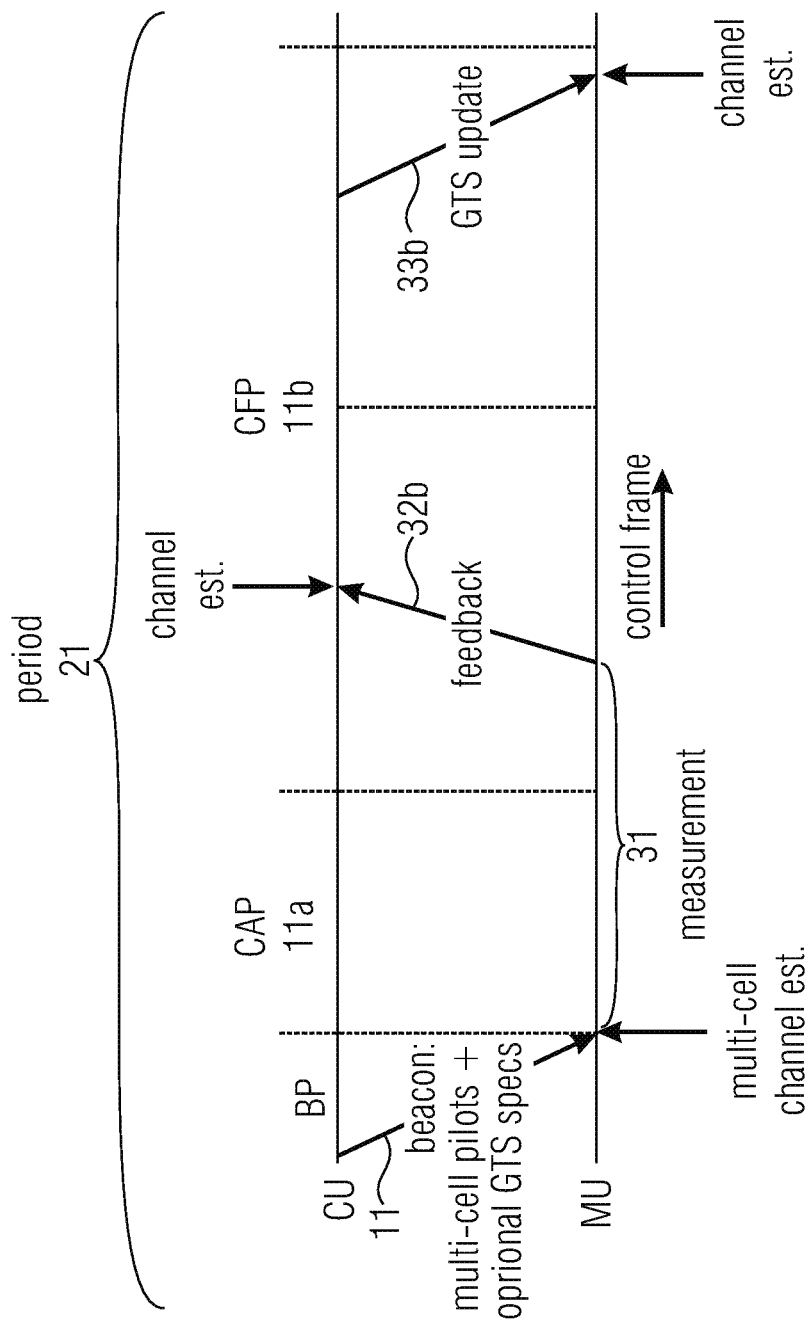

In general terms, it is possible to obtain a first communication apparatus (e.g. device 16), configured to receive one or more reference signals and/or beacon signals (e.g. 11) from one or more frontends (14a . . . 14g). The first communication apparatus (16) may be configured to determine (e.g., 31) a channel information (e.g., CSI) on the basis of the reception of the one or more reference signals and/or beacon signals (11). The first communication apparatus (e.g., 16) may be configured to transmit the channel information (32) in a contention access period (or random access frame), e.g. CAP 11a (FIGS. 3 and 6). The first communication device (e.g., 16) may be configured to subsequently update the channel information (e.g., 32b) in a collision-free period, e.g. CFP 11b (FIGS. 3 and 7).

Accordingly, in some examples:
When the first apparatus (e.g. device) 16 first arrives in the network, it may send the channel information (e.g., CSI) 32 (as in FIG. 5) in the CAP 11a (or an association request 35 as in FIG. 6), as there is no granted slot assigned to the first apparatus (e.g. device) 16 and the second apparatus (e.g., arrangement) is not aware of the first apparatus 16;

In response thereto, the second apparatus (e.g., arrangement) 15 may assign, through GTSs 33 (FIG. 5), granted time slot(s), GTS(s), to the first apparatus 16 (e.g., GTSs of the CFP 11*b*, FIG. 3);

Subsequently, after that the first apparatus 16 has been assigned with granted time slot(s) in the CFP 11*b* of the period 21, the first apparatus 16 may send (update) the subsequent channel information (e.g., CSI) 32 (as in FIG. 7) in the CFP 11*b* of the period 21;

In response thereto, the second apparatus 15 may assign, through GTSs 33*b* (FIG. 7) GTS(s), to the first apparatus 16 (e.g., GTSs of the CFP 11*b*).

As shown in FIG. 5, the second apparatus (e.g., arrangement) 15 may send a beacon 11 to the device(s) 16. In some examples, the beacon 11 may be the same beacon that is discussed above and/or may be the same of the beacon 11 of FIG. 3. In other examples, instead of the beacon 11, a reference signal is transmitted which may also not be a beacon. Anyway, it is here referred to as "the beacon" even though it shall be clear that also a reference signal could be used in alternative examples. The beacon 11 may be a global message, which may be the same (or almost the same) for all the frontends 14*a* . . . 14*g* relaying it, and which can be transmitted simultaneously from all the frontends 14*a* . . . 14*g* and towards all the second apparatuses (e.g., devices) 16.

The plurality of frontends 14*a* . . . 14*g* may be coordinated and/or synchronized with each other e.g., by the coordinator 12, through a wired connection (e.g., the fronthaul 17).

From the reception of the beacon 11 and/or reference signal, the device 16 may determine a channel information (channel state information) which is based on the reception of the reference signal and/or beacon. For example, the device 16 may measure the quality of the channel 18. The device 16 may measure the signal to noise ratio (SNR) or a parameter associated to the SNR. The device 16 may perform a channel estimation. The second apparatus (e.g., device 16) may perform a channel measurement.

For example, the beacon 11 and/or reference signal may comprise, for example, a pilot sequence (which is known by the device 16): the first apparatus (e.g. device 16) may perform measurements on the reception of the pilot signal. As the pilot sequence is known by the device 16 (e.g., stored in a storage unit of the device 16), the device 16 may compare the pilot sequence as received with a pre-stored version of the pilot sequence, and perform measurements on the basis of the similarity of the received signal with the pre-stored signal. The device 16 may count the quantity of incorrect received values: the higher the quantity of the incorrect values, the worse the channel state (e.g., the lower the SNR). The device 16 may therefore comprise a measuring unit for measuring the state of the channel and/or the quality and/or the SNR. FIG. 5 shows a channel measurement time used by the device 16 for performing measurements 31.

As shown in FIG. 5, the device 16 may transmit a message 32 with, encoded therein, measured channel information based on the reception of the beacon or reference signal (11). The encoded measured channel information may be, such as, the arrangement 15 (and/or the coordinator 12) can understand whether the channel between each frontend and/or the device 16 is optimal or not. (The encoded measured channel information may therefore be used by the coordinator 12 for defining the information 700, 710, 730, and/or 740 as described above with reference to the Aspect I.)

It has been understood that the first apparatus (e.g. device 16) may transmit the feedback message with the channel information 32 in a contention access period (CAP) at least for the first transmission (at the access to the network by the first apparatus 16). The contention access period (CAP) 11*a* may be as in FIG. 3 (see above). After the CAP 11*a*, the arrangement 15 may inform the new allocations (e.g., subdivided into superframes) with the message 33. Examples of the message 33 may include, for example, management frames and/or control frames. Examples of information provided by the message 33 are the first time slot granting information 710 and/or the dynamic, second time slot granting information 700. The message 33 may therefore be or include configuration information allocating grants to the device(s) 16. The message 33 may be sent before or after the subsequent beacon 11 of the subsequent period 21.

In general terms, the second apparatus (e.g. arrangement) 15 may provide allocation information on the time slots and/or the frontends 14*a* . . . 14*g* based on the channel state information provided by the plurality of the devices. For example, in FIG. 1, the second apparatus (e.g. communication arrangement) 15 will associate the frontends 14*a*, 14*b*, 14*c* to the device 16', the frontends 14*e*, 14*f*, 14*g* to the device 16", and no device at all to the frontend 14*b*. Analogously, the second apparatus (e.g. arrangement) 15 may arrive at the definition of the scheduling as in FIG. 3, e.g., by keeping into account the feedback obtained from the device(s) 16.

As explained above, the feedback 32 may be received from multiple devices 16 (e.g., 16' and 16"). Accordingly, the coordinator 12 of the second apparatus 15 may distribute the grantings (GTSs) for the CFP 11*b*. It is noted that the feedback 32 may refer to different channels 18*a* . . . 18*g*, when one device 16 has the capability of recognizing different beacon signals 11 as arriving from different channels 18*a* . . . 18*g* (and different frontends 14*a* . . . 14*g*). This is because it may be possible for each frontend 14*a* . . . 14*g* to relay the beacon signal by using different sequences (e.g., orthogonal sequences): hence, different relayed beacon signals may be determined and measured by the device 16. Hence, the feedback 32 may be provided for a plurality of received relayed versions of the beacon signal 11. On the basis of different feedback associated to different channels 18*a* . . . 18*g*, the coordinator 12 may perform an appropriated scheduling, and allocate the most appropriated superframe GTSs (including the most appropriated frontends 14*a* . . . 14*g*) to the devices which detect the best channels in association with the frontends. In examples, the frontends 14*a* . . . 14*g* are synchronized with each other for transmitting the beacon signals 11 simultaneously (some strategies for synchronization are described below).

The example of FIG. 6 is now discussed. A new, unknown first apparatus (e.g. an unknown device) 16 arriving in proximity to one of the frontends 14*a* . . . 14*g* may transmit at least one request of association 35 (e.g., 35', 35", 35''', etc.), in order to have the possibility of subsequently transmitting and/or receiving payload data with the second apparatus (e.g. arrangement 15), by having some GTSs assigned in the CFP 11*b*.

As the new first apparatus (e.g. device 16) (as being unknown) does not have GTSs assigned prior to association, there may be provided that the first apparatus 16 transmits an association request frame 35 in the CAP 11*a* (but not in the CFP 11*b*). Hence, the requesting device 16 may begin a CAP transmission procedure after preparing a frame containing the Association Request element In some examples, the requesting device 16 may include, in the request 35, the feedback 32, containing the channel information (CSI, SNR, etc.) obtained from the latest beacon reception in the same period 21.

After transmitting a first association request frame 35', the new first apparatus (e.g. device) 16 may continue to listen for an association response frame from the arrangement 15.

If no association response element is received within a pre-determined time limit, the new device 16 may reattempt association through sending the association request 35", 35''', etc. In FIG. 6, no association response frame has been detected. (It is noted that, in some examples, association requests may be transmitted also by other devices 16.)

In some examples, the association request 35 (35', 35", etc.) may be an example of the feedback message 32 (see FIG. 6, "association/reconnection+feedback"). Hence, in some examples, at least some of the features of feedback 32 may be the same of at least some of the features of the association request 35, and vice versa. In particular, the association request 35 may be an example of the feedback 32, and vice versa.

In other examples (FIG. 7), the feedback 32b (which is sent in the CFP 11b), is distinct from the association request 35 and the feedback message 32.

Summarizing, there may be provided a first apparatus (e.g. optical communication device) (16), configured to receive one or more reference signals and/or beacon signals (11) from one or more optical frontends (14a . . . 4g). The optical communication device (16) may be configured to determine (31) a channel information on the basis of the reception of the one or more reference signals and/or beacon signals. The optical communication device (16) may be configured to transmit the channel information (32) in a contention access period, CAP (11a), and, subsequently, to transmit the channel information (32b) in granted time slot(s) in the CFP (11b). As a response, GTSs 33 and/or GTS updates 33b of the CFP 11b may be assigned by the second apparatus (e.g. arrangement) 15 to the first apparatus (e.g., device).

Here above, reference has been mainly made to the situations in which the first apparatus 16 is unknown.

However, the same situation may occur when the first apparatus 16 loses the connection (e.g., transitorily, e.g. because an opaque object has been interposed between the first apparatus 16 and the frontends 14a . . . 14g of the second apparatus 15, for example). Hence, in alternative or in addition to the examples before, a same procedure may be carried out by a first apparatus 16 which has lost the connection with the second apparatus 15 and is trying to reconnect.

Accordingly, it may be possible to establish that:
the first communication apparatus (16) may transmit the channel information (32) or association request (35) in a contention access period, CAP (11a) at the association with a second communication apparatus (15) which has transmitted the one or more reference signals and/or beacon signals (11); and/or
the first communication apparatus (16) may transmit the channel information (32, 35) in a contention access period, CAP (11a), with a second communication apparatus (15) which has transmitted the one or more reference signals and/or beacon signals (11); and/or
the first communication apparatus (16) may transmit the channel information (32b) when a connection, with a second communication apparatus (15) which has transmitted the one or more reference signals and/or beacon signals (11), has already been established.

The second device (e.g. arrangement) 15 may be understood as being at the network-side. Hence, the "connection", "association", "reconnection", etc. ma also be understood as "connection with a network", "association with a network", "reconnection with a network", etc.

In general terms, the second apparatus (e.g. arrangement) 15 may admit (accept) the first communication apparatus 16 at the reception of the feedback 32 and/or at the reception of the request (35) of connection (or reconnection).

In addition or alternative, the second apparatus (e.g. arrangement) 15 may assign GTSs in the CFP 11b to the first apparatuses 16 which have sent the feedback 32, 32b and/or the request 35 of connection (or reconnection).

The Aspect II may be understood as referring, in some examples, to an optical communication device (e.g. a receiver), wherein the optical communication device is configured to receive one or more reference signals and/or beacon signals from one or more optical frontends [wherein the plurality of optical frontends are coordinated and/or synchronized with each other, e.g., by a coordinator which may be, for example, connected with a wired connection, e.g., ethernet-based]; wherein the optical communication device is configured to determine a channel information [e.g., CSI] [e.g., bound to the SNR] [e.g., a channel estimation, and/or a channel measurement] on the basis of the reception of the one or more reference signals and/or beacon signals [which may be or comprise, for example, a pilot sequence and/or signal which is known to the receiver]; wherein the optical communication device is configured to transmit the channel information [e.g. to one or more optical frontends from which the one or more reference signals and/or beacon signals were received, or to a coordinator coupled to the one or more transmitters] in a contention access period (CAP) [e.g., during which multiple optical communication devices are allowed to transmit without having allocated (granted) time slots] [e.g., the communication device may also request an association with the network to which the optical transmitters pertain in the same CAP].

The Aspect II may also be understood as referring to an optical communication method (e.g. at a receiver, such as an optical communication device), including at the optical communication device, receiving one or more reference signals and/or beacon signals from one or more optical frontends [wherein the plurality of optical frontends are coordinated and/or synchronized with each other, e.g., by a coordinator which may be, for example, connected with a wired connection, e.g., ethernet-based];
at the optical communication device, determining a channel information [e.g., CSI] [e.g., bound to the SNR] [e.g., a channel estimation, and/or a channel measurement] on the basis of the reception of the one or more reference signals and/or beacon signals [which may be or comprise, for example, a pilot sequence and/or signal which is known to the receiver];
from the optical communication device, transmitting the channel information [e.g. to one or more optical frontends from which the one or more reference signals and/or beacon signals were received, or to a coordinator coupled to the one or more transmitters] in a contention access period (CAP) [during which multiple optical communication devices are allowed to transmit without having allocated (granted) time slots] [the device may also request an association with the network to which the optical transmitters pertain in the same CAP].

The Aspect II may also be understood as referring to an optical communication arrangement [e.g. a device with optical frontends, e.g. for transmitting and/or receiving signals to and from communication device(s)], which may be, for example, coordinated by a coordinator, which may be connected to the frontends by a wired networks, for example), wherein the optical communication arrangement is configured to send one or more reference signals and/or beacon signals [e.g., pilot sequences which may be already known by the receiving communication devices] from one or more optical frontends [wherein the plurality of optical frontends are coordinated and/or synchronized with each other, e.g., by a coordinator which may be, for example, connected with a wired connection, e.g., ethernet-based]; wherein the optical communication arrangement is configured to receive the channel information in a contention access period (CAP) [e.g., during which multiple optical communication devices are allowed to transmit without having allocated (granted) time slots].

The Aspect II may also be understood as referring to an optical communication method (e.g., at a optical communication arrangement including a plurality of optical frontends) including:
sending one or more reference signals and/or beacon signals [e.g., pilot sequences which may be already known by the receiving communication devices] from one or more optical frontends [wherein the plurality of optical frontends are coordinated and/or synchronized with each other, e.g., by a coordinator which may be, for example, connected with a wired connection, e.g., ethernet-based];
receiving the channel information in a contention access period (CAP) [e.g., during which multiple optical communication devices are allowed to transmit without having allocated (granted) time slots].

Aspect III

Here, for "device" may be generalized to "first apparatus (16)", and "arrangement" may be generalized to "second apparatus (15)", even if in variants they may be exchanged. The frontends may be optical frontends. The device 16 may be a mobile device. the arrangement may be fixed and the frontends of the arrangement may be distributed. The coordinator 12 or central unit may be an intelligent part of the arrangement.

Figure 2:
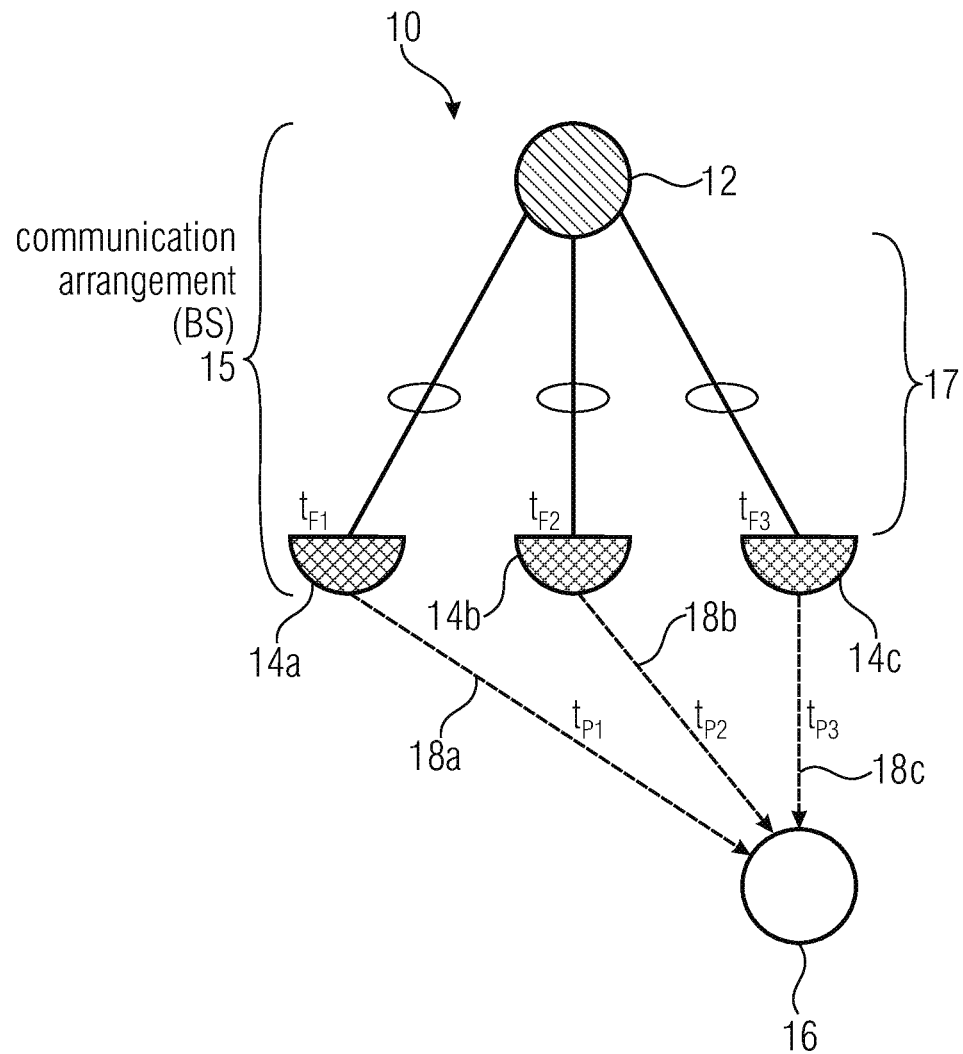

By virtue of the presence of multiple frontends 14a . . . 14g (e.g., optical frontends), there arises the possibility that different frontends 14a . . . 14g incorrectly transmit signals (e.g., the beacon signals 11) at different time instants. This could bring to unwanted errors when transmitting from the arrangement 15 to the device(s) 16 or vice versa. An example is shown in FIG. 2: each transmission 18a, 18b, 18c suffers a propagation delay $t_{P1}$, $t_{P2}$, $t_{P3}$ and fronthaul delays $t_{F1}$, $t_{F2}$, $t_{F3}$ and the fronthaul 17. The issue is exacerbated by the fact that the device(s) 16 may be movable, which may drive to an unpredictable delay for the communications from the different frontends 14a . . . 14g.

It has been understood however, that these issues may be diminished or overcome by using a coordinator or central unit 12 configured to:
command a transmission of a reference signal and/or a beacon signal (11) to the plurality of optical frontends (14a . . . 14g); and/or
obtain a channel information (32) measured by an optical communication device (16); and/or
on the basis of the channel information, synchronize the optical frontends (14a-14g).

An example is now provided by FIG. 2. The beacon 11 (or more in general, the reference signal) may include or be associated to multi-cell channel estimation symbols. The multi-cell channel estimation symbols may be different for different frontends. Different frontends 14a . . . 14g may relay the beacon 11 by using different symbols. The symbols may be associated to orthogonal sequences (e.g., for multiple input/multiple output, MIMO, in some filed of the beacon or of a transmission associated to the beacon). At this point, each device 16 may measure the delay of the transmission received from each frontend. With reference to the example of FIG. 2, the device 16 observes a delay $t_{P1}+t_{F1}$ for the beacon version obtained from the frontend 14a, which is larger than the delay $t_{P2}+t_{F2}$ observed for the bacon signal as obtained from the frontend 14b, which is in turn larger than the delay $t_{P3}+t_{F3}$ of the transmission from the frontend 14c. As the transmission from each frontend 14a, 14b, 14c can be recognized (e.g., by virtue of the use of orthogonal sequences or by other methods), the device 16 may arrive at determining the measurement of the delay.

Accordingly, after having performed the measurements (which may be the measurement 31 of FIG. 5), the device 16 may transmit a feedback 32 (e.g., CSI feedback and/or SNR feedback, etc.) in which the delay of each transmission 18a-18c from each frontend 14a-14c is provided (e.g., encoded in a particular frame).

Subsequently, the arrangement 15 (and in particular, the coordinator or central unit 12) may synchronize the different frontends 14a . . . 14g so that the transmissions from the frontends suffering comparatively higher delay (e.g., frontend 14a in FIG. 2) are transmitted slightly before the transmissions performed by the frontends suffering comparatively less delay (e.g., frontend 14c). In general, the transmissions of the frontends suffering of higher delays may be anticipated in proportion to the observed delay.

An operation of the central unit or coordinator 12 is now discussed.

At first, the coordinator 12 may, through the fronthaul 17, the transmission of a reference signal (e.g., a beacon) 11 to all the frontends 14a . . . 14c. For the initial transmissions, an initial coarse synchronization may be performed, e.g., by using a PTP (precision time protocol IEEE1588 V2, for example) or another internet-based protocol.

The optical frontends 14a . . . 14c may relay the coarsely synchronized reference signals and/or beacon signals as obtained from the fronthaul 17. Hence, different beacon version may be transmitted along different channels 18a . . . 18c.

The device 16 (and/or any of the other devices which may be transmitting to and/or receiving signals with the communication arrangement 15) may measure (e.g., at 31) the delays impairing each of the received beacon versions through the different channels 18a . . . 18c.

Accordingly, the device 16 transmits the feedback 32 including the channel state information for each of the channels respectively associated to the frontend 14a, 14b, 14c, e.g. based on the performed measurements 31.

The coordinator 12 may receive, through the frontends 14a, 14b, 14c and the backhaul 17, the CSI information encoded in the feedback 32. Accordingly, the coordinator 12 knows the delays that have impaired each beacon version from the coordinator 12 through the fronthaul 17, the optical frontends 14a, 14b, 14c, the channel 18a, 18b, 18c, and up to the device 16. The coordinator 12 may also make use of its own clock for confirmation of the delays as measured by the device 16 (as the delay $t_{F1}+t_{P1}$ is greater than $t_{F3}+t_{P3}$ when measured by the device 16, the same is true for the delay in the inverse direction.

The Aspect III may be understood as referring, in some examples, to a central unit (12) [e.g., operating as a coordinator][e.g., a device for commanding transmissions and/or receptions to and from a plurality of optical frontends (14a-14g)], configured to:
 command a transmission of a reference signal and/or a beacon signal (11) to the plurality of optical frontends (14a-14g);
 obtain a channel information (32) measured by an optical communication device (16) (e.g., a receiver and/or a mobile device), [the channel information being relayed by the frontends (14a-14g), e.g.,]
 on the basis of the channel information, synchronize the optical frontends (14a-14g) [e.g., by delaying the late frontends (14a-14g)].

The Aspect III may be understood as also referring to optical communication arrangement [e.g., a coordinator] for transmitting and/or receiving through a plurality of optical frontends (14a-14g), configured to:
 Transmit a reference signal and/or a beacon signal through the optical frontends (14a-14g) to one or more communication devices [e.g., optical receivers];
 Obtain a channel information measured by the optical communication device (16), [the channel information being relayed by the frontends (14a-14g)]
 On the basis of the channel information, synchronize the optical frontends (14a-14g) [e.g., by delaying the late frontends (14a-14g)]
[optionally, an initial coarse synchronization may be performed by the central unit to the optical frontends (14a-14g) e.g. by a protocol such as, for example, PTP or another Ethernet-based protocol]
[The Arrangement May Include the Central Unit, in Examples]

The Aspect III may also be understood as referring to a comprising the communication arrangement and at least one optical communication device (16) as above.

The Aspect III may also be understood as referring to a method [e.g., at a coordinator and/or a device for commanding transmissions and/or receptions to and from a plurality of optical frontends (14a-14g)], including:
 Commanding a transmission of a reference signal and/or a beacon signal to the plurality of optical frontends (14a-14g);
 Obtaining a channel information measured by an optical communication device (16) (e.g., a receiver and/or a mobile device), [the channel information being relayed by the frontends (14a-14g), e.g.,]
 On the basis of the channel information, synchronizing the optical frontends (14a-14g) [e.g., by delaying the late frontends (14a-14g)] The Aspect III may also be understood as referring to an optical communication method [e.g., at a coordinator] for transmitting and/or receiving through a plurality of optical frontends (14a-14g), configured to:
 Transmitting a reference signal and/or a beacon signal through the optical frontends (14a-14g) to one or more communication devices [e.g., optical receivers];
 Obtaining a channel information measured by the optical communication device (16), [the channel information being relayed by the frontends (14a-14g)]
 On the basis of the channel information, synchronizing the optical frontends (14a-14g) [e.g., by delaying the late frontends (14a-14g)] [optionally, an initial coarse synchronization may be performed by the central unit to the optical frontends (14a-14g) e.g. by a protocol such as, for example, PTP or another Ethernet-based protocol]

BIBLIOGRAPHY

1 L. Cosart, "Precision Packet Delay Measurements Using IEEE 1588v2," 2007 *IEEE Int. Symp. on Precision Clock Synchronization for Measurement, Control and Communication*, Vienna, 2007, pp. 85-91.
2 R. L. Scheiterer, C. Na, D. Obradovic, G. Steindl, F.-J. Goetz, "Synchronization Performance of the Precision Time Protocol in the Face of Slave Clock Frequency Drift," 4th IEEE Conference on Automation Science and Engineering, Key Bridge Marriott, Washington D.C., USA, Aug. 23-26, 2008.

Aspect IV

Here, for "device" may be generalized to "first apparatus (16)", and "arrangement" may be generalized to "second apparatus (15)", even if in variants they may be exchanged. The frontends may be optical frontends. The device 16 may be a mobile device. the arrangement may be fixed and the frontends of the arrangement may be distributed. The coordinator 12 or central unit may be an intelligent part of the arrangement.

Hereinbelow there is discussed a technique to provide a channel state information (CSI), e.g., from the device 16 (16', 16", A, B, C, D) to the arrangement 15 (and in particular to the coordinator 12). The technique is compatible with any of the aspects I, II, III above, in some examples.

For example, the CSI (e.g., encoded in one feedback message such as 32 or 32b or 35) may be obtained by the device 16 by performing measurement(s) 31 on the beacon 11 (or more in general on a reference signal). The beacon or reference signal 11 may present a pre-established pilot sequence whose received version (as received by the device 16) may be subjected to a measurement 31. In some examples, the measurement(s) 31 may contribute to obtain a signal (e.g., an impulse response) which may be compared (e.g., by the coordinator 12) with a stored signal (e.g., a stored version of the impulse response), so as to determine the quality of the beacon 11 (and of the channel 18, consequently). In some examples, a CSI may be measured for each version of the beacon 11 as received from each frontend 14a . . . 14g (e.g., the device 16 may have the capability of distinguishing the different simultaneous versions of the beacon 11; the different frontends 14a . . . 14g may have the capabilities of simultaneously relaying the different versions of the beacon 11 by using different sequences, e.g., different orthogonal sequences). The CSI as measured may be provided to the arrangement 15, e.g. as part of the feedback message 32 of FIG. 5 (or as part of another feedback message sent by the device 16 to the arrangement 15).

Accordingly, the coordinator or central unit 12 may know the CSI as measured by each device 16 and may use this information for performing the scheduling. For example, the coordinator 12 may reconstruct an impulse response of the beacon 11 as received and determine, on the basis thereof, the quality of the channel 18.

Since the coordinator 12 may obtain, from a plurality of the devices 16 (e.g., 16', 16", A, C, C, D, etc.), a CSI for each of a plurality of frontends 14a . . . 14g, the coordinator 12 may obtain the knowledge of the quality of each channel 18a . . . 18g for each device 16 and each frontend 14a . . .

14g. With reference to the example of FIG. 1, the CSIs measured by the device 16' for the channels 18a . . . 18c associated to the frontends 14a . . . 14c will verisimilarly be indicative of a better channel condition than the CSIs measured by the same device 16' for the channels associated to the frontends 14d . . . 14g (it is even possible that the device 16' does not even recognize a beacon version 11 from some of the frontends 14d . . . 14g, as a consequence of the large distance). Accordingly, when the coordinator 12 obtains the feedback messages 32 or 32b or 35, the coordinator 12 will advantageously assign the superframe slots of the frontends 14a . . . 14c to the device 16' (and, analogously, the superframe slots of the frontends 14d . . . 14g to the device 16").

In general terms, in order to provide the measured CSI, the device 16 could send a feedback message 32 or 32b or 35 encoding a high-resolution copy of the beacon 11 as received, e.g. sample-by-sample. However, this solution would entail too much payload, as all the samples of all the received versions of the beacon signals 11 should be encoded and transmitted to the arrangement 15.

Notwithstanding, it has been understood that it is possible for the device 16 to compress information such as CSI and submit the latter in compressed format. For example, if CSI is measured in the frequency domain (FD), the device 16 may perform at least one of:
  transform the CSI from the FD to the time domain (TD), to obtain a TD CSI;
  encode the TD CSI; and
  transmit the TD CSI (e.g., as feedback message 32 or 32b or 35) to one or more frontends 14a . . . 14g, so that the latter relays it to the coordinator 12.

Figure 8:
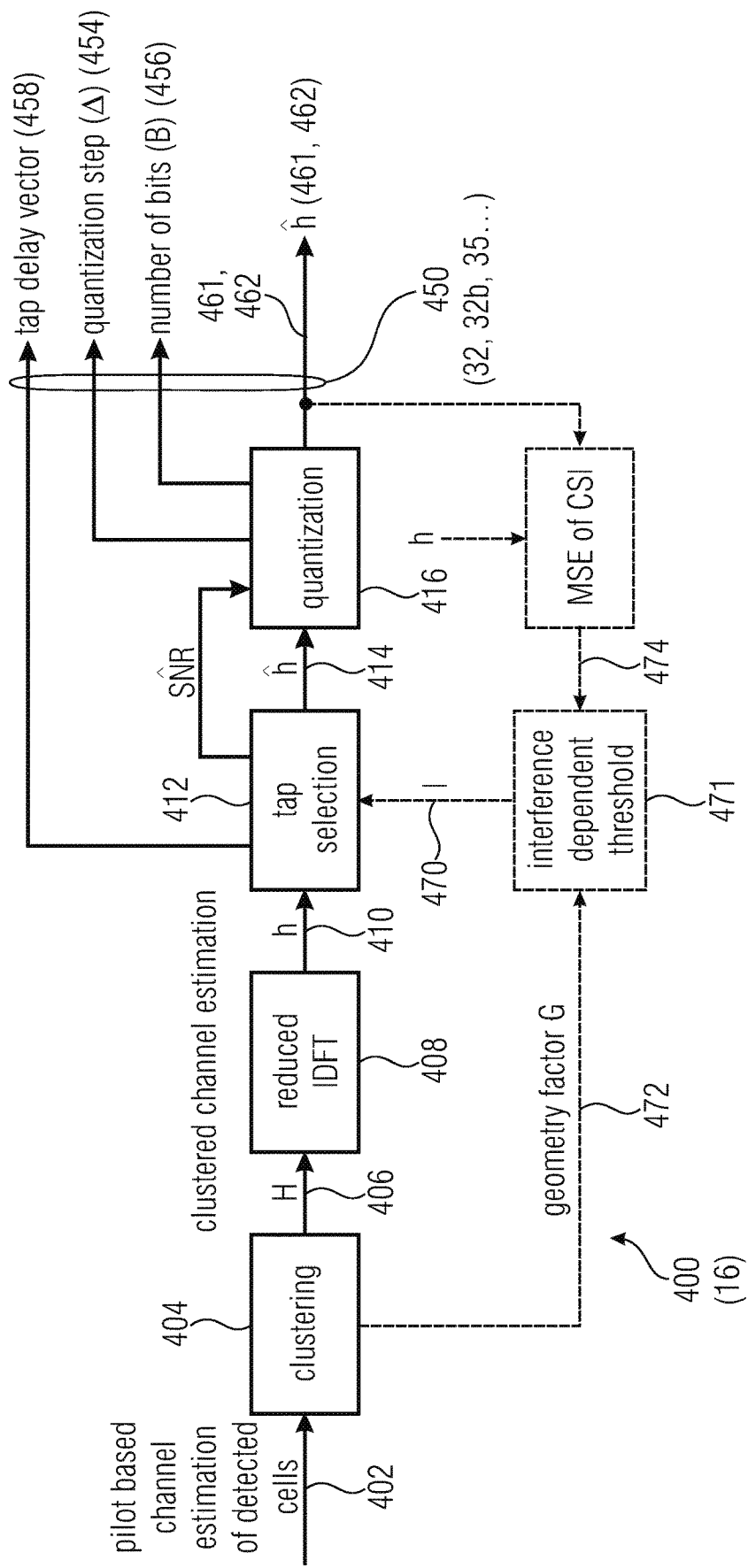
FIG. 8 shows an example of a unit of apparatus.
Figure 9:
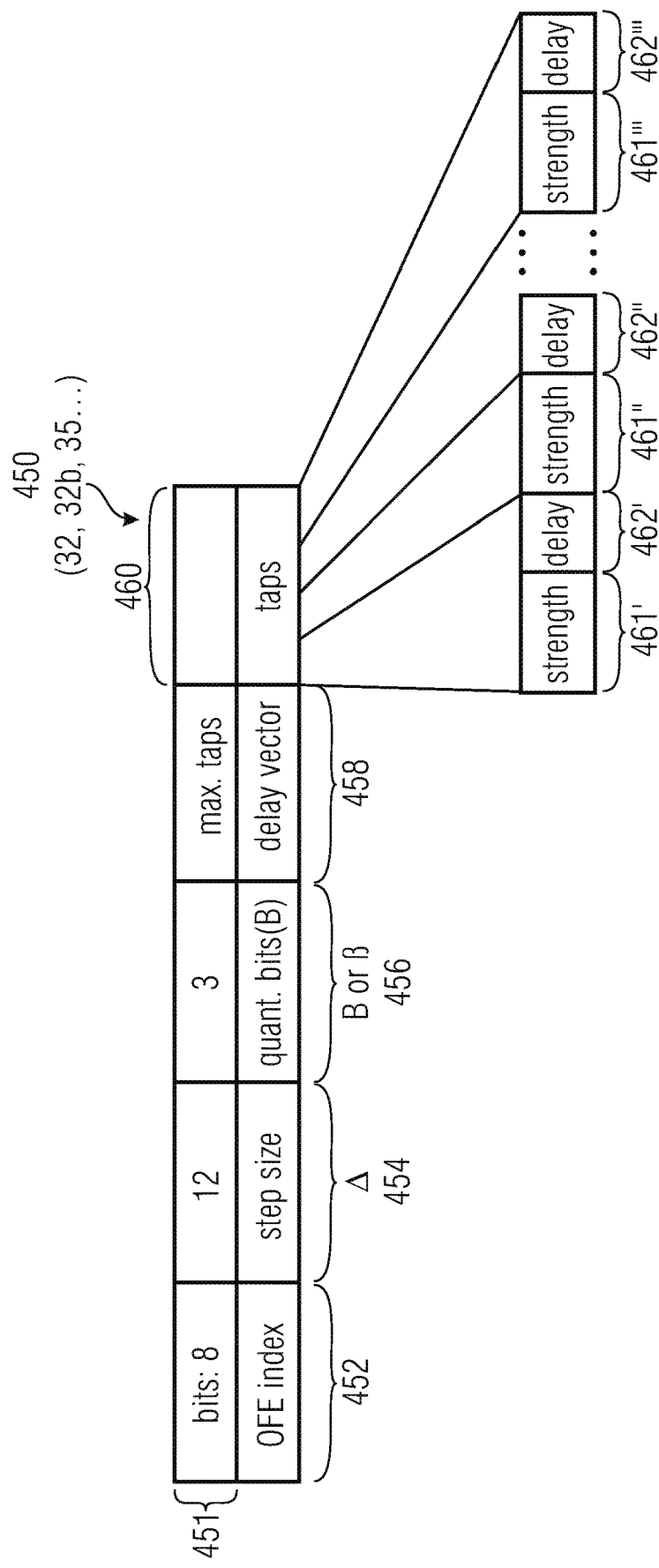
FIG. 9 shows an example of a frame.

FIG. 8 shows an example of a unit 400 (which may be part of the device 16) for measuring and/or and encoding an example of CSI. FIG. 9 shows an example of the data packet 450 encoding the CSI. The data packet 450 may be an example of, or part of, the feedback message 32 of FIG. 5 (or 32b of FIG. 7 or 35 of FIG. 6).

The device 16 may receive several versions of the beacon 11 from different frontends 14a . . . 14g through respective channels 18a . . . 18g.

The device 16 may measure a FD CSI for the pilot signal of a beacon 11 (or another kind of reference message transmitted from the arrangement to the device 16).

At block 404, the device 16 may perform a clustered channel estimation to obtain a version 406 of the channel as measured from the beacon 11 as obtained from each of the plurality of frontends 14a . . . 14g. Accordingly, different versions 406 of the beacon 11 (also indicated with H) as received from different frontends 14a . . . 14g may be obtained. In some examples, only some of the versions of the beacons 11 are actually measured by each device 16: the CSI is not provided for the versions of the beacons 11 which are not received (e.g., because there is an obstacle obstructing the channel 18 or because they are too far away), and these version of beacon 11 could also be non-recognized (e.g., by virtue of having an excessive number of errors) or could be recognized as being invalid (e.g., by virtue of having too low power, e.g., under a minimum threshold). With reference to FIG. 1, it may be imagined that the device 16' will only start measuring the CSI for channels 18a, 18b, 18c, while the device 16" will only start measuring the CSI for channels 18e, 18f, 18g. Therefore, only some versions of beacon 11 may be measured by each device 16.

At block 408, the device 16 may perform a conversion from FD to TD. For example, an inverse discrete Fourier transform, IDFT, may be applied. Accordingly, a TD version 410 (also represented as h) of the CSI for each version of the remaining versions of the beacon 11 is obtained.

For each of the remaining channels, it is possible, at block 412, to subdivide the TD representation of each beacon version (as received from a particular frontend) by using a representation in terms of taps. Each TD signal 410 may therefore be represented as a sequence of taps. Each tap may be understood as a particular sample value or a sequence of sample values, in the time domain, of the impulse response. Instead of providing each signal 410 sample-by-sample, the device 16 may encode, in the feedback signal 410 (e.g., 32 or 32b or 35), a value associated to the amplitude (e.g., at least one of strength, power, energy, etc.) and/or the delay of the tap in the impulse response as received.

In examples, only the most important taps 414 (e.g., those with highest amplitude and/or strength and/or power and/or energy) may be chosen, while the remaining taps may be discarded. In examples, non-zero taps are selected, while zero taps (or taps with negligible amplitude) are discarded. For deciding whether choose or discard the tap, the amplitude (or strength, or energy or power) may be compared with a particular threshold 470. Hence, only the most important taps (non-zero taps) are selected. (The threshold 470 may be an interference dependent threshold, and/or may be defined dynamically at block 471, e.g., on the basis of a geometry factor G, 472, and/or on feedback 474, such as delay and/or strength values, as obtained by the unit 400.)

Then, a quantization may be performed at block 416 on the most important taps 414. For example, a quantization step $\Delta$ and/or a number of quantization bits B (or $\beta$) may be defined. With the quantization, a compression may be obtained for providing a quantized signal which describes properly the taps.

Subsequently, the values of the amplitude (or strength, or energy or power, etc.) of each of the selected taps and/or their delay may be encoded in the feedback message 450 (32 or 32b or 35) and provided to the arrangement 15 (e.g., to the coordinator 12 through frontends 14 and the fronthaul 17).

An example of operations of the device 16 (e.g., by the unit 400) is here discussed.

At first, the device 16 (e.g., 16', 16", A, B, C, D, etc.) may receive a plurality of beacon versions of the beacon 11 from a plurality of frontends 14a . . . 14g through a plurality of channels 18a . . . 18g. In general, not all the beacon versions are necessarily received or recognized by the device 16, and the subsequent steps only refer to those recognized beacon versions. (E.g., beacons from distant frontends may are not received, or are so noisy that they are not recognized or discarded.)

Then, among the received or recognized channels, only some channels may be chosen (e.g., by block 404). The choice may be performed on the basis of measurement(s) 31, e.g., on the basis of the comparison of power or strength measurements carried out on the beacon signal as received from each frontend. A clustered channel estimation may therefore be performed.

Then, the most important taps may be selected (e.g., by comparing their amplitude, strength, power, energy, etc. with a threshold 470), e.g., by block 412.

Then, the selected taps may be quantized, e.g., by block 416.

Then, the quantized information on the delay and/or strength (e.g., amplitude, energy, power, etc.) of the selected taps may be encoded (e.g., as feedback message 32, 32b, 35, 450, etc.) and transmitted to the coordinator 12 (e.g., through the frontends 14a . . . 14g).

FIG. 9 shows an example of the feedback message 450 (e.g., feedback 32, 32b, 35, etc.), encoding CSI, to be provided to the coordinator 12. Numeral 451 refers to possible bit quantities (different quantities are possible). Some of the fields which could be encoded (also in a different order) are discussed below.

Numeral 452 refers to the index of a particular frontend as recognized. Accordingly, the coordinator 12 will know that the CSI refers to the beacon version as received from a particular frontend.

Numeral 454 refers to the step size (quantization step Δ).

Numeral 456 refers to the number of quantization bits (B or β).

Numeral 458 refers to delay information. In particular, a delay vector may be provided. The delay vector may be a delay vector bitmap. It may be provided that each $n^{th}$ position in the delay vector bitmap corresponds to the $n^{th}$ tap. Therefore, the delay vector bitmap may indicate whether the $n^{th}$ tap in the received pilot sequence is one of the selected taps (most important taps) for which the strength and/or the delay are indicated. The delay vector bitmap may be 1 (or 0 in other examples) if it corresponds to a selected tap (non-zero tap), and may be 0 (or 1 in other examples) if it corresponds to a non-selected tap (zero tap), e.g., on the basis of the result of the selection as performed at block 412.

Numeral 460 (tap descriptor) refers to a to quantized information on the strength and/or delay of each of the selected (non-zero) taps. For each of the selected taps as indicated in the delay vector, there may be provided an indication ("tap descriptor element") on the strength (or amplitude, power, energy . . . ) 461', 461", 461''', etc., and/or delay information 462', 462", 462''', etc.

In examples, the bitlength of the field 460 is not pre-determined: this is because it is not pre-defined how many taps are to be described in the message 450 (32).

In view of the above, the coordinator 12 may obtain the feedback message 32 including the channel information and perform at least one of the following steps:
 receive a CSI (32) encoded so as to comprise:
  a string (e.g., the bitmap 458) of second values (e.g., "1") and first values (e.g., "0"), each being associated to a time domain representation of the CSI;
  for each second value ("1") in the string (458), an encoded value (e.g., the strength 461 and/or the delay 462) of the amplitude of the time domain representation at the particular sample;
  for each first value ("0") in the string (458), no sample value being encoded and being considered as 0; and
  reconstruct the CSI on the basis of the sample values (461) associated to the second values.

According to this procedure, the coordinator 12 may perform the scheduling.

In examples, each CSI is obtained from each of a plurality of devices 16, and each CSI from each device 16 refers to a particular beacon version 11 as relayed from each particular frontend among the chosen channels (e.g., chosen by block 404).

Accordingly, the coordinator 12 may appropriately assign the frontends so that frontends are advantageously assigned to the devices which measure good quality for the beacon versions received from those frontends.

In the example of FIG. 8 there is shown that delay information is provided as both a delay vector 458 and an encoded delay field 462. However, this is not strictly necessary: in some examples, either the delay vector 458 or the encoded delay field 462 may be missing, hence reducing the amount of bits.

The Aspect IV may related to an optical communication device (16) for the communication with an optical communication arrangement, configured to:
 Obtain a [e.g., frequency-domain] channel state information (e.g., CSI) from the reception of one or more reference signals and/or beacon signals [e.g. pilot signals and/or sequences] from one or more optical frontends (14a . . . 14g) [for example, such that a plurality of real-valued or complex-valued channel state values are associated with different frequency ranges];
 Transform the channel state information from a frequency domain to a time domain [with many taps, and/or with many samples], to obtain a time domain channel state information [for example, to thereby reconstruct a channel impulse response];
 Encode the time domain channel state information; and
 Transmit the time domain channel state information to one or more optical transmitters.

The Aspect IV may also relate to an optical communication arrangement for the communication with an optical communication device (16), configured to:
 Receive a CSI encoded so as to comprise:
  A string of "1" values and "0" values (or other symbols), each being associated to a time domain representation of the CSI;
  For each "1" value in the string [e.g., associated to a strong signal], an encoded value of the amplitude of the time domain representation at the particular sample [tap];
  For each "0" value [e.g., associated to a weak signal], no sample value being encoded and being considered as 0; and
 Reconstruct the CSI on the basis of the sample values [taps] associated to the 1 values.
[In examples, only the signals of the strongest frontends (14a . . . 14g), based on a threshold value, are selected for the feedback generation.]

The Aspect IV may also relate to an optical communication method for the communication of an optical communication device (16) with an optical communication arrangement, including:
 Obtaining a [e.g., frequency-domain] channel state information (e.g., CSI) from the reception of one or more reference signals and/or beacon signals [e.g. pilot signals and/or sequences] from one or more optical frontends (14a . . . 14g) [for example, such that a plurality of real-valued or complex-valued channel state values are associated with different frequency ranges];
 Transforming the channel state information from a frequency domain to a time domain [with may taps, and/or with many samples], to obtain a time domain channel state information [for example, to thereby reconstruct a channel impulse response];
 Encoding the time domain channel state information; and
 Transmitting the time domain channel state information to one or more optical frontends (14a . . . 14g) (e.g., optical transceivers).

The Aspect IV may also relate to an optical communication method for the communication between an optical communication arrangement and an optical communication device (16), comprising:

Receiving a CSI encoded so as to comprise:
  A string of "1" values and "0" values, each being associated to a time domain representation of the CSI;
  For each "1" value in the string, an encoded value of the amplitude of the time domain representation at the particular sample [tap];
  For each "0" value, no sample value being encoded and being considered as 0;
Reconstructing the CSI on the basis of the sample values [taps] associated to the "1" values.

The aspect IV may be understood as referring to an optical communication device for the communication with an optical communication arrangement, configured to:
  Obtain a [e.g., frequency-domain] channel state information (e.g., CSI) from the reception of one or more reference signals and/or beacon signals [e.g. pilot signals and/or sequences] from one or more optical frontends [for example, such that a plurality of real-valued or complex-valued channel state values are associated with different frequency ranges];
  Transform the channel state information from a frequency domain to a time domain [with may taps, and/or with many samples], to obtain a time domain channel state information [for example, to thereby reconstruct a channel impulse response];
  Encode the time domain channel state information; and
  Transmit the time domain channel state information to one or more optical transmitters.

The aspect IV may be understood as referring to an optical communication arrangement for the communication with an optical communication device, configured to:
  Receive a CSI encoded so as to comprise:
    A string of "1" values and "0" values (or other symbols), each being associated to a time domain representation of the CSI;
    For each "1" value in the string [e.g., associated to a strong signal], an encoded value of the amplitude of the time domain representation at the particular sample [tap];
    For each "0" value [e.g., associated to a weak signal], no sample value being encoded and being considered as 0; and
  Reconstruct the CSI on the basis of the sample values [taps] associated to the 1 values.
[In examples, only the signals of the strongest frontends, based on a threshold value, are selected for the feedback generation.]

The aspect IV may be understood as referring to an optical communication method for the communication of an optical communication device with an optical communication arrangement, including:
  Obtaining a [e.g., frequency-domain] channel state information (e.g., CSI) from the reception of one or more reference signals and/or beacon signals [e.g. pilot signals and/or sequences] from one or more optical frontends [for example, such that a plurality of real-valued or complex-valued channel state values are associated with different frequency ranges];
  Transforming the channel state information from a frequency domain to a time domain [with may taps, and/or with many samples], to obtain a time domain channel state information [for example, to thereby reconstruct a channel impulse response];
  Encoding the time domain channel state information; and
  Transmitting the time domain channel state information to one or more optical frontends (e.g., optical transceivers).

The aspect IV may be understood as referring to an optical communication method for the communication between an optical communication arrangement and an optical communication device, comprising:
  Receiving a CSI encoded so as to comprise:
    A string of "1" values and "0" values, each being associated to a time domain representation of the CSI;
    For each "1" value in the string, an encoded value of the amplitude of the time domain representation at the particular sample [tap];
    For each "0" value, no sample value being encoded and being considered as 0;
  Reconstructing the CSI on the basis of the sample values [taps] associated to the "1" values.

Aspect V

Here, "device" may be generalized to "first apparatus (16)", and "arrangement" may be generalized to "second apparatus (15)", even if in variants they may be exchanged. The frontends may be optical frontends. The device 16 may be a mobile device. the arrangement may be fixed and the frontends of the arrangement may be distributed. The coordinator 12 or central unit may be an intelligent part of the arrangement.

A variant to the Aspect IV is here discussed.

Here, reference is in particular made to a device [e.g., the first apparatus 16, which may be transmitter, e.g., mobile device, e.g., an optical transmitter] configured to:
  receive a plurality of (e.g. simultaneous) reference signals (e.g., beacons) 11 from a plurality of [e.g. optical] frontends [e.g., OFEs] 14a . . . 14g; and/or
  obtain a channel state information, CSI (e.g., after measurements 31), based on an evaluation of the received reference signals 11,
  encode the CSI, in order to provide an encoded CSI; and
  provide [e.g. signal] information [e.g. TAP format] describing a selection of an encoding resolution used for encoding the CSI, out of a plurality of possible encoding resolutions.

The CSI may be encoded, for example as in FIGS. 8 and/or 9 (e.g., in particular in fields 461 and/or 462).

Here, for CSI it may be indented the feedback message (e.g., 32, 32b, 35, 450, 450b, etc.) containing information on the channel.

It has been understood that it is possible for each first apparatus 16 transmits the CSI by using a particular format. An example is provided by the following table:

| Format | Strength | Delay |
| --- | --- | --- |
| First format | Bits: 8<br>0 value: 0 dBm<br>step: 0.15 dBm | Bits: 16<br>0 value: 0 ps<br>step: 30 ps |
| Second format | Bits: 4<br>0 value: 0 dBm<br>step: 2 dBm | Bits: 8<br>0 value: 0 ns<br>step: 4 ns |
| Third format | Bits: 8<br>0 value: 0 dBm<br>step: 0.15 dBm | Bits: 8<br>0 value: 0 ns<br>step: 4 ns |
| Fourth format | Bits: 6<br>0 value: 0 dBm<br>step: 0.625 dBm | Bits: 10<br>0 value: 0 ns<br>step: 1 ns |

At least one of these formats may be used (other formats may be used).

In the CSI or feedback message (e.g., 32, 32b, 35, 450, 450b, etc.), there may be at least one of the following fields:
- field 901: Number N of recognized frontends;
- field 902: TAP Format;
- field 920: Frontend feedback descriptor element 1 . . . N (as many as indicated in field 901).

Each field 920 (Frontend feedback descriptor element) may include at least one of:
- field 921: pilot symbol number associated to the temporal position of the pilot sequence;
- field 922: pilot division (e.g., Hadamard coding, subcarrier spacing, etc.);
- field 923: number of taps, indicating how many taps are being subsequently described;
- field 460b: tap descriptor (providing information on each described tap).

Each field 460b (for describing one particular tap) may include at least one of:
- field 461b (strength or amplitude or power or energy of the tap);
- field 462b (delay of the tap), It has been understood that it is possible to encode, in fields 461b and 462, quantities e.g., in dBm or in ps or ns (picoseconds or nanoseconds) with determined resolutions. For example, in order to describe the strength of a tap, in some cases a particular resolution with a step of 0.15 dBm is of advantage while in some other cases a particular resolution with a step of 2 dBm is of advantage. For a similar reason, in order to describe a delay, it is sometimes of advantage to use a resolution of 30 ps, while in other cases it may be of advantage to use a resolution of 4 ns. In some cases, a reference value (e.g., "0 value", an offset, etc.) may be provided. In some cases, for encoding the field 461b and/or 462b, it is of advantage to use 8 bits, while is some cases 4 bits are enough or in other cases 10 bits are necessary.

Hence, different formats may be used. Each first apparatus 16 may select the format e.g., encoding resolution) and signal the format in field 902. Accordingly, when the second apparatus 15 decodes the field(s) 461b and/or 462b, it may obtain the feedback measurement with the necessary precision and with high degree of compression.

It has been understood that different configurations for the field(s) 461b and/or 462b may be grouped with each other. It is possible for the first apparatus 16 to make use of a selection of encoding resolutions, which may be combined with each other for each selection. Different codes of field 902 may be associated to different section, each combining configuration data for describing the taps. Field 902 may encode an index which refers to all the configuration data of the selected encoding resolution. For example:

| Format | Strength | Delay |
|---|---|---|
| First format | Bits: 8<br>0 value: 0 dBm<br>step: 0.15 dBm | Bits: 16<br>0 value: 0 ps<br>step: 30 ps |
| Second format | Bits: 4<br>0 value: 0 dBm<br>step: 2 dBm | Bits: 8<br>0 value: 0 ns<br>step: 4 ns |
| Third format | Bits: 8<br>0 value: 0 dBm<br>step: 0.15 dBm | Bits: 8<br>0 value: 0 ns<br>step: 4 ns |
| Fourth format | Bits: 6<br>0 value: 0 dBm<br>step: 0.625 dBm | Bits: 10<br>0 value: 0 ns<br>step: 1 ns |

For each format of the field 461b, there may be defined at least one of:
- a number of bits 931;
- a reference value 932;
- a step 933.

For each format of the field 462b, there may be defined at least one of:
- a number of bits 941;
- a reference value 942;
- a step 943.

The first apparatus 16 may therefore select a most advantageous resolution (format) on the basis of the obtained measurements, and encode the CSI according to the selected most advantageous resolution. The fields 461b and 462 are therefore quantized so as to provide a good resolution and precision and a high degree of compression.

It is to be noted that, in some examples, the information describing the selection of the encoding resolution includes the format of the field(s) encoding the amplitude and/or strength and/or the delay(s) of multiple propagation paths and/or a value associated thereto.

The second apparatus 15 (e.g., coordinator) may perform at least one of:
- receive the encoded channel state information, CSI (e.g., a feedback message 32, 32b, 35, or the message encoded as 450, 450b);
- receive a information (902) describing a selection of an encoding resolution used for encoding the CSI (32, 32b, 35, 450, 450b), out of a plurality of possible encoding resolutions;
- decode the encoded CSI (32, 32b, 35, 450, 450b) in dependence on the information (902) describing a selection of an encoding resolution used for encoding the CSI.

The second apparatus 15 may perform the scheduling on the basis of the feedback information as obtained from the CSI.

In examples above, some aspects relate to a device [e.g., transmitter, e.g., mobile device, e.g., an optical transmitter] configured to:
- receive a plurality of reference signals from a plurality of [e.g. optical] frontends [e.g., OFEs];
- obtain a channel state information, CSI, based on an evaluation of the received reference signals,
- encode the CSI, in order to provide an encoded CSI; and/or
- provide [e.g. signal] information [e.g. TAP format] describing a selection of an encoding resolution used for encoding the CSI, out of a plurality of possible encoding resolutions.

The device may be further configured so that information [e.g. TAP format] describing the selection of the encoding resolution includes the format of the field(s) encoding the strength and/or the delay(s) of multiple propagation paths and/or a value associated thereto.

The device may be further configured so that the CSI includes or is associated to a reference signal identification information, and/or wherein the information [e.g. TAP format] describing the selection of the encoding resolution is associated to a reference signal identification information.

The device may be further configured so that the information describing the encoding resolution defines the number of bits used for encoding tap strength and/or number of bits used for encoding tap delay.

The device may be further configured so that the information describing the encoding resolution defines a step size [e.g., 0.15 dBm or 30 ps] of tap strength and/or of delay.

The device may be further configured so that the information describing encoding resolution defines reference values (e.g., "0 value") for tap strength and/or delay.

The device may be further configured to find an [appropriate] resolution [for quantization] on the basis of the obtained CSI values.

The device may be further configured to select the resolution on the basis of a quantized value rounding the CSI.

The device may be further configured so that the CSI comprises the strength, or a value associated thereto, of the received reference signal [or of multiple versions of the reference signal traveling via different propagation paths and/or arriving at the device at different times].

The device may be further configured so that the CSI comprises the delay, or a value associated thereto, of the received reference signal [or the delay between multiple versions of the reference signal travelling via different propagation paths and/or arriving at the device at different times].

The device may be further configured so that the CSI comprises an indication of the reference signal [e.g. fields "pilot symbol number" and/or "division"].

The device may be further configured so that the device is or includes a network coordinator.

The device may be further configured so that the information [e.g. TAP format] describing the selection of the encoding resolution includes a format according to at least one of the following formats [either for "strength", or "delay", of both]:

| Format | Strength | Delay |
| --- | --- | --- |
| First format | Bits: 8 | Bits: 16 |
|  | 0 value: 0 dBm | 0 value: 0 Ps |
|  | step: 0.15 dBm | step: 30 ps |
| Second format | Bits: 4 | Bits: 8 |
|  | 0 value: 0 dBm | 0 value: 0 ns |
|  | step: 2 dBm | step: 4 ns |
| Third format | Bits: 8 | Bits: 8 |
|  | 0 value: 0 dBm | 0 value: 0 ns |
|  | step: 0.15 dBm | step: 4 ns |
| Fourth format | Bits: 6 | Bits: 10 |
|  | 0 value: 0 dBm | 0 value: 0 ns |
|  | step: 0.625 dBm | step: 1 ns |

In examples above, some aspects relate to method [e.g., performed by a transmitter, mobile device, an optical transmitter, e.g., according to any of examples above and/or below] including:

receiving a plurality of reference signals from a plurality of [e.g. optical] frontends [e.g., OFEs];

obtaining a channel state information, CSI, based on an evaluation of the received reference signals, encoding the CSI, in order to provide an encoded CSI; and/or providing [e.g. signal] information [e.g. TAP format] describing a selection of an encoding resolution used for encoding the CSI, out of a plurality of possible encoding resolutions.

In examples above, some aspects relate to device [e.g., receiver, e.g., device, e.g., an optical receiver] configured to:

receive an encoded channel state information, CSI;

receive a [e.g. signal] information [e.g. TAP format] describing a selection of an encoding resolution used for encoding the CSI, out of a plurality of possible encoding resolutions;

decode the encoded CSI in dependence on the information [e.g. TAP format] describing a selection of an encoding resolution used for encoding the CSI.

The device may be further configured so that the device includes a plurality of [e.g., optical frontends] and configured to cause them to transmit the reference signal. The device may be further configured so that the device is or includes a network coordinator [e.g., according to any of examples above and/or below].

The device may be further configured in order to decode a strength and/or delay of multiple propagation paths from the CSI according to a tap format indicated in the Information [e.g. TAP format] describing the selection of the encoding resolution.

The device may be further configured so that the CSI includes or is associated to a reference signal identification information, and/or wherein the information [e.g. TAP format] describing the selection of the encoding resolution is associated to a reference signal identification information.

The device may be further configured so that the information describing the encoding resolution defines number of bits used for encoding "tap strength", or a value associated thereto, and/or number of bits used for encoding tap "delay", or a value associated thereto.

The device may be further configured so that the information describing the encoding resolution defines step size [e.g. 0.15 dBm or 30 ps] of tap strength and/or of delay, or a value associated thereto.

The device may be further configured so that the information describing the encoding resolution defines reference values ("0 value") for tap strength and/or delay, or a value associated thereto.

The device may be further configured so that the CSI comprises the strength, or a value associated thereto, of the received reference signal [or of multiple versions of the reference signal traveling via different propagation paths and/or arriving at the device at different times].

The device may be further configured so that the CSI comprises the delay, or a value associated thereto, of the received reference signal [or the delay between multiple versions of the reference signal travelling via different propagation paths and/or arriving at the device at different times].

The device may be further configured so that the CSI comprises an indication of the reference signal [e.g. fields "pilot symbol number" and "division"].

The device may be further configured so that the information [e.g. TAP format] describing the selection of the encoding resolution includes a format according to at least one of the following formats [either for "strength", or "delay", of both]:

| Format | Strength | Delay |
| --- | --- | --- |
| First format | Bits: 8 | Bits: 16 |
|  | 0 value: 0 dBm | 0 value: 0 Ps |
|  | step: 0.15 dBm | step: 30 ps |

-continued

| Format | Strength | Delay |
|---|---|---|
| Second format | Bits: 4<br>0 value: 0 dBm<br>step: 2 dBm | Bits: 8<br>0 value: 0 ns<br>step: 4 ns |
| Third format | Bits: 8<br>0 value: 0 dBm<br>step: 0.15 dBm | Bits: 8<br>0 value: 0 ns<br>step: 4 ns |
| Fourth format | Bits: 6<br>0 value: 0 dBm<br>step: 0.625 dBm | Bits: 10<br>0 value: 0 ns<br>step: 1 ns |

In examples above, some aspects relate to system comprising a device according to any of examples above and/or below and a device according to any of examples above and/or below.

In examples above, some aspects relate to method [e.g., performed by a receiver, device, optical receiver, and/or a device according to any of examples above and/or below, comprising:
  receiving an encoded channel state information, CSI;
  receiving a [e.g. signal] information [e.g. TAP format] describing a selection of an encoding resolution used for encoding the CSI, out of a plurality of possible encoding resolutions;
  decoding the encoded CSI in dependence on the information [e.g. TAP format] describing a selection of an encoding resolution used for encoding the CSI.

Aspect VI

Figure 23:
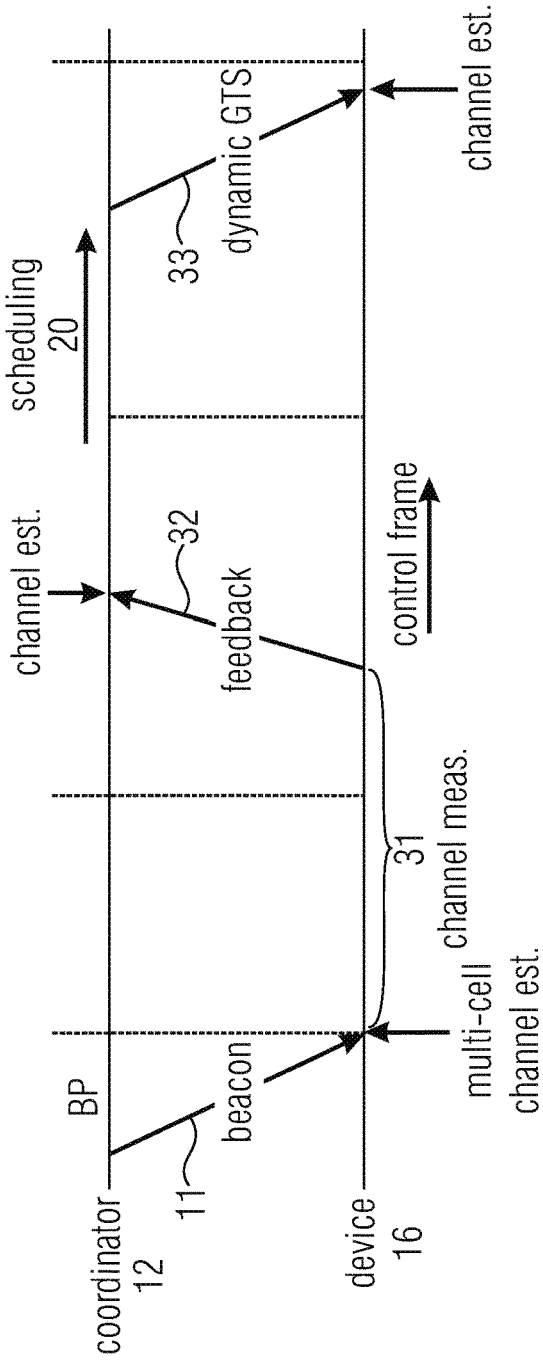

Reference is made to FIG. 23: the beacon 11 (e.g., as retransmitted by each of the frontends 14a . . . 14g) is obtained by a first communication apparatus (e.g. device 16) (e.g., 16', 16", A, B, C, D), which may be an optical device (e.g., mobile device). The first communication apparatus 16 may measure (at 32) the beacon 11 (or the different signals from the frontends 14a . . . 14g). Then, the first communication apparatus (e.g. device) 16 may transmit a feedback 32 (channel state information, CSI), indicating the state of each of the channels 18a . . . 18g as coming from the measurements (e.g., the more the strength or the less the detection errors, the better the channel). Then, the second communication apparatus (e.g. arrangement, e.g., fixed arrangement) 15 may define the scheduling 20. Subsequently, the arrangement 15 may transmit a scheduling message 33 (which in some examples may be the same of the message 33 of FIG. 5 or the message 33b of FIG. 7), in which the scheduling 20 is defined (and the several superframe slots or GTSs are assigned to each of the first apparatuses 16', 16", A, B, C, D, etc.).

It has been noted that even with highly performing real-time scheduling techniques, the conditions of the links 18a . . . 18g greatly vary in time. In some cases, some particular frequencies (e.g., subcarriers) would be of advantage, while in other cases different subcarriers could be of advantage. It has been noted that these occurrences are in general not easy to be defined deterministically or a priori.

In order to cope with these issues, it has been understood that it is possible for at least one mobile device 16 (e.g., 16', 16", A, B, C, D) to request some particular subcarriers (and more in general, some particular communication configurations), e.g. by relying on measurements performed on signals received from the frontends 14. For example, measurements may be performed on the beacon 11. (It is not, in some examples, strictly necessary that the measurements are performed on the beacon 11. In other examples, other signals may be measured. It may be of advantage that the measured signals are signals simultaneously transmitted by all the frontends, which drives to the advantages of the measurement on the beacon 11. In the subsequent reference will be made to the beacon 11 for clarity, even if it remains understood that any other signal transmitted by the frontends 141 . . . 14g, e.g. any signal simultaneously transmitted by the frontends, may be used for performing measurements.) The beacon signal 11 to be measured may present a pilot sequence which may be detected by each mobile device 16. The beacon signal 11, which may be contain a sequence of different frequencies (subcarriers). Each device 16 may determine which are its advantageous frequencies (subcarriers), e.g., for UL and/or DL, on the basis of the measurements performed on the beacon signal 11, and in particular on the measurements performed on the different subcarriers of the beacon signal. The mobile device 16 may perform this determination for each frontend 14a . . . 14g from which a beacon signal is decoded.

Signaling the advantageous subcarriers (and a choice of the frequency to be used) is in general not an easy task: the indication of the advantageous subcarriers has to be signaled quickly from the first communication apparatus (e.g., device or mobile device) 16 to the second communication apparatus (e.g., arrangement) 15, and is also prone to communication errors. For example, even if a particular first communication apparatus 16 indicates advantageous subcarriers, the second communication apparatus 15 may fail to receive this communication and therefore, may continuously transmit with an obsolete subcarrier, which maybe is not desired anymore by the first communication apparatus 16. Further, it is in general difficult to notify an agreement from the arrangement 12 to the first communication apparatus 16 in time, as an acknowledgement signal would cost time which also concurs in increasing the time delays.

It has been understood that there is the possibility of defining a bit allocation table (BAT), which defines different possible configurations (e.g., frequencies, numbers of bits for subcarriers, and so on) and which quickly and readily identifies them. The BAT may be seen, in examples, as a table which indicates configuration data for permitting the transmission of data between the second communication apparatus 15 and the first communication apparatus 16. Information on the BATs may be kept by each of the second communication apparatus 15 (e.g., the coordinator 12) and the first communication apparatus 16. The second communication apparatus 15 and the first communication apparatus 16 may therefore communicate with each other to share information on the BATs. Therefore, a plurality of active BATs may be defined, each of which may refer to different frequencies to be used in a communication: each communication will be performed after having selected one of the active BATs.

Figure 20:
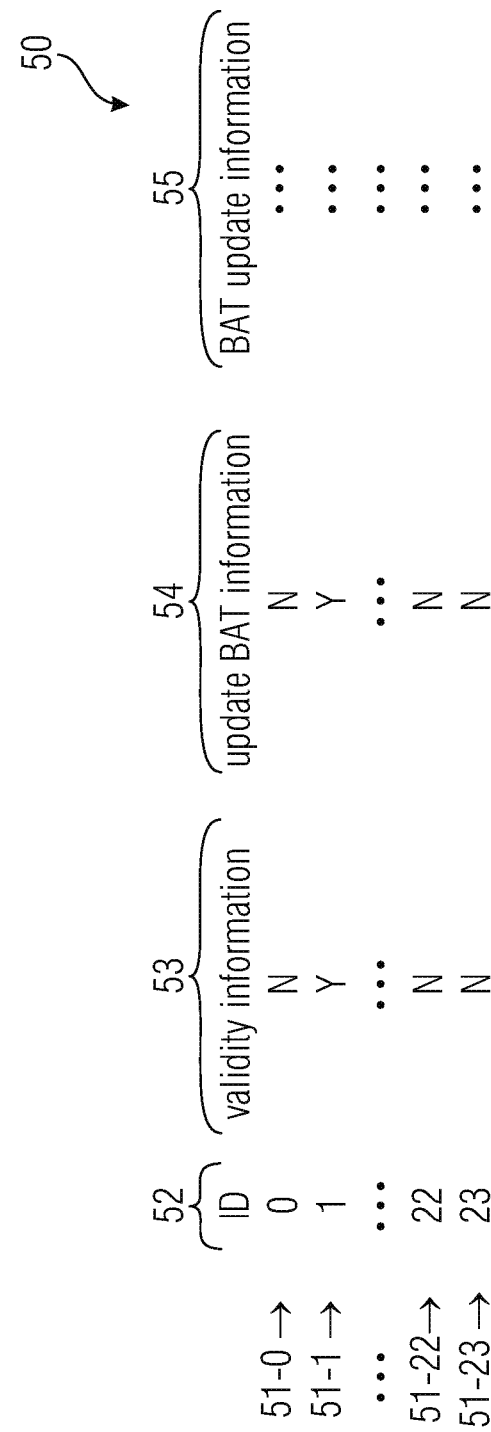
FIG. 20 shows an example of a list.

FIG. 20 shows a list 50 indicating a plurality of BATs 51-0, 51-1 . . . 51-22, 51-23. Here, 24 BATs are present, but different numbers may be chosen in other examples.

The list 50 may include a plurality of records, each associated to a BAT. For each BAT, an identifier may be chosen (which is here a numeral from 0 to 23). Numeral 52 refers to a list's column of fields, each storing an identifier associated to a particular BAT. However, in the subsequent parts the same numeral 52 may also be used for indicating an identifier associated to a particular BAT.

For each BAT, validity information may be provided. In some examples, the validity information may be encoded in a field of a message 61. (Numeral 53 refers to a list's column of fields, each storing validity information associated to a particular BAT. However, in the subsequent parts the same numeral 53 may also be used for indicating a validity information associated to a particular BAT.) A valid BAT may be one of the selectable BATs, while the invalid BATs (e.g., 51-1, 51-22, 51-23) cannot be chosen (at least until the subsequent update). The validity information 53 may include information on those BATs which usable by the second communication apparatus 15 to transmit data to the first communication apparatus 16. (From the validity information 53, it may be possible to also arrive at the knowledge of invalid BATs. In some examples, the validity BAT information 53 may comprise explicit information on the invalid BATs.) The validity information may be a binary information for each BAT.

For each BAT, updated BAT information may be provided. (Numeral 54 refers to a list's column of fields, each storing updated BAT information associated to a particular BAT. However, in the subsequent parts the same numeral 54 may also be used for indicating an updated BAT information associated to a particular BAT.) The updated BAT information 54 may include, for example, information on whether the particular BAT is the BAT to be updated: for example, the BAT 51-1 is the last BAT to be updated, while the BAT 51-0, 51-22, and 51-23 are not the BATs to be updated. (The BAT to be updated may in general be an invalid BAT). In some examples, only one BAT is to be updated at each time.

For each BAT, BAT update information may be provided. (Numeral 55 refers to a list's column of fields, each storing BAT update information associated to a particular BAT. However, in the subsequent parts the same numeral 55 may also be used for indicating a BAT update information associated to a particular BAT.) BAT update information may include, in particular, subcarriers to be used for the communication, forward error correction (FEC) information, such as FEC blocks size and/or FEC code rates, and/or other information for characterizing the communication according to the particular BAT. The BAT update information may be indexed: each subcarrier may be associated to a particular index, which may be stored in the BAT update information. The same may apply to the FEC information and/or other possible information which may be part of the BAT update information.

The list 50 may be stored in different instances of storage units of each mobile device 16 and the coordinator 12. The list 50 with all the BATs 51-0 . . . 51-23 may be updated on the fly on the basis of the conditions of the channel (e.g., the conditions of the optical links 18a . . . 18g). So, a copy of the list 50 is both stored at the coordinator 12 and at each mobile device 16. It is to be noted that at the coordinator 12, an instance of the list 50 is stored with reference to each mobile device 16, while each mobile device 16 may simply have one single list 50. Other solutions are also possible.

The list 50 may be associated to the channel as resulting from the plurality of optical frontends. The channel is therefore associated to the device (16' or 16") and not to the specific link (e.g., not the link 18a from the frontend 14 to the device 16, but the global channel formed by the links 18a, 18b and 18c that the device 16' experiences). Different frontends 16a . . . 16g may be in general be associated to the same list 50.

Figure 19:
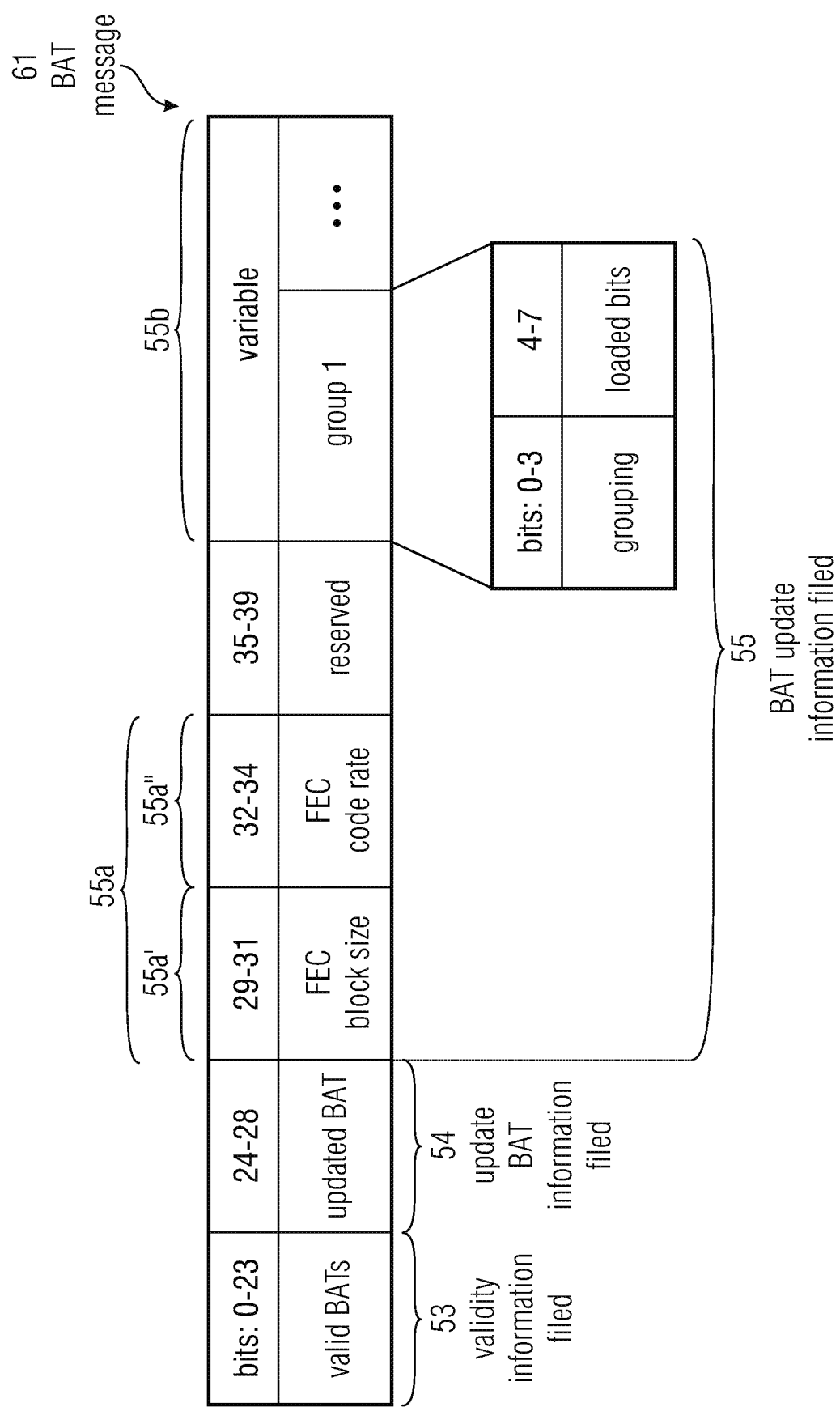
FIG. 19 shows an example of a frame.

In examples, the first apparatus 16 may transmit a BAT message 61, e.g. shown in FIG. 19. The BAT message 61 may comprise at least one of:
a validity information field 53 indicating, for example the valid BATs among the plurality of BATs 51-0 to 51-23 of the list 50;

updated BAT information field 54, e.g., the currently updated BAT (e.g., the BAT currently updated, which is in this case 51-1);
BAT update information field 55, which may inform on how to update the BAT and/or how to, subsequently, configure the communication (e.g., in DL, from the BS 15 towards the mobile device 16).

The transmission of the BAT message 61 from the first apparatus 16 to the second apparatus 15 may cause the modification of the list 50 at the second apparatus 15 (while the instance of the list 50, at the first apparatus 16, has already been updated before the transmission of the BAT message 61).

While the first apparatus 16 may have the freedom of choosing its advantageous BATs (e.g., basing its decision on measurements performed on the beacon signal 11), the second apparatus 15 may be bound to use the configuration data for the DL transmissions among the configuration data defined by the BAT update information field 55 for the valid BATs (according to the validity information field 53). Hence, while the mobile device 16 may determine a small number of different configurations, the second apparatus 15 may in general select one configuration among the possible configurations proposed by the first apparatus 16.

Figure 21:
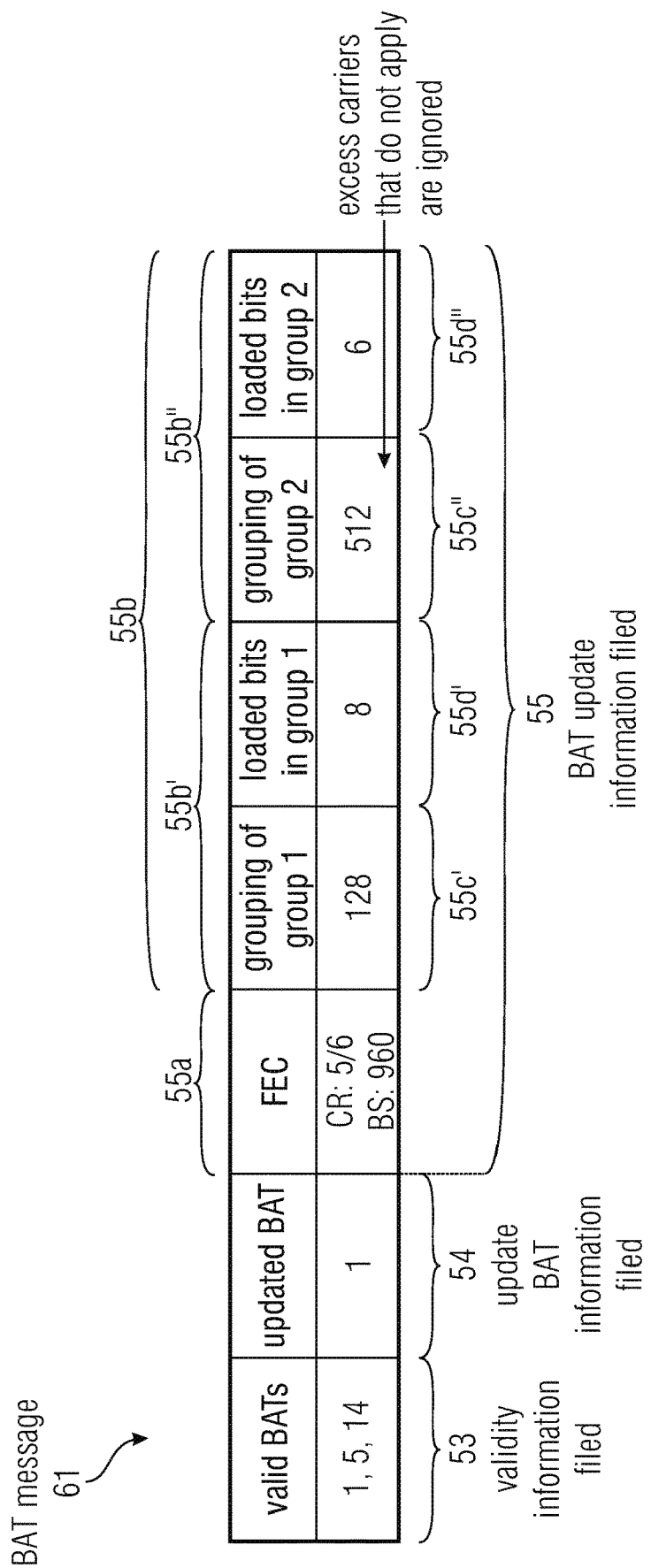
FIGS. 21 and 23 show examples of communications.

FIG. 21 shows an example of a BAT message 61. The BAT message 61 may be associated to at least one of:
the transmitting device (e.g., one of 16', 16", A, B, C, D);
the associated frontend (e.g., one of 14a . . . 14j);
at least one BAT (valid BATs and/or updated BATs).

The BAT message 61 may define, as valid BATs, the BATs identified as 1, 5, 14 (51-1, 51-5, 51-14) in the validity information 53. In this case, the updated BAT information field 54 may indicate that the BAT that is updated with current BAT message 61 is the BAT identified as 1 (i.e., BAT 51-1 of FIG. 19). The remaining BAT update information field 55 may provide update data for updating the transmission of the DL communications from the frontend(s) 14 to the first apparatus 16. Accordingly, the second apparatus 15 will modify, on the fly, its instance of the list 50, by modifying the validity information 53 (if modified), and/or by updating the BAT update information 55 for the BAT 1 (51-1) according to the updated BAT information 54.

Figure 22:
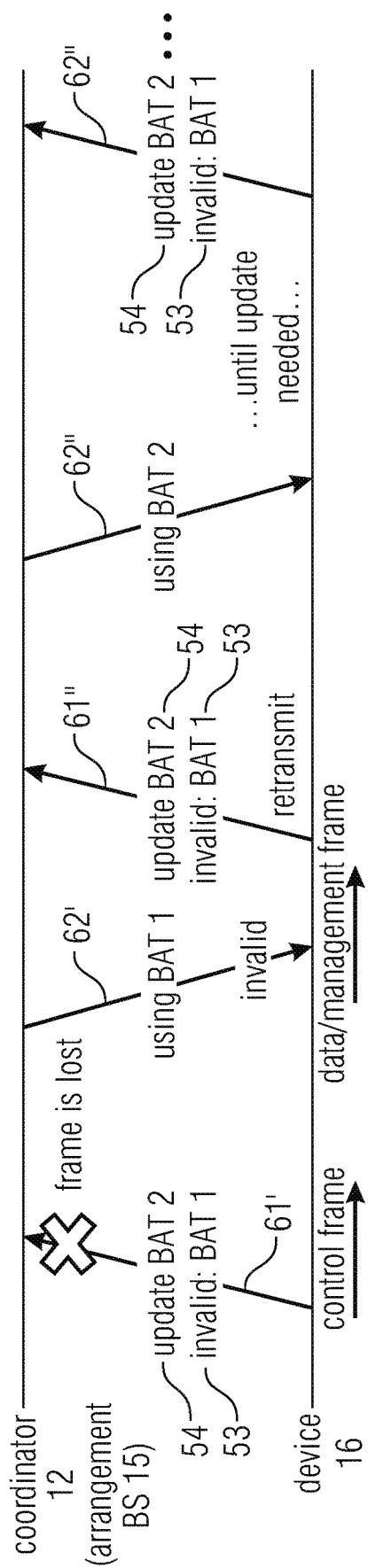
FIG. 22 shows an example of frame.

An example of communication between the second apparatus 15 and the first apparatus 16 is provided in FIG. 22. Here, the subsequent BAT messages 61 are indicated by 61', 61", 61''', etc. Here, no beacon 11 is shown for the sake of clarity (but it is understood that the beacon 11 has been received in time by the first apparatus 16, which has performed the measurements and has determined the advantageous frontends and the advantageous subcarriers).

As can be seen, the first apparatus 16 transmits a first BAT message 61' to the second apparatus 15. The first BAT message 61' indicates (e.g., in the validity information field 53) that:
BAT 1 (51-1) is currently invalid (this may be obtained by explicitly listing all the valid BATs, from which it is possible to determine the invalid BATs, of by explicitly listing all the invalid BATs); and
the updated BAT information field 54 indicates that BAT 2 (51-2) is now updated.

It is here shown that the BAT message 61' is lost (or anyway not accountable, e.g., not decodable) by virtue of some occurrences which are here not investigated (e.g., an object obstructing the channel 18 between the first apparatus 16 and the frontend(s) 14, interferences, high error rate, low energy and so on). Therefore, the second apparatus 15 is not reached by the BAT message 61'.

One could assume that, in order to cope with such occurrence, it could be possible to foresee a transmission of an acknowledgment (ACK) and/or non-acknowledgment (NACK) from the second apparatus 15 to the first apparatus 16. Unfortunately, the time constraints are so strict, that the transmission of ACKs and/or NACKs has proven difficult and time-consuming.

However, it has been understood that the first apparatus 16 may determine an implicit acknowledgment on the basis of whether the second apparatus 15 transmits the subsequent message using or non-using the updated and/or valid BAT(s).

After the lost reception of the BAT message 61', the second apparatus 15 transmits a message 62' (carrying payload and/or control data) by using the configuration data associated to the BAT 1 (52-1). BAT 1 (52-1) is currently invalid (but the second apparatus 15 is not aware of the invalidity of BAT 1, by virtue of the non-reception of the BAT messages 61'). Hence, by receiving a message 62' based on an invalid BAT, the first apparatus 16 can understand that the second apparatus 15 has not correctly received the BAT message 61' (otherwise, the message 62' would have had a valid configuration).

Upon determining the misunderstanding, the first apparatus 16 may transmit a new version of the BAT message 61 (here indicated as BAT message 61") which indicates (once again) the invalidity of BAT 1 (51-1) in the validity information field 53, and the current update of BAT 2 in the updated BAT information field 54 as well as the BAT update information field 55 carrying the configuration information for the subsequent DL messages from the second apparatus 15 to the first apparatus 16. In case the repeated BAT message 61" is correctly received and decoded by the second apparatus 15, the second apparatus 15 updates the list 50 with the BAT update information encoded in the BAT update information field 55 as indicated in the BAT message 61".

Accordingly, the subsequent DL messages 62" from the second apparatus 15 to the first apparatus 16 will make use of the configuration data associated to the BAT 2 (52-2) and will be correctly decoded by the first apparatus 16.

Accordingly, intrinsic acknowledgement is provided by the use of the updated BAT by the second apparatus 15 for transmitting the DL message 62: while the DL message 62' used an invalid configuration data associated to an invalid BAT (thus, providing an implicit non-acknowledgement of the reception of the first BAT message 61'), the use in DL message 62 following the correct reception and the coding of the repeated BAT message 61" will provide an implicit acknowledgement of the correct receipt and decoding of the BAT message 61".

Subsequent retransmissions of the BAT message 61 (e.g., 61", 61''', etc.) will be subsequently performed (e.g., following the reception of subsequent beacons 11', 11", etc.). For example, the third BAT message 61''' will indicate (for some reasons which are where not investigated), in the validity information field 53, that the BAT 2 (51-2) is now invalid and BAT 1 (51-1) is now valid, while the updated BAT information field 54 will indicate that BAT 1 (51-1) is now updated (and of course, the BAT update information field 55 in the BAT message 61''' will indicate the configuration data associated to the DL signal 62 transmitted from the second apparatus 15 to the first apparatus 16). Subsequently, in case the second apparatus 15 correctly receives and decodes the third BAT message 61''', the second apparatus 15 will transmit DL messages according to the configuration indicated in the BAT update information 55.

In some examples, it is possible to define rules, which may comprise at least one of:
1) The first apparatus 16 may decide:
   a. The valid and invalid BATs; and
   b. The currently updated BAT.
2) In general, the second apparatus 15 can choose, among all the active BATs, an advantageous BAT for its DL transmissions to the device 16.
3) The first apparatus 16 may determine an implicit acknowledgement or non-acknowledgment from the first reception 61 from the second apparatus 15.
4) During the subsequent DL transmissions from the second apparatus 15 to the first apparatus 16, the second apparatus 15 will choose one of the valid BATs.

A deeper discussion on a format of an example of the BAT message 61 is now provided (see in particular FIGS. 19 and 21). The BAT message 61 may have variable length, e.g., in consequence of the variable information that it carries.

The validity information field 53 may include, for example, a validity information bitmap. The validity information bitmap may associate each bit position to one particular BAT. In case of 24 BATs, the validity information bitmap may include 24 bits (e.g., 24 subsequent bits). Each bit may be associated to each BAT, e.g. according to the position of the bit in the validity information bitmap. For example, the first bit (bit 0) of the validity information bitmap may be associated to the first BAT 51-0 of the list 50 of FIG. 20. For example, the second bit (bit 1) of the validity information bitmap may be associated to the second BAT 51-1 of the list 50. While each bit position in the validity information bitmap may be associated to a particular BAT, the value of the bit (1 vs 0) may be associated to the validity of the BAT (e.g. valid state vs invalid state). In the example of FIG. 21, the validity information bitmap embodying the validity information 53 may be represented as "010001000000010000000000b" meaning:

| bit position | bit value | validity |
|---|---|---|
| 0 | 0 | invalid |
| 1 | 1 | valid |
| 2 | 0 | invalid |
| 3 | 0 | invalid |
| 4 | 0 | invalid |
| 5 | 1 | valid |
| 6 | 0 | invalid |
| 7 | 0 | invalid |
| 8 | 0 | invalid |
| 9 | 0 | invalid |
| 10 | 0 | invalid |
| 11 | 0 | invalid |
| 12 | 0 | invalid |
| 13 | 0 | invalid |
| 14 | 1 | valid |
| 15 | 0 | invalid |
| 16 | 0 | invalid |
| 17 | 0 | invalid |
| 18 | 0 | invalid |
| 19 | 0 | invalid |
| 20 | 0 | invalid |
| 21 | 0 | invalid |
| 22 | 0 | invalid |
| 23 | 0 | invalid |
| 24 | 0 | invalid |

By expressing the validity information field 53 as a bitmap, it is possible to ensure that, with any possible combination of valid/invalid BATs, the length of the validity information field 53 is always constant.

The second communication apparatus 15 and the first communication apparatus 16 may share the knowledge of the BATs on the basis of their positions in the validity information bitmap: the position in the validity information bitmap may be associated to the identifier 52 of each BAT 51-0 . . . 51-23 in the list 50. This knowledge may be predefined, for example (or configured in an off-line session, for example).

It is not always necessary that the order in the validity information bitmap strictly corresponds to the identifier of the BAT: it is important that the first communication apparatus 16 and the second communication apparatus 15 share the knowledge of the relationship between the position in each validity information bitmap and the particular BAT (e.g., the identifier of the BAT and/or the position of the BAT in the list 50).

The meaning of the values "1" and "0" may be inverted, in examples. Other kinds of symbols may be used.

Variants may provide, instead of the use of a bitmap, of other techniques. It is possible to use encoded values, lists, arrays, matrixes, etc.

The updated BAT information field 54 may be in a particular updated BAT information field. In this case, instead of a bitmap, an encoded field may be advantageously used. For example, in case of 24 possible BATs, five bits can be used. For example, in order to indicate that the updated BAT is the BAT 1 (51-1), the updated BAT information field may be encoded as "00001b". For example, in order to indicate that the updated BAT is the BAT 14 (51-14), the updated BAT information field may be encoded as "01110b".

Several encoding techniques may be used for this purpose. It is possible to use Big-Endian or Little-Endian notation, fixed-length or variable-length, etc. The result does not change when exchanging "1" with "0" and vice versa.

In fact, while for the validity information field 53 a bitmap may be of advantage, the use of an encoded field for the updated BAT information 54 has an important advantage: it is possible to encode the identifier of the BAT simply in five bits, without the necessity of using another bitmap. While an undetermined number of valid/invalid BATs may be indicated in the validity information field 53, only one single BAT may be indicated in the updated BAT information field 54 (as a consequence of the fact that only one single BAT is updated for each transmission of BAT message 61). (More in general, a fixed number of BATs may be updated at each time.)

In most examples, however, the validity information field 53 and the updated BAT field information 54 have, together, a fixed quantity of bits. For example, they may have 24+5=29 bits.

The BAT update information field 55 may be of variable length. The BAT update information field 55 may indicate the configuration (format) of the signal 62 to be transmitted by the arrangement 15. Therefore, the BAT update information field 55 may indicate physical layer parameters to be used by the second apparatus 15 when transmitting the signal 62 immediately subsequent to the BAT message 61.

The BAT update information field 55 may contain, for example, a forward error coding, FEC, information 55a to be used by the arrangement 15 when transmitting the DL message 61. The different FEC schemes may be indexed in the FEC information field 55a, which may be an encoded field. The FEC information field 55a may be encoded in some bits, e.g., in seven bits (e.g., three bits for the field 55a' and/or four bits for the field 55a"). The length of the field encoding the FEC information 55a may be fixed. The FEC information field 55a may indicate the particular FEC scheme used. For example, one of the code rates (CRs) known as 1/2, 2/3, 5/6, 16/18, 20/21, block sizes (BSs) 960, 4320, etc. may be selected. In some examples (e.g., in FIG. 21), the FEC information field 55a may be divided into a FEC block size field 55a' (e.g., indicating the size of the FEC block to be used when transmitting the signal 62), and/or a FEC code rate information field 55a" (e.g., indicating the particular code rate to be used). Once a FEC scheme is selected by the first communication apparatus 16, the second communication apparatus 15 uses it for transmitting the DL message 62. In general terms, FEC schemes introduce redundancy into the messages 62, and permit to tolerate possible errors in reading some values (e.g., bits which are decoded incorrectly, etc.).

The BAT update information field 55 may contain, for example, information field 55b regarding different groups of subcarriers. The information field 55b may indicate the subcarriers assigned to the updated BAT. The subcarriers may be indexed (e.g., according to a particularly values, such as the frequency, or according to any other possible indexing), and may be grouped according to their indexes. Therefore, the first communication apparatus 16 and the second communication apparatus 15 may share the notion of a subcarrier 0 (at a known frequency), a subcarrier 1, a subcarrier 2, . . . , up to a last subcarrier.

The information field 55b may therefore subdivided into a plurality of group information fields 55b', 55b", etc. Each group information field 55b' may refer to a particular group of subcarriers.

For each group information field 55b' (or 55b"), a subcarrier grouping information field 55c' (or 55c") may be defined. This subcarrier grouping information field 55c' is information on which subcarriers are part of the specific group. For example, the first subcarrier grouping information field 55c' indicates that 128 subcarriers are part of the group 1. These 128 subcarriers may also be identified by virtue of their indexes (they are the 128 subcarriers with lowest indexes). The second subcarrier grouping information field 55c" may indicate that 512 subcarriers are part of the group 2. These 512 subcarriers (at least, the existing ones among) may also be identified by virtue of their indexes (they start from the 129th subcarrier and go on progressively). Hence, each group may be constituted by an interval of subcarriers, the interval being defined according to the indexes of the subcarriers.

For each group (e.g., 1, 2) indicated in the subcarrier grouping information field 55d' and 55d", a bitloading information is provided (e.g., how many bits are to be loaded for each subcarrier of the group). (This information may be provided on the basis of a decision of the first communication apparatus 16 and may follow, for example, the determination that the first 128 subcarriers are subjected to less noise or experience a better transmission, e.g., as measured when the beacon 11 has been received).

For each group, the first apparatus (e.g. device) 16 may choose among a pre-defined, restricted number of groupings (e.g., for each group, the number of subcarriers may be chosen among 1, 2, 4, 8, 16, 32, 64, 128, 256, 512, 1024, 2048, or 4096), which may be identified in four bits. Hence, each subcarrier grouping information field 55c' may be encoded in a field of four bits: if the field encodes "0000b" the group has only one single subcarrier; if the field encodes "0001b" the group has two subcarriers; if the field encodes "0110b" the group has 4096 subcarriers; and so on.

For each group, the number of loaded bits may be chosen among a fixed number of bits: for example, each subcarrier may be loaded with 0 . . . 12 bits (and this is valid for all the subcarriers of the same group). Hence, the loaded bit information field 55*d*' (and 55*d*") may be encoded in a fixed number of bits (e.g., 4 bits).

Hence, for each group, each group information field 55*b*' may be encoded in a fixed number of bits (e.g., four bits for encoding the information 55*c*' or 55*c*", and four bits for encoding the information 55*d*' or 55*d*").

However, the length (duration) of the group information field 55*b* regarding different groups of subcarriers may in general be variable. This is because the first apparatus 16 is in general free to subdivide the subcarriers according to any of the groups. In the example of FIG. 21, two different groups 1 and 2 are defined, but the first apparatus 16 has the possibility of defining different groups. Just to give an example, if in field 55*c*', instead of "128 subcarriers", the choice was "1 subcarrier", this would mean that the group 1 would result to have one single subcarrier. The first apparatus 16 would be free to define, for the same remaining 127 subcarriers, other groups (e.g., other 127 single-subcarrier groups, or 63 two-carrier groups + one single-carrier group, and so on): in that case, the length of the information 55*b* would be much larger, as the consequence of defining one group information 55*b*' for each of the groups.

It could be expected that the BAT message 61 could have, at the end of the last group information (e.g., after field 55*b*" in FIG. 21), something like an end-of-frame sequence which could permit to determine the end of the BAT message 61. This sequence would increase the time length of the BAT message 61, without providing valuable information.

However, it has been understood that it is possible to adopt a particularly effective technique, which permits to determine the end of the BAT message 61 on the basis of knowledge due to information shared by the device 16 and the arrangement 15: e.g., the number of subcarriers. As the subcarriers are in limited number (which is known by both the device 16 and the arrangement 15), the information on the groupings may permit to determine the end of the BAT message 61. If, for example, the subcarriers are 640, the BAT message 61 is completed after the second group information 55*b*" (as the group 1 has 128 subcarriers, the second group has 512 subcarriers, and 128+512=640), and it makes no sense to continue encoding data. If, for example, the subcarriers are 630, the group 2 (even though indicated as having 512 subcarriers by virtue of the encoded information 55*c*") will only have 502 subcarriers.

An example:
A BAT Request element (e.g., BAT message 61) may be used by a receiving device 16 using the HB-PHY to request usage of a certain bitloading and error-coding scheme from a prospective transmitter.
Valid BAT Bitmap (validity information 53): Specifies the BATs requested to be valid. The first bit of the bitmap corresponds to the BAT ID 8, while the last (i.e. rightmost) bit corresponds to the BAT ID 31. A bit set to 1 indicates that the BAT is valid and 0 indicates that the BAT is not invalid, i.e. shall not be used by the transmitter anymore.
Updated BAT (updated BAT information 54): Specifies the ID of the runtime-defined BAT to be updated. Only values 8-31 are allowed. The value 0 indicates that no new BAT is updated. This may be the case if only validity information is signalled in the BAT Request element. Values 1-7 are reserved.
FEC Block Size (55*a*'):
FEC Code Rate: Specifies the requested FEC coding rate.
BAT Group 1 . . . N: BAT Group elements describing the modulation for the nth group of subcarriers. There shall be enough groups to cover all subcarriers. The last group may be wider than the remaining number of subcarriers. The requested modulation for those excess subcarriers shall be ignored.
A BAT Group element (55*b*', 55*b*", etc.) contains information about a group of adjacent subcarriers, having the same number of bits loaded in a bit-loading capable PHY transmission.
A BAT Group element contains information about a group of adjacent subcarriers, having the same number of bits loaded in a bit-loading capable PHY transmission.
The structure of the BAT Group element is shown in the figures. It has the following fields:
Grouping: This field contains the number of subcarriers in this group. Valid values are:
1, 2, 4, 8, 16, 32, 64, 128, 256, 512, 1024, 2048, 4096
Loaded Bits: The number of bits loaded on each subcarrier of the group. Valid values are:
0, 1, 2, 3, 4, 5, 6, 7, 8, 9, 10, 11, 12

Above, reference has been made to the validity information being embodied by a validity information field 53; the updated BAT information as being embodied by an updated BAT information field 54; and the BAT update information as being embodied by a BAT update information field 55. However, in some examples, this is not strictly necessary. In some examples the validity information field 53 may be absent in the BAT message 61, but the validity information may be derived, for example, from the updated BAT information field 54. In some examples the updated BAT information field 54 may be absent in the BAT message 61, but the updated BAT information may be derived, for example, from the validity information field 53.

The signal 62 may be a signal carrying payload and/or signalling. In some examples, the signal 62 may be embodied by any of signals 33, 33*b*, 700, etc.

In examples above, some aspects relate to a communication device [e.g., user equipment, e.g. a mobile device, e.g., to communicate with a communication arrangement, the latter being, for example, a base station, BS, or a coordinator] [e.g., to perform optical communication], configured to send [e.g., to the communication arrangement] a bit allocation table, BAT, message comprising:
validity information [e.g., a bitmap, e.g. indicated as "Valid BATs" in the example of FIG. 21] signalling which one or more BATs out of a plurality of BATs is valid [e.g., usable by a BS or coordinator for transmitting data to the communication device][in some examples, also signalling which one or more BATs out of a plurality of BATs is not valid]; and/or
updated BAT information [e.g., indicated as "Updated BAT" in in the example of FIG. 21] signalling which BAT out of the plurality of BATs is to be updated; and/or
BAT update information [e.g., last five fields in in the example of FIG. 21] signalling update information for updating the BAT which is signalled to be updated.

In examples above, some aspects relate to a communication device [e.g., user equipment, e.g. a mobile device, e.g., to communicate with a communication arrangement, the latter being, for example, a base station, BS, or a coordinator] [e.g., to perform optical communication], configured to send [e.g., to the communication arrangement] a bit allocation table, BAT, message [which may comprise validity information, e.g., a bitmap, e.g. indicated as "Valid BATs" in the example of FIG. 21, signalling which one or more BATs out of a plurality of BATs is valid] [e.g., usable by a BS or coordinator] [e.g., to the communication arrangement for transmitting data to the communication device][in some examples, also signalling which one or more BATs out of a plurality of BATs is not valid], the BAT message including:
updated BAT information [e.g., indicated as "Updated BAT" in in the example of FIG. 21] signalling which BAT out of a plurality of BATs is to be updated;
[optionally, BAT update information, e.g., last five fields in in the example of FIG. 21, signalling update information for updating the BAT which is signalled to be updated]
the communication device being configured to
expect a confirmation [e.g., from the communication arrangement], the confirmation being derived from usage of the bit allocation according to the updated BAT; and/or in case of non-reception of a valid confirmation from the communication arrangement, resend the BAT message.

The communication device may be further comprised of the BAT message comprising:
validity information [e.g., a bitmap, e.g. indicated as "Valid BATs" in the example of FIG. 21] signalling which one or more BATs out of a plurality of BATs is valid [e.g., usable by a BS or coordinator for transmitting data to the communication device][in some examples, also signalling which one or more BATs out of a plurality of BATs is not valid]; and/or
BAT update information [e.g., last five fields in in the example of FIG. 21] signalling update information for updating the BAT which is signalled to be updated. The communication device may be further configured, wherein the BAT message is variable in length.

The communication device may be further configured, wherein the BAT message groups information regarding different groups of subcarriers [wherein the number of subcarriers per group can vary from group to group] [wherein, for example, the BAT message may comprise, for a plurality of groups, am information on how many subcarriers a respective group comprises and/or how many bits are loaded to the subcarriers of the respective group].

The communication device may be configured to selectively update a BAT which was previously signalled as invalid.

The communication device may be configured to refrain from updating a BAT which was previously signalled as valid.

The communication device may be configured to expect confirmation from the communication arrangement [e.g., as indicated in FIG. 22], the confirmation being derived from usage of the bit allocation according to the updated BAT.

The communication device may be configured to, in case of non-reception of a valid confirmation from the communication arrangement, resend the BAT message.

The communication device may be configured to expect, in reception from the communication arrangement, transmissions using one of the BATs indicated as valid.

The communication device may be configured to base the information in the BAT message as a feedback on the channel condition [e.g., as determined from a beacon message, for example].

The communication device may be configured, wherein the BAT update information includes a forward error correction, FEC, information [e.g., including information regarding the requested redundancy expectations for the data to be transmitted from the communication arrangement].

In examples above, some aspects relate to a communication arrangement [for example, a base station, BS, or a coordinator] [e.g., an optical communication arrangement] [e.g., for a wireless network with a plurality of communication devices] configured to receive, from a communication device [e.g., user equipment, e.g. a mobile device, e.g., which may be part of a network], a bit allocation table, BAT, message comprising:
validity information [e.g., a bitmap, e.g. indicated as "Valid BATs" in the example of FIG. 21] signalling which one or more BATs out of a plurality of BATs is valid [e.g., usable by the communication arrangement for transmitting data to the communication device][in some examples, also signalling which one or more BATs out of a plurality of BATs is not valid]; and/or
updated BAT information [e.g., indicated as "Updated BAT" in in the example of FIG. 21] signalling which BAT out of the plurality of BATs is to be updated; and/or
BAT update information [e.g., last five fields in in the example of FIG. 21] signalling update information for updating the BAT which is signalled to be updated.

In examples above, some aspects relate to a communication arrangement [for example, a base station, BS, or a coordinator] [e.g., an optical communication arrangement] [e.g., for a wireless network with a plurality of communication devices] configured to receive, from a communication device [e.g., user equipment, e.g. a mobile device, e.g., which may be part of a network], a bit allocation table, BAT, message comprising:
[optionally: validity information e.g., a bitmap, e.g. indicated as "Valid BATs" in the example of FIG. 21] signalling which one or more BATs out of a plurality of BATs is valid, e.g., usable by the communication arrangement for transmitting data to the communication device; in some examples, also signalling which one or more BATs out of a plurality of BATs is not valid]; and/or
updated BAT information [e.g., indicated as "Updated BAT" in in the example of FIG. 21] signalling which BAT out of a plurality of BATs is to be updated; and/or
[optionally: BAT update information [e.g., last five fields in in the example of FIG. 21] signalling update information for updating the BAT which is signalled to be updated,]
the communication arrangement being configured to
send a confirmation [e.g., to the communication device], the confirmation being derived from usage of the bit allocation according to the updated BAT. The communication arrangement may be configured, wherein the bit allocation table, BAT, message comprises:
validity information [e.g., a bitmap, e.g. indicated as "Valid BATs" in the example of FIG. 21] signalling which one or more BATs out of a plurality of BATs is valid [e.g., usable by the communication arrangement for transmitting data to the communication device][in some examples, also signalling which one or more BATs out of a plurality of BATs is not valid]; and/or
BAT update information [e.g., last five fields in in the example of FIG. 21] signalling update information for updating the BAT which is signalled to be updated. The communication arrangement may be configured, wherein the BAT message is variable in length.

The communication arrangement may be configured, wherein the BAT message groups information regarding different groups of subcarriers [where the number of subcarriers per group can vary from group to group].

The communication arrangement may be configured, wherein a BAT which was previously signalled as invalid may be selectively updated.

The communication arrangement may be configured, wherein a BAT which was previously signalled as valid cannot be updated.

The communication arrangement may be configured to send a confirmation to the communication device [e.g., as indicated in the figure of FIG. 22], the confirmation being derived from usage of the bit allocation according to the updated BAT.

The communication arrangement may be configured to send, to the communication device, transmissions using one of the BATs indicated as valid.

The communication arrangement may be configured, wherein the information in the BAT message is based on a feedback on the channel condition [e.g., as determined from a beacon message, for example].

The communication arrangement may be configured, wherein the BAT update information includes a forward error correction, FEC, information [e.g., including information regarding the requested redundancy expectations for the data to be transmitted from the communication arrangement].

In examples above, some aspects relate to a method for the communication [e.g., wireless communication, e.g. optical communication] between a communication device [e.g., user equipment, e.g. a mobile device] and a communication arrangement [for example, a base station, BS, or a coordinator] [e.g., to perform optical communication], the method including sending [e.g., from the communication device to the communication arrangement] a bit allocation table, BAT, message comprising:

validity information [e.g., a bitmap, e.g. indicated as "Valid BATs" in the example of FIG. 21] signalling which one or more BATs out of a plurality of BATs is valid [e.g., usable by a BS or coordinator for transmitting data to the communication device][in some examples, also signalling which one or more BATs out of a plurality of BATs is not valid]; and/or updated BAT information [e.g., indicated as "Updated BAT" in in the example of FIG. 21] signalling which BAT out of the plurality of BATs is to be updated; and/or BAT update information [e.g., last five fields in in the example of FIG. 21] signalling update information for updating the BAT which is signalled to be updated. In examples above, some aspects relate to a method for the communication [e.g., wireless communication, e.g. optical communication] between a communication device [e.g., user equipment, e.g. a mobile device] and a communication arrangement [for example, a base station, BS, or a coordinator] [e.g., to perform optical communication], the method including sending [e.g., from the communication device to the communication arrangement] a bit allocation table, BAT, message comprising:

[optionally: validity information, e.g., a bitmap, e.g. indicated as "Valid BATs" in the example of FIG. 21, e.g. signalling which one or more BATs out of a plurality of BATs is valid, e.g., usable by a BS or coordinator for transmitting data to the communication device; in some examples, also signalling which one or more BATs out of a plurality of BATs is not valid]; and/or updated BAT information [e.g., indicated as "Updated BAT" in in the example of FIG. 21] signalling which BAT out of a plurality of BATs is to be updated; and/or

[optionally: BAT update information, e.g., last five fields in in the example of FIG. 21, e.g., signalling update information for updating the BAT which is signalled to be updated]

the method further comprising:

sending, from the communication arrangement to the communication device, a confirmation, the confirmation being derived from usage of the bit allocation according to the updated BAT; and/or in case of the communication device non-receiving of a valid confirmation from the communication arrangement [e.g., within a predetermined threshold], resending the BAT message from the communication device to the communication arrangement.

The method may further be comprised of the bit allocation table, BAT, message comprising:

validity information [e.g., a bitmap, e.g. indicated as "Valid BATs" in the example of FIG. 21] signalling which one or more BATs out of a plurality of BATs is valid [e.g., usable by a BS or coordinator for transmitting data to the communication device][in some examples, also signalling which one or more BATs out of a plurality of BATs is not valid]; and/or BAT update information [e.g., last five fields in in the example of FIG. 21] signalling update information for updating the BAT which is signalled to be updated. The method may be further configured using the equipment.

In examples above, some aspects relate to a non-transitory storage unit storing information which, when executed by a processor, causes the processor to perform a method.

In examples above, some aspects relate to a system comprising a communication arrangement and a communication device.

The description above contains inter alia examples of procedures and frame types, e.g., to support distributed optical frontends and/or MIMO techniques in the star topology. Examples are discussed below.

Targets of the Distributed Optical Fronted (OFE) Approach:

introduction of spatial diversity on the signal level; and/or enable spatial reuse with smooth handover performance and high QoS: and/or low level "soft handover": OFE form virtual cells following the device's movements, fully transparent to the management protocol. See FIG. 1 which may be understood as showing a coordinator in start topology with distributed OFEs serving two devices simultaneously.

Superframe Structure for Spatial Reuse and Joint Transmission + Reception:

slotted uplink random access without carrier sensing (ALOHA) in CAP. For association and reconnection only; collisions may occur; and/or GTS allocations per device for regular collision-free transmission and in the CFP; and/or different GTS allocated in same superframe slot but different OFE slots (SDMA); and/or GTS spans over multiple OFE slots, implying a "virtual cell" for joint transmission/reception, see FIG. 3.

Channel Estimation, CSI Feedback and GTS Update:

multi-cell channel estimation is based on multi-cell pilots in the beacon. For individual virtual cell transmissions, additional desired BAT or MCS feedback can be generated; and/or the coordinator schedules GTS based on feedback and selects adaptive transmission; and/or dynamic GTSs are updated via control frames and valid during next superframe, if validity=0, otherwise for multiple superframes. Previous dynamic GTS allocations lose validity. GTS update is acknowledged in next feedback frame, see FIG. 5.

Multi-Cell Channel Estimation Feedback:
TAP format for the setting of variable resolutions for the taps; and/or
symbol (1-7)+division (1-32) for pilot/OFE identification; and/or
strength for first tap is SNR [dB]; and/or
for other TAPs it is the ratio [dB] between first and current TAP; and/or
first OFE/TAP is the one with lowest delay.

Adaptive Bitloading Feedback: Requested BAT Control Frame Format:
valid BAT bitmap indicates applicability of each of the 24 runtime BATs for transmissions from the recipient towards the sender of the BAT request frame; and/or
the "Updated BAT" field indicates a BAT for transmissions from the recipient towards the sender of the requested BAT frame that shall be updated; and/or
if all runtime BATs are invalid, the frame contains only two octets of zeros; and/or
FEC schemes: code rates (CR) 1/2, 2/3, 5/6, 16/18, 20/21, & block sizes (BS) 960, 4320; and/or
list of groups of subcarriers to load different numbers of bit on:
grouping: 1, 2, 4, 8, 16, 32, 64, 128, 256, 512, 1024, 2048, 4096
loaded bits: 1, 2, 4, 8, 9, 10, 11, 12
last group is the one exceeding the actual number of subcarriers present in the PHY.

Adaptive Bitloading Feedback: Protocol:
when the channel changes and a formally valid BAT gets unusable, a new BAT is set ("updated"). The old BAT is marked invalid; and/or
the reuse of a BAT ID in an update is only allowed if the updated BAT ID was invalid before. The updated BAT ID must be marked valid; and/or
the reception of the requested BAT frame is confirmed by the recipient by using the latest updated BAT for a transmission towards the sender of the requested BAT frame; and/or
loss of a requested BAT frame can be detached through usage of invalid BAT IDs in a subsequent reception Requested BAT Frame Example:
example of the requested BAT frame for the HB-PHY with 512 subcarriers; and/or
here it is indicated that only the BATs 1, 5 and 14 can be used for transmissions towards the sender of the requested BAT frame; and/or
BAT 1 is updated for the given FEC and two groups of subcarriers, loaded with 8 and 6 bits respectively; and/or
the recipient of the requested BAT frame knows that the second group of subcarriers is the last group as it specifies more than the actual number of subcarriers; and/or
the excess subcarriers of the second group are ignored and not modulated, see FIG. 11.

Adaptive Modulation and Coding Feedback:
requested MCS control frame sent to request the usage of a specific MCS; and/or
same procedure as for requested BAT frame, but an MCS is requested; and/or
when transmitter does not apply a correct MCS, control frame is repeated.

Dynamic GTS Descriptor:
GTS allocations via the GTS update frame or via the beacon frame as already present in the standard; and/or
validity field specifies number of superframes the GTS is valid in; and/or
only the first applying GTS directions are considered. Excess bits are ignored, see FIGS. 14 and 15.

Example of Superframe:
new devices or devices that lost the connection and do not have GTSs allocated can transmit association requests and reconnection feedback frames in the CAP; and/or
all of control-management- and data transmissions are performed in GTS in the CFP.

FURTHER EXAMPLES

It is here referred to a MAC Layer support for Multiple Optical Frontends, which may be associated to any of the aspects above.

This section contains, inter alia, proposals for aspects of protocol procedures and frame types, necessary to support distributed optical frontends and MIMO techniques in the star topology.

Targets of the Distributed Optical Frontend (OFE) Approach:
Introduction of spatial diversity on the signal level
Enable spatial reuse with smooth handover performance and high QoS Low level "soft handover": OFE form virtual cells following the device's movement, fully transparent to the network layer
FIG. 1: Coordinator in star topology with distributed OFEs serving two devices simultaneously Fronthaul Technologies and Functional Split:
The coordinator's PHY is connected with the its OFEs via fronthaul
The implementation of the fronthaul is out of scope.
Analog fronthaul could be plain coax cable, or fiber transport of analog signals
Digital fronthaul could be transport of digitized waveform samples (CPRI) A splitting of signal chain functionality, as also discussed as "new functional splits" in mobile networks is out of scope
Digital fronthaul transport technologies are currently being investigated in the context of mobile networks and requirements are being defined in different standardization activities:
eCPRI
IEEE 802.1CM Fronthaul Delay:
Fronthaul virtually increases propagation delay. Order is up to ~100 μs.
Fronthaul delay $t_F$ must be known and approximately the same for all OFEs.
Analog fronthaul delays are part of the propagation delay.
An appropriate synchronization technique for digital fronthaul is IEEE 1588v2 (PTP). The MAC frame start at each OFE can be obtained from the PTP slave at each OFE.
If no such technique is available, proprietary approaches may be considered.
Remaining delay differences between air times at different OFEs must be very small, i.e. well below ½ cyclic prefix duration.

PHY Support of Multiple OFEs (see FIG. 13):
PHY of the coordinator has multiple transmit- and receive chains (TRX chains) and multiple ports for OFEs (OFE-Ports).
  TX configuration per PSDU via PD-SAP
    On which OFEs to transmit
    Delay difference compensation per OFE (in opt. clock cycles).
  RX configuration through PLME-SAP
    Groups of OFEs in virtual cells for combining in uplink
  Fronthaul delay is constant for each OFE
    MAC layer must compensate this value as explained above.
Superframe Structure for Spatial Reuse and Joint Transmission+Reception:
  Slotted uplink random access without carrier sensing in CAP. For association and reconnection only; collisions may occur.
  GTS allocations per device for regular transmission and reception in the CFP. Different GTS allocated in same superframe slot but different OFE slots (SDMA).
  GTS spans over multiple OFE slots, implying a "virtual cell" for joint transmission/reception.
Dynamic GTS:
  If the same superframe slots are "reused" in GTSs of different devices (spatial multiplex), mobility can lead to frame collisions when devices with those GTSs approach each other.
  Hence, the GTS allocations must be rapidly adapted to mobility.
  Keep existing semi-static GTS allocation mechanism via management frames (5.1.10 and Appendix G in D3).
  Proposal: So called dynamic GTSs can be assigned to devices by the coordinator via control frames, in addition to the semi-static GTS allocations.
  Dynamic GTS are only valid for a specified number of superframes and shall not be used thereafter.
  Semi-static GTSs are valid unless deallocated via the mgmt. protocol.
Dynamic GTS Descriptor:
  Dynamic GTS descriptors are transmitted via control frames.
  The dynamic GTS descriptor is similar to the semi-static GTS descriptor but has no device address and contains and Validity field.
  Validity field in dynamic GTS descriptor may contain the number of superframes for which a dynamic GTS is assigned.
  Add table for GTS list
Association and Reconnection (e.g., with reference to aspect II; see also FIG. 6):
  New devices 16 that lost the connection with the coordinator 12 and do not have GTSs allocated can transmit association request and reconnection feedback frames 35 in the CAP 11a.
  Proposal: CAP transmission: Slotted Aloha in macro slots which contain multiple superframe slots, which can hold a whole frame each.
  Proposal: Estimated downlink CSI is included in random access frame
Channel Estimation, CSI Feedback (e.g., 32, 32b, 35) and GTS Update:
  Channel estimation may be based on multi-cell pilots in the beacon 11. CSI feedback (e.g., 32, 32b, 35) may be transmitted regularly via control frames in GTSs.
  The coordinator 12 may update the GTS allocations dynamically based on CSI feedback.
  Dynamic GTSs may be updated via control frames and valid during next superframe, if validity=0, otherwise for multiple superframes. Previous dynamic GTS allocations lose validity, in examples. GTS update may be acknowledged in next feedback frame.

Particular Reference is Now Made to Aspect III (See Above) and FIG. 2. MU MIMO with Distributed Optical Frontends:
  Use of multiple distributed optical frontends (OFEs) with a single coordinator as MU-MIMO system.
    Delay difference compensation for multiple OFEs
    Control signaling for MU MIMO
  Delay differences: Example
    Assume digital fronthaul e.g. over Ethernet using PTP
      Light networks are small, e.g. 10-100 m*5 ns/m=50-500 ns fronthaul delay
      PTP=Precision time protocol IEEE 1588v2
      PTP packets get high priority, accuracy is <<1 μs in stationary scenarios[1,2]
    Fronthaul+prop. delay+PTP accuracy <long CP or synch seq. length
      LB PHY@32 MHz: CP=160 samples*31.25 ns=4.8 μs
      HB PHY: CP=1.28 μs
      PM PHY @ 200 MHz: synch sequence length=384 samples*5 ns=1.92 μs
    Obviously, all delays together less than long CP/synch sequence length Precise fronthaul alignment can be achieved over the air
  (See also: L. Cosart, "Precision Packet Delay Measurements Using IEEE 1588v2," 2007 *IEEE Int. Symp. on Precision Clock Synchronization for Measurement, Control and Communication*, Vienna, 2007, pp. 85-91. See also: R. L. Scheiterer, C. Na, D. Obradovic, G. Steindl, F.-J. Goetz, "Synchronization Performance of the Precision Time Protocol in the Face of Slave Clock Frequency Drift," 4th IEEE Conference on Automation Science and Engineering, Key Bridge Marriott, Washington D.C., USA, Aug. 23-26, 2008)
  Delay difference compensation: Problem (see also FIG. 2):
    Optical frontends (OFE) have to be time-aligned
    Fronthaul protocol, if any, is transparent for OWC
    Fronthaul is analog or digital but implies a certain delay
    Coordinator compensates the remaining delay differences at each OFE
    Situation:
      System is switched on
      E.g. PTP is applied
      There is individual time error $t_{F1}$, $t_{F2}$, $t_{F3}$ at each OFE
      There is individual propagation delay $t_{P1}$, $t_{P2}$, $t_{P3}$ from each OFE Overall delay spread is <1 μs
  Time alignment: Proposed solution:
    Proposed solution:
      Measure individual delay differences over the air
      Inform the coordinator about the delay differences
      Correct them with variable FIFO delay buffer in each OFE
    Proposal:
      Beacon uses long-enough CP for channel estimation, header, optional fields and payload
      Beacon contains orthogonal sequences for MIMO in optional fields
      Device performs multi-cell channel estimation for all OFEs Device sends CIRs for all visible OFEs in association request (CSI feedback)
Coordinator corrects the delay difference in each OFE accordingly Downlink MIMO Operation:
  Beacon is jointly transmitted via all OFEs
  Delay difference measurement is supported using MIMO reference signals
  OFEs are identified by different MIMO reference signals
  Device performs multi-cell channel estimation for each OFE
  Device provides feedback of channel state information (CSI) per visible OFE to coordinator, CSI can be significantly compressed (see also below)
  Coordinator applies delay difference compensation at each OFE Adaptive CSI feedback compression:
  Select visible OFEs
  Convert channel from frequency to time domain→reconstruct the CIR Select non-zero taps based on noise- and interference dependent threshold
  Quantize the amplitude on each non-zero tap
  Use fixed or variable quantization, variable depends on the SINR MIMO CSI feedback format:
  Time-domain feedback for all visible OFEs
  For each tap amplitude, adaptive quantization is used (may be fixed) Impulse response feedback format[3]:
  OFE index denotes source OFE
  Step size and quant. bits describe adaptive quantization
  Delay vector is bitmap, is 1 at position/if $l^{th}$ tap is non-zero, else 0
  L=sum(Delay vector) is number of no-zero taps in the CIR
  Taps contains amplitude of L taps, quantized with B bits depth Adaptive Bit-Loading:
  Adaptive bit-loading is used together with HB OFDM PHY.
  A runtime bit allocation table (BAT) is negotiated by the MAC.
  The device measures subcarrier-specific SNR values and calculates a desired BAT that contains the number of bits per subcarrier or subcarrier group.
  The desired BAT is fed back to the coordinator via the desired BAT control message. i.e. if channel has changed
  The coordinator decides if the desired or another BAT is used.
  The coordinator informs the device using the granted BAT control message.
  For fast switching between predefined and runtime BATs, the PHY header contains the BAT ID used for demodulation.

Adaptive Bit-Loading: Procedure:
  Fundamental BAT maintenance procedure:
    Devices regularly update the BAT they can support
    Procedure can be started by device or coordinator
    Coordinator transmits channel estimation symbols in each preamble frame or after request by the device
    Negotiation as described Desired BAT format:
Included information:
  BAT ID to be updated
  Grouping of subcarriers in groups of 1, 2, 4, 8, 16.
  Valid BAT IDs
  FEC block size
  FEC code rate
  Lowest loaded subcarrier(-group)
  Highest loaded subcarrier(-group)
  Bits loaded per subcarrier(-group)
  Frame format follows Other Aspects
Wireless Specialty Networks
1.1 Scope
1.2 Purpose
2 Explanations The concepts disused in the present section may be generalized to the system with the first apparatus(es) 16 and/or the second apparatus(es) 15, e.g. communicating through a wireless link which can be optical or non-optical. Concepts discussed here can be combined with other concepts discussed above also singularly. Instead of the optical frontends (OFEs), it is more in general possible to refer to frontends (e.g., wireless frontends). Instead of OWPAN, reference may be made to a network (e.g., a wireless network such as a n optical network).

3 Definitions, Acronyms, and Abbreviations
3.1 Definitions

This clause lists terms that are used throughout the disclosure. The respective term is printed in bold letters. The definition is given after a colon. If a term has synonyms, i.e. other terms that are describing the same entity in this disclosure, these synonyms may be listed in brackets. The definition may be substituted by a synonym specification, in which case one can refer to the definition of the synonym.

Contention Access Period (CAP):
CAP Slot: the compound of multiple superframe slots in the CAP.
Guaranteed Time Slot (GTS):
MAC Frame: Frame that is handled on the MAC sublayer.
[MAC Protocol Data Unit]
MAC Protocol Data Unit (MPDU):
[MAC frame]
Modulation and Coding Scheme (MCS): Rate adaptation parameters on the physical layer. This includes, for example, the type of modulation or details of the error-coding scheme.
Superframe Slot: the elementary temporal resource building block of each superframe in the beacon-enabled channel access mode. Other durations, i.e. of the beacon slots or CAP slot, are multiples of the superframe slot duration.

3.2 Acronyms and Abbreviations
FCS Frame Check Sequence
DME Device Management Entity
TAIFS Turn Around Inter-Frame Space
LLC Link Layer Control 4 General Description
4.1 Introduction
4.2 Components of an IEEE 802.15.13 OWPAN An OWPAN (or more in general a network) may constitute of disclosure-compliant devices. Devices carry a MAC-48 address for identification and flat addressing in the network. Devices constitute of a compliant MAC implementation and make use of a compliant PHY defined in the disclosure. Not all devices are required to implement the functionality to maintain an OWPAN. Devices, which support that functionality, are also referred to as coordinator-capable devices or coordinators if they actively maintain an OWPAN.

In each OWPAN, a single coordinator-capable device may assume the role of the coordinator (e.g., the second apparatus 15). The coordinator may be responsible for starting, maintaining and finally stopping the OWPAN. The coordinator may be furthermore involved in all data transmission in the OWPAN. Hence, the single logical network topology of an OWPAN may be the star topology, as detailed in 4.3.

Non-coordinator devices, subsequently also simply referred to as devices, implement less functionality than coordinators. Devices associate with an OWPAN in order to gain to gain layer 2 connectivity with the network.

4.3 Network service

An OWPAN denotes the network between devices. The MCPS-SAP provides as a service the transmission of MSDUs between devices, based on MAC-48 addresses. Moreover, coordinators may act as access points [bridges], connecting devices associated with the maintained OWPAN with peers in an external network.

4.3.1 Topology

Figure 24:
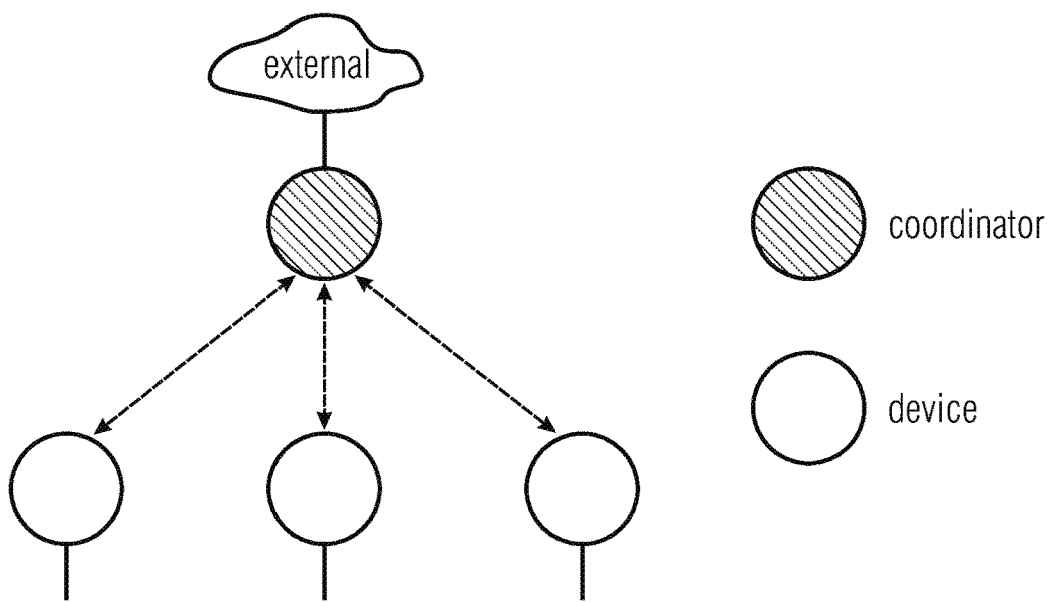
FIGS. 24-27 show examples of topologies.

All IEEE 802.15.13 OWPANs have a star topology. Thus, a single coordinator may be involved in all data transmission between two devices or between external peers and the devices associated with the OWPAN as illustrated in FIG. 24. Moreover, data transmissions between two devices of the same OWPAN must (in some examples) also be relayed by the coordinator.

Depending on the application, the star topology may have different characteristics. The subsequent clauses list different special cases of star topologies to be realized.

4.3.1.1 Distributed MIMO Star Topology

To improve transmission properties and to increase mobility support, the star topology may be realized to support MIMO principles. In that case, the coordinator may have multiple optical frontends (OFEs) for transmission and reception associated with its PHY. With each OFE, the coordinator may be able to transmit the same or different signals. However, individual OFEs are not addressable by the device, making them transparent to it apart from the different pilot signals a device observes.

The realization of the distributed MIMO star topology is in general out of scope of this disclosure. For example, the OFEs may be distributed in space and connected to the single central coordinator instance via some fronthaul technology, e.g. according to IEEE 802.1CM-2018. To regard for such possibilities, the disclosure defines means that are helpful for realization. These are, for example, the possibility to transmit orthogonal pilot symbols from each OFE at the physical layer. Detailed implementation rules are, however, left out. The MAC furthermore supports these possible realizations through a channel access mechanism that may be able to cope with large fronthaul delays, virtually increasing the propagation delay to the hundreds of microseconds.

Figure 25:
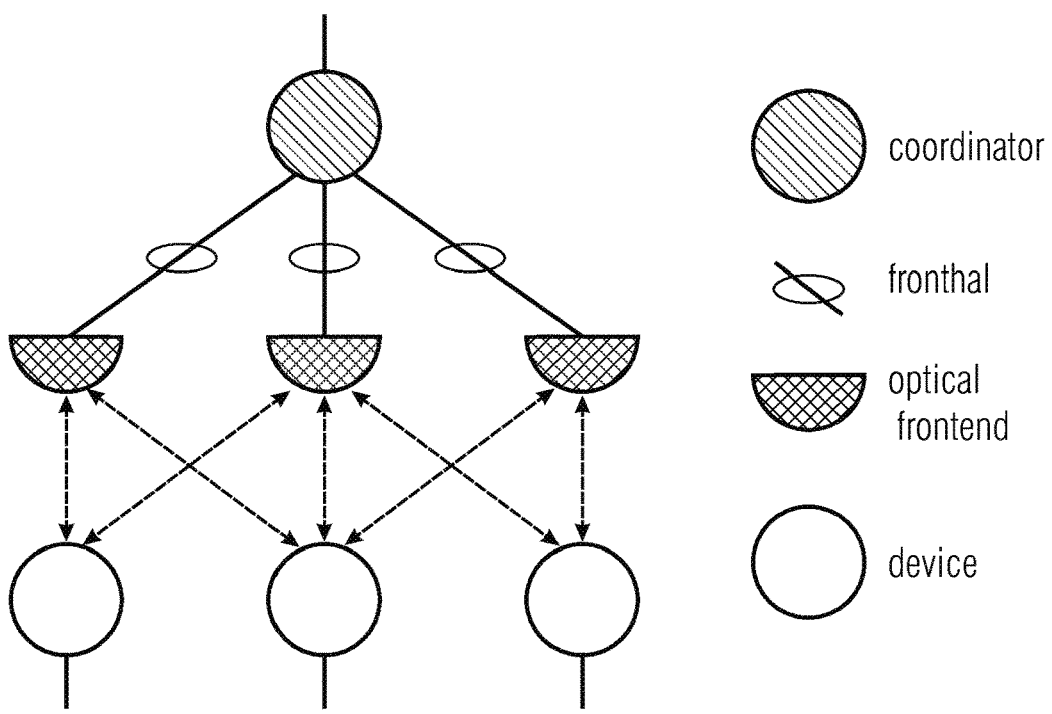

The distributed MIMO star topology may be illustrated in FIG. 25. The OFEs ( ) of a coordinator may be placed in various ways. One possible placement may be the distribution of OFEs over the targeted coverage area of the OWPAN.

4.3.1.2 Unidirectional Star Topology (Broadcast)

Figure 26:
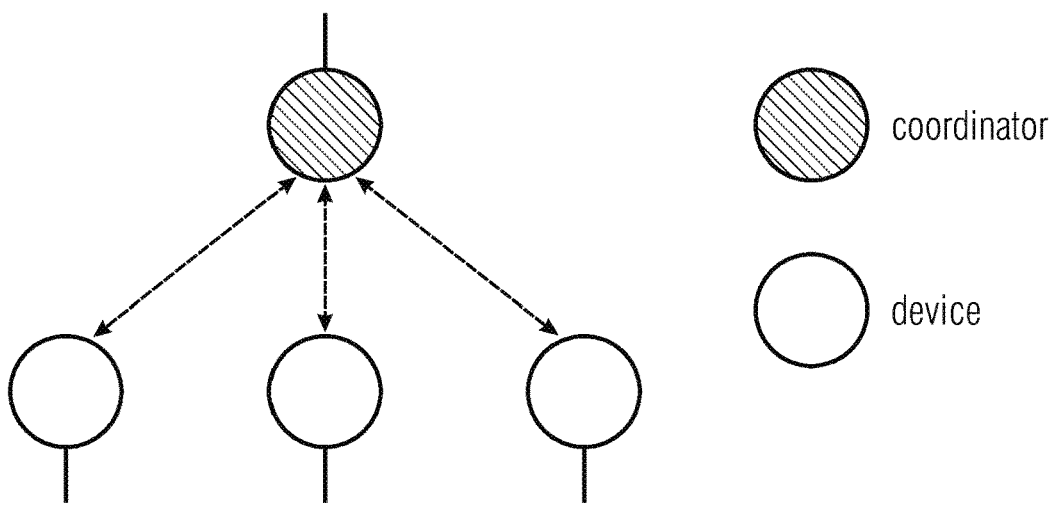

In the unidirectional star topology (shown in FIG. 26), the OWPAN comprises a coordinator only. The coordinator of the unidirectional star topology does not accept associations by devices. It may transmit frames having the broadcast address as destination address.

4.3.1.3 Coordinated Star Topology

Multiple coordinators deployed in the same area may be coordinated by a master coordinator. The corresponding topology may be called coordinated star topology.

The functionality of the master coordinator (e.g., 12) is in general out of scope of the disclosure. It is currently anticipated, that coordinated star topology deployments may include devices from a single vendor, hence not requiring standardization of the interfaces between coordinators and the master coordinator.

Figure 27:
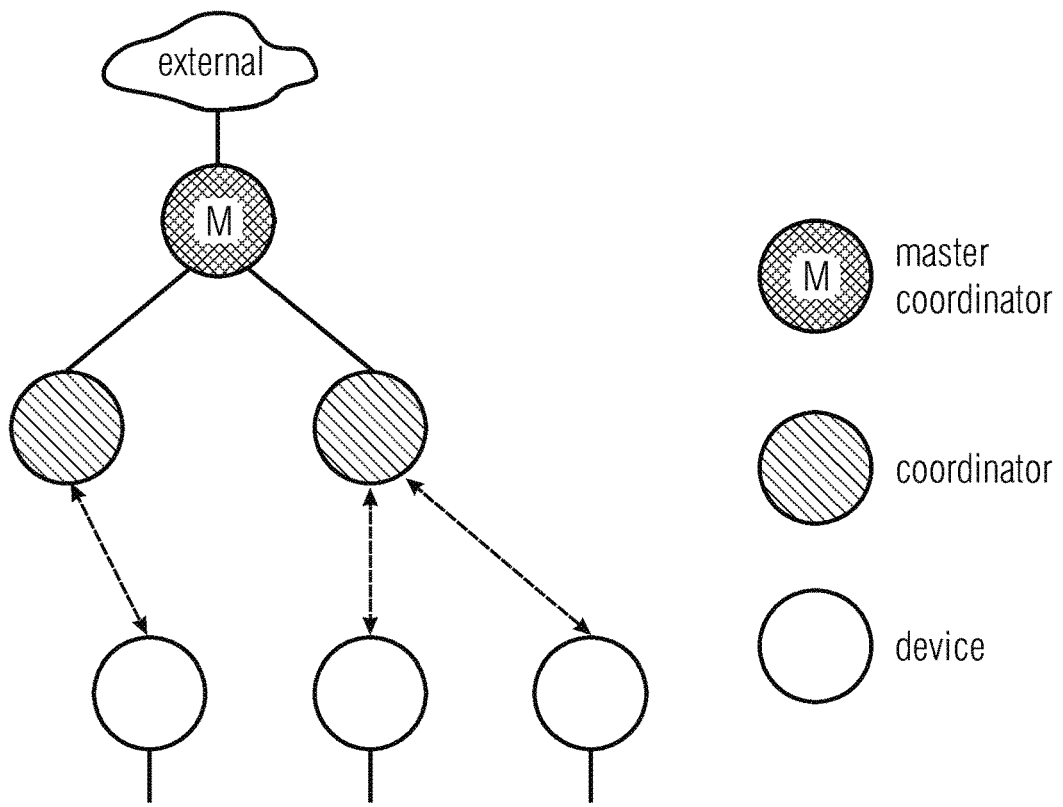

The network interconnecting the master coordinator with the individual coordinators may be used for steering information but also for the hauling of data frames. It may be also referred to as backhaul 17. The master coordinator shall (in some examples) provide a SAP to the higher layers in order to abstract the coordinated OWC network as a bridge according to [IEEE 802 Bridge definition]. The coordinated topology may be depicted in FIG. 27.

As light is highly local, a single area is typically not equipped with multiple uncoordinated infrastructures from different providers. Thus, it is assumed that neighboring IEEE 802.15.13 OWPANs will be deployed in a coordinated manner. If multiple OWPAN infrastructures overlap in their coverage area, they should always be coordinated by a master coordinator, managing resource allocations between the corresponding coordinators.

4.3.1.4 Radio Frequency Hybrid Topology

The hybrid topology involves an optional RF-based connection at each device. The realization of the hybrid topology may be out of scope of the disclosure. It may be expected that the management of the alternate OWC- and RF-based connections may be performed above the 802.15.13 MAC, for example according to 802.1AX.

4.3.1.5 Peer-to-Peer Topology

In the peer-to-peer topology, two devices seek to perform point-to-point communication with each other. In that case, one of the devices assumes the coordinator role, providing an ad-hoc OWPAN to the other device. Hence, the peer-to-peer topology may be a special case of the star topology, involving a coordinator and a single non-coordinator device associated with the provided OWPAN.

4.3.2 Integration

An OWPAN provides three logically distinct transmission services:
1) Transmission from a coordinator to a device or from a device to a coordinator
2) Transmission from device to another device in the OWPAN or to a peer in an external network
3) Transmission from another device in the OWPAN or a peer in an external network to a device in the OWPAN A fourth case, bridging, may be currently not supported by the disclosure. In bridging, a peer in an external network behind the coordinator would be able to communicate with a peer in an external network behind an associated device.

In case 1), the transmitted frame can be a control or management frame, transmitted from the coordinator to the device or vice versa. Also, the frame may be a data frame from a higher layer application or protocol running on the device or coordinator with the destination MAC-48 address set to either the coordinator's or the device's address.

In case 2), a higher layer application or protocol running on the device transmits a frame with the destination set to a MAC-48 address other than the coordinator's unicast address. The destination address may belong to either another device of the OWPAN or a peer in another network, which the coordinator may be connected with.

4.4 Coexistence

The high directivity of light imposes difficulties on coexistence schemes that are based on energy detection. This may be in contrast to RF-based communication technologies with omnidirectional propagation characteristics. Through these omnidirectional characteristics, heterogeneous RF-technologies that feature not mutually decodable signals, can rely on refraining from transmissions after the channel may be detected busy by exceeding a given signal energy threshold (CCA through energy detection).

Through the directivity, however, a device A is not able to infer that a second device B's transmission is currently received at device A's prospective receiver.

This disclosure restricts uncoordinated transmissions, i.e. random channel access, to the minimum used purposes such as association or reconnection. However, in case of alien technologies entering the coverage area of an IEEE 802.15.13 OWPAN, the behavior may be unspecified. Currently, there may be no coexistence coordination among different OWC disclosures.

4.5 Architecture

Similar to other IEEE 802 standards, the architecture of this disclosure may be defined by a number of layers in order to group related functionality and simplify the disclosure. Each layer may be responsible for a subset of the functionality included in the disclosure and offers services to the next higher layer.

Each layer includes interfaces that serve the exchange with other layers. More specifically, a lower layer provides its service to the next higher layer. The term used for the corresponding interfaces in this disclosure may be service access point (SAP).

Figure 28:
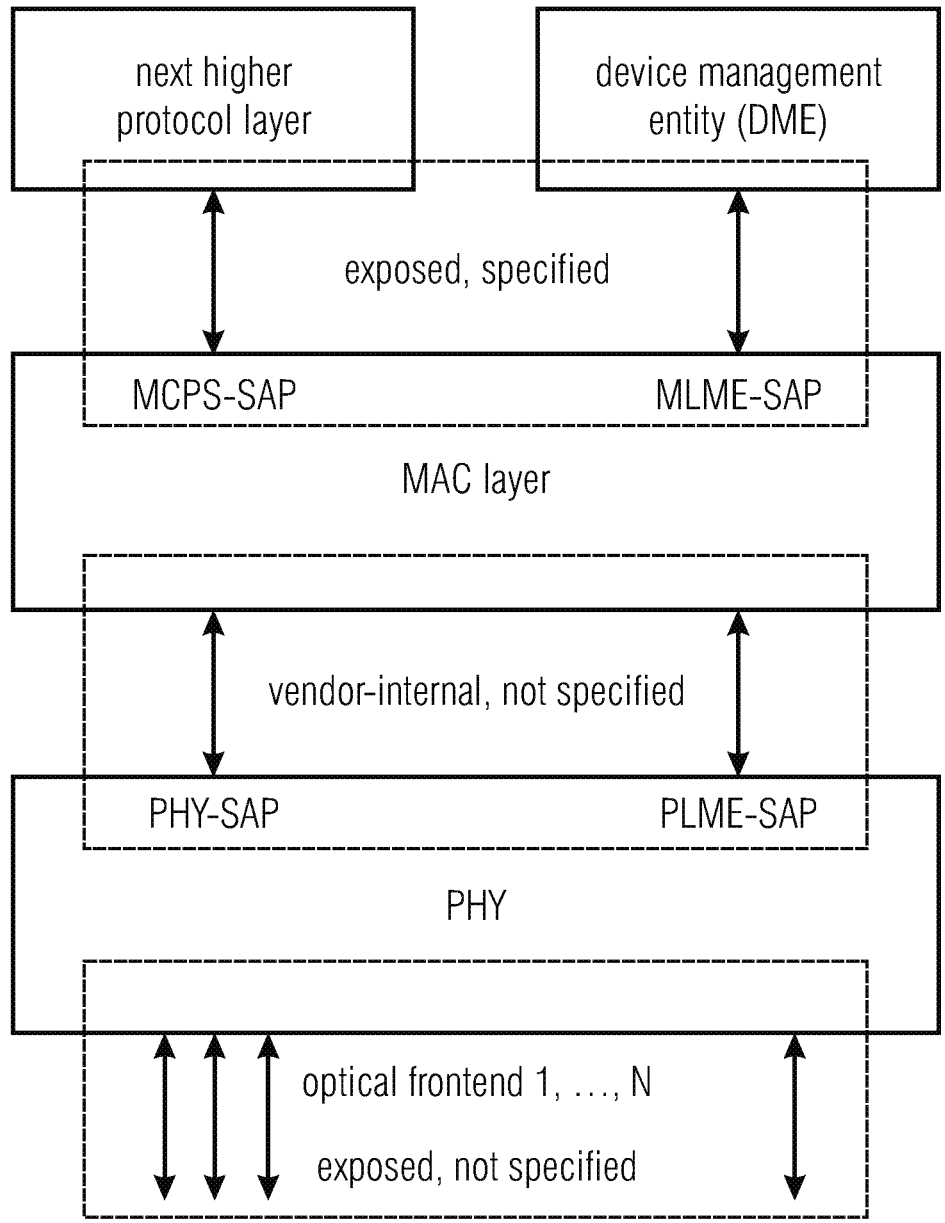
FIG. 28 shows an example of an architecture.

This disclosure specifies exposed interfaces, which are likely to connect entities provided by different vendors. Currently, this are the MCPS-SAP and the MLME-SAP, as depicted in FIG. 28. Other interfaces are assumed to be vendor-internal or do not require detailed specification.

Different functionalities of a layer are accessible through so-called primitives that make up a given SAP. The concept of primitives may be further described in clause 4.6.

Data to be transmitted via an OWPAN passes multiple layers. The collection of control-management and/or data bits to be passed between layers may be also referred to as protocol data units (PDUs). Depending on the layers involved in the exchange of PDUs and the direction of exchange, PDUs have specific names. A data PDU passed to the MAC sublayer by a higher layer protocol may be called MSDU. It enters the MAC sublayer through the MCPS-SAP for transmission over the OWPAN and leaves the MAC sublayer through the MCPS-SAP after successful transmission over the OWPAN.

After processing through the MAC sublayer (during transmission) or before processing through the MAC sublayer, the data unit exchanged with the PHY may be called either MPDU (from the MAC perspective) or (PHY service data unit) PSDU (from the PHY perspective). The PSDU enters and leaves the PHY through the PHY-SAP.

In the transmit direction, the PHY processes PSDUs, yielding PPDUs, which represent the physical signal to be transmitted over the optical medium. After transmission over one or multiple OFEs, the PPDU may be received by a PHY layer and processed into a PSDU, which subsequently traverses the layers up until the MCPS-SAP.

4.6 Concept of Primitives

Figure 29:
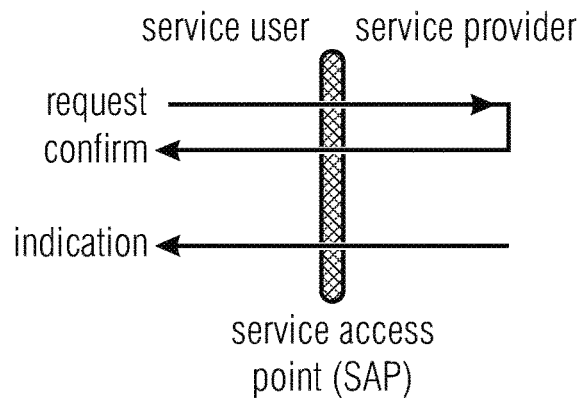
FIG. 29 shows an example of a communication.

The services of a layer are the capabilities it offers to the user in the next higher layer or sublayer by building its functions on the services of the next lower layer. This concept may be illustrated in FIG. 29, showing the relationship of the service user and the service provider (next lower layer).

The services are specified by describing the information flow between the user and the layer. This information flow is modeled by discrete, instantaneous events, which characterize the provision of a service. Each event consists of passing a service primitive from one layer to the other through a layer SAP associated with a user. Service primitives convey the required information by providing a particular service.

These service primitives are an abstraction because they specify the provided service rather than the means by which it is provided. This definition is independent of any other interface implementation.

4.7 Functional Overview

This clause provides an overview on the functionality supported by the disclosure.

4.7.1 MAC Sublayer

The MAC layer of this disclosure allows two modes of channel access operation.

4.7.2 PHY Layers

This disclosure supports three distinct PHY layers.

4.7.2.1 PM-PHY Introduction 4.7.2.2 LB-PHY Introduction 4.7.2.3 HB-PHY Introduction 4.7.3 Addressing In an OWPAN, flat addressing of devices is facilitated. Each device in an OWPAN has a unique MAC-48 address, consisting of 48 bits. This address can be used to integrate the OWPAN with other LANs, which are relying on the MAC-48 address format [Reference to Std. 802.1D & Std. 802.1Q.]

To increase signaling efficiency, a device gets a shorter address assigned during the association process. The short address consists of 16 bits and may be used to identify the device in various control and management procedures or to facilitate addressing in the MAC frame.

Certain addresses are reserved for special purposes. For MAC-48 addresses, the reserved addresses shall (in some examples) be the same as in the [IEEE 802 MAC address details standard].

The short address 0x0000 shall (in some examples) not be used. The short address 0xFFFF shall (in some examples) be used as the broadcast address. A frame addressed to the broadcast address shall (in some examples) be received by all devices.

4.7.4 Duplex Mode

All medium access is controlled by the coordinator of an OWPAN. The coordinator may allow for implicit full duplex transmission and reception of a device, if the device supports the capFullDuplex capability.

4.8 Conventions in this Disclosure

This clause lists different conventions for the format, terminology and units within this disclosure.

4.8.1 Format Conventions

Constants and attributes that are specified and maintained by the MAC sublayer are written in italics and without spaces. Constants have a general prefix of "a", e.g., aMinFragmentSize. Variable attributes have a general prefix of "mac", e.g., macOwpanId.

Names of frames, elements or fields are also written in italics. They are capitalized and might contain whitespaces, e.g., Association Request element.

4.8.2 Normative Terminology

Requirements on conformant implementations of this disclosure are expressed using the following terminology:

a. Shall is used for mandatory requirements
b. May is used to describe optional functionality that the implementation is permitted to support
c. Should is used for recommended implementation and configuration choices 4.8.3 Power Levels Optical wireless communication utilizes intensity modulated light and direct detection at the receiver. Hence, electrical signal levels, as measured at the receiving DSP, do not relate to the received optical power level in the same way for all devices. Rather, the relationship between received optical power and received electrical power depends on implementation details, such as LED and photodetector characteristics, of a given device.

To compare signal levels, one must (in some examples) thus refer to the optical power and not the electrical power. When signal levels are specified in this disclosure, these are optical powers. This is the case for emitted signal levels and received signal levels as well.

5 MAC Functional Description

This clause specifies functions and procedures of the MAC sublayer. Procedures may be initiated by the MAC or the consequence of a MLME-SAP primitive invocation. The MAC makes use of the physical layer service and is responsible for the following tasks:

Performing channel access and transmission in correspondence with the OWPAN's configuration
Starting and maintaining an OWPAN
Associating/disassociating with/from an OWPAN
Fragmenting and aggregating MSDUs
Providing a reliable link between two peer MAC entities
Adapting to alternating channel conditions The MAC frame formats supporting the function of the MAC are specified in clause 6. Services, MAC PIB attributes and device capabilities are specified in clause 7. The support for security is specified in clause 8.

5.1 MAC Overview

This clause specifies the majority of MAC functionality. It covers procedures for frame transmission, as initiated through the MCPS-DATA.request primitive until the start of PSDU processing through the PHY. Similarly, procedures for frame reception, starting after the successful reception of a PSDU through the PHY to the triggering of a MCPS-DATA.indication primitive are described.

An OWPAN can operate in beacon-enabled or non-beaconed enabled mode. Depending on which mode is used by the coordinator, channel access is performed in different ways. However, the remaining transmit and receive process are the same, regardless of the applied channel access mechanism.

5.1.1 The Transmit Process

The transmit process starts when the MAC receives an MSDU through the MCPS-SAP or when the MLME requests transmission of a management frame.

The MAC shall (in some examples) maintain a translation table between MAC-48 addresses and device short addresses.

A device prepares MPDUs for transmission in accordance with the maximum duration, as dictated through the applied channel access mode, for transmission. The details of obtaining a transmission opportunity depend on the channel access mechanism applied in the associated OWPAN (see clauses 5.2. and 5.3).

Figure 30:
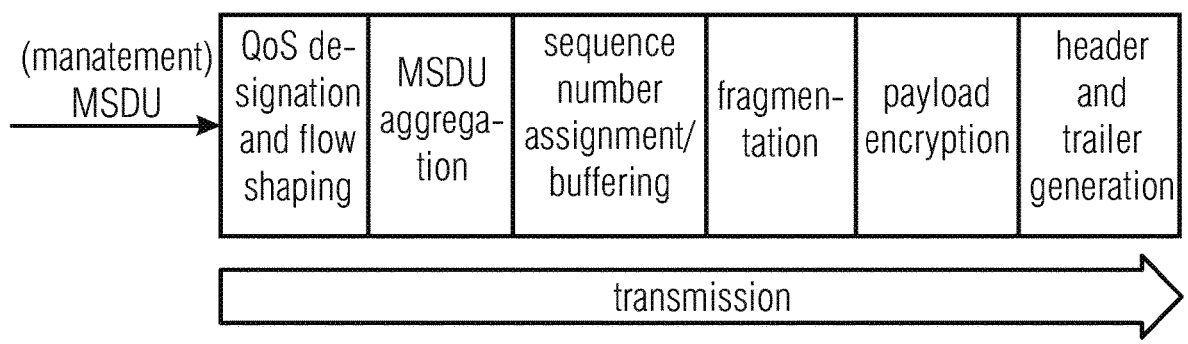
FIGS. 30-40 show examples of processes.

FIG. 30 shows a MAC transmit process.

A device shall (in some examples) ensure that the MPDU size does not exceed the maximum supported PSDU size of the used PHY.

5.1.2 The Receive Process

The reception process starts when the MAC receives an incoming MPDU from the PHY.

Figure 31:
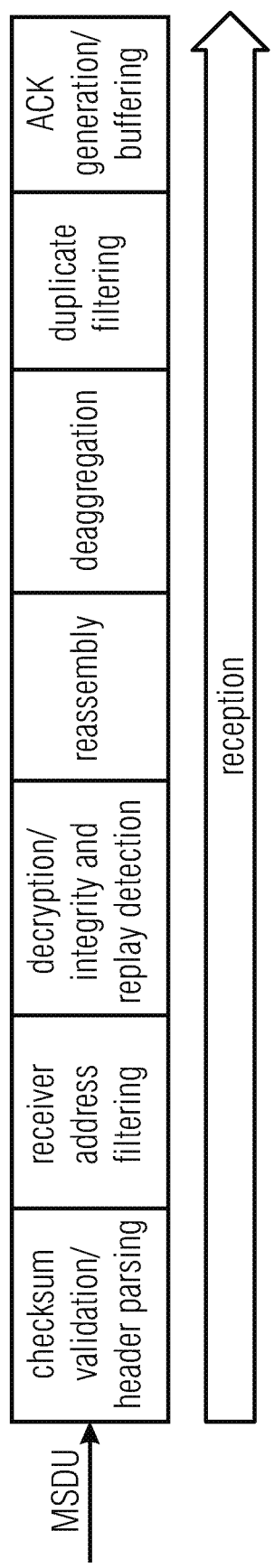

FIG. 31—shows a MAC receive process.

After a PSDU was extracted by the PHY, it enters the MAC through the conceived PHY-SAP. The MAC shall (in some examples) then first check the integrity of the frame based on the FCS included in the frame. If the frame contains uncorrectable errors, the MAC shall (in some examples) discard the frame. If the frame was received successfully, the MAC may parse the frame.

The MAC shall (in some examples) discard frames that have an unsupported Frame Version in their Frame Control element (6.6.1.1).

The MAC shall (in some examples) filter frames based on the included receiver address. It shall (in some examples) discard all frames that are not unicasts to itself or addressed to the broadcast address. If the device is member of the multicast group, which the frame is addressed to, the MAC shall (in some examples) also not discard the frame. The MAC shall (in some examples) also discard data and management frames that do not belong to the OWPAN it is associated with.

For remaining received frames that indicate the usage of security in their header, the MAC shall (in some examples) perform decryption, authenticity checking and replay detection and prevention as detailed in the respective security clause. For that purpose, the MAC makes use of the security information included in the Auxiliary Security Header of the frame as specified in the respective clause for the security type.

If the frame indicates to contain a fragment, the MAC shall (in some examples) buffer the frame and perform reassembly according to 5.5. Subsequently, it shall (in some examples) perform disaggregation according to 5.6.2 if the frame contains aggregated MSDUs.

For each received MSDU, the MAC shall (in some examples) filter duplicates according to clause 5.7. Finally, the MAC shall (in some examples) generate an acknowledgment for each successfully received MSDU according to 5.7.1 or 5.7.2, depending on the configuration.

5.2 Beacon-Enabled Channel Access

If an OWPAN runs in beacon-enabled channel access mode, channel time is divided into subsequent superframes. Each superframe is composed of three major parts: a beacon transmission, an optional contention access period (CAP) and the contention free period (CFP).

Transmission of the beacon by the OWPAN coordinator is described in 5.2.2.

In the CAP, devices may access the channel randomly by means of slotted ALOHA. Random channel access in the CAP may be only allowed for specific procedures and frame types as specified I 5.2.3.

All other frame transmissions happen in the CFP (see 5.2.4). The CFP consists of reserved resources, called GTSs, which are assigned to each device for a given superframe. The coordinator schedules and announces GTS allocations as described in 5.2.5.

5.2.1 Superframe Structure

A superframe may consist in total of macNumSuperframeSlots superframe slots. macNumSuperframeSlots is a variable determined by the OWPAN coordinator and announced to the devices in the beacon frame. The maximum number of superframe slots within a superframe is 65535 (see 6.6.1.10). Each superframe slot has a duration of aSuperframeSlotDuration. The number of superframe slots and their respective duration determine the total duration of each superframe.

The disclosure makes use of integer numbers of superframe slots to specify durations within the superframe. That can be durations of the CAP, CAP slots, GTS and other sub-parts of the superframe.

Each OWPAN coordinator defines the superframe structure for its coordinated OWPAN. Consecutive superframes of an OWPAN do not necessarily have to be adjacent but may have channel time between them that is not used by the OWPAN.

In the coordinated topology, the master coordinator determines when the superframe of each OWPAN starts and how long it is. The details of the coordinated topology are outside the scope of this disclosure.

Figure 32:
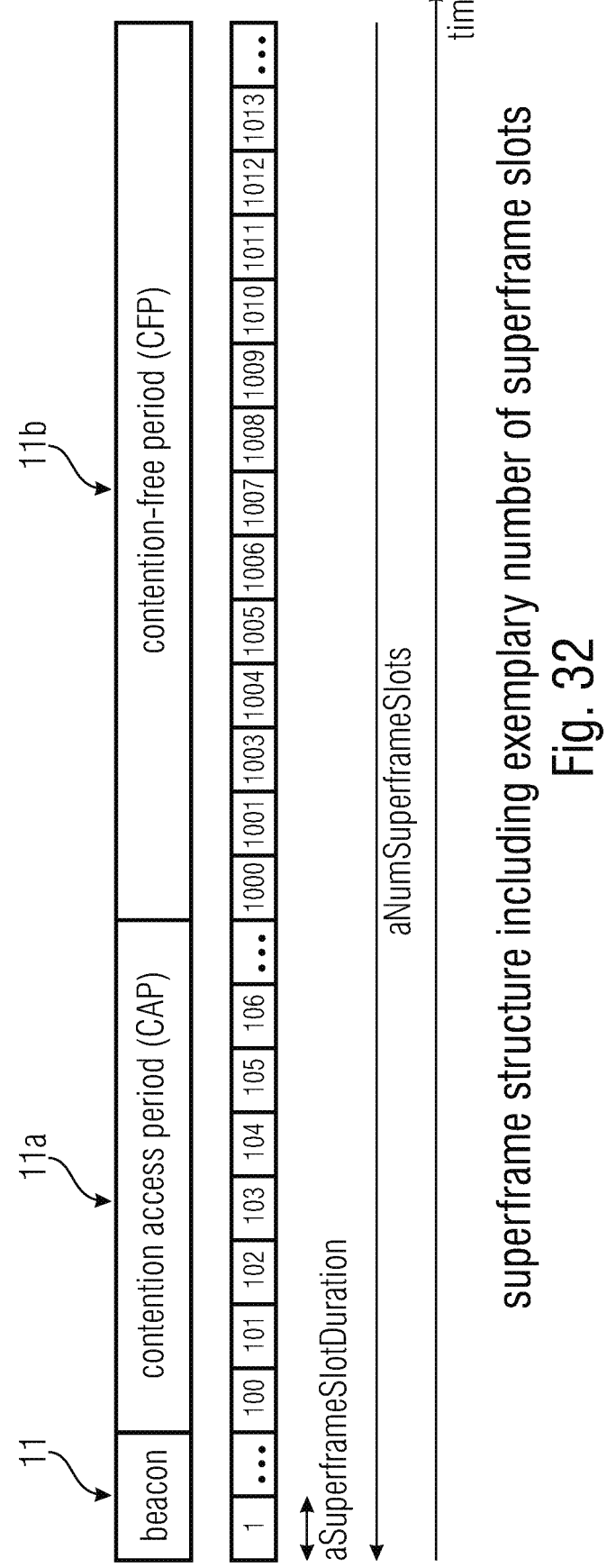

Of the macNumSuperframeSlots superframe slots in a superframe, three consecutive slot groups are used for the beacon transmission, the CAP and CFP respectively as shown in FIG. 32. The number of superframe slots reserved for the beacon transmission depends on the length of the beacon frame. The length of the CAP is determined by the OWPAN coordinator and may change from superframe to superframe. The remaining slots in the superframe are used for the CFP and can be used for frame transmissions between the devices and the coordinator.

5.2.2 Beacon Transmission

In the beacon-enabled channel access mode, the coordinator shall (in some examples) transmit a beacon at the beginning of the superframe. The beacon frame is a control frame containing either solely the Superframe Descriptor element or the Superframe Descriptor element and additional elements via the Variable Element Container element. Beacons should be transmitted with a constant periodicity when possible. The modification of the superframe timing may, for example, be a case in which the beacon periodicity changes.

The coordinator shall (in some examples) maintain the macBeaconNumber PIB attribute and increment it by one for every started superframe and corresponding beacon transmission. The macBeaconNumber may wrap to 1 after reaching the highest possible value. The highest possible value is determined by the coordinator.

The coordinator shall (in some examples) embed the current macBeaconNumber into the Superframe Descriptor element of each beacon. Upon reception of a beacon frame, each associated device shall (in some examples) set their value of the macBeaconNumber attribute to the value in the received beacon frame.

Upon reception of a beacon frame, devices shall (in some examples) synchronize their clocks to the received beacon frame as described in 5.2.6. Moreover, devices which are either associated with the corresponding OWPAN or attempt to associate with the given OWPAN shall (in some examples) set its macNumSuperframeSlots, macCapSlotLength attributes of the MAC to the values contained in the received Superframe Descriptor element.

When multiple OFEs are used by the coordinator, the beacon frame shall (in some examples) be transmitted over all OFEs simultaneously. If the coordinator supports the capMultiOfeFeedback capability, it shall (in some examples) embed orthogonal pilot symbols in the beacon frame, as detailed in clause 5.8.4.

Devices shall (in some examples) expect the next beacon reception directly after the superframe. If no beacon frame is detected, devices shall (in some examples) keep listening for the next beacon frame in order to synchronize before attempting further transmissions.

5.2.3 Medium Access in the CAP

The CAP shall only (in some examples) be used for frame transmissions in the
  a) Association procedure (see 5.2.3.1)
  b) Resource request procedure (see 5.2.3.2)

The CAP shall (in some examples) start with the superframe slot following the beacon and end before the beginning of the CFP on a superframe slot boundary. The length of the CAP is advertised in the beacon frame (see 6.6.1.10). Both CAP and CFP periods may shrink or grow dynamically on a superframe-by-superframe basis in order to allow more random access transmissions in the CAP or more scheduled ones in the CFP.

The slotted Aloha scheme is used for contention-based access in the CAP. The superframe slots in the CAP are grouped in so-called CAP slots, which comprise macCapSlotLength superframe slots each. The number of superframe slots per CAP slot determines the slot size for the slotted Aloha scheme and hence the effectiveness of collision prevention. macCapSlotLength is advertised in the beacon frame (clause 6.6.1.10).

A device willing to transmit shall (in some examples) choose a number of CAP slots RS uniform randomly from [1, CV], where CW is equal to aInitialCapCw for the first attempted transmission. Random number generators of all devices shall (in some examples) be statistically uncorrelated. Subsequently, the device shall (in some examples) wait for RS CAP slots before attempting transmission. The waiting process may extend over multiple superframes, until a total of RS CAP slots have passed. The transmission shall (in some examples) then be performed at the starting boundary of the next CAP slot.

Transmissions in the CAP may not be acknowledged like other frames, as defined in 5.7. If a device implicitly detects that a CAP transmission was not successful, e.g. by the fact that the expected response is never received, the device shall (in some examples) increment the variable RC by one. RC shall (in some examples) initially be 0. How to detect unsuccessful CAP transmission depends on the specific procedure. Details are given in the respective clauses 5.2.3.1 and 5.2.3.2. The CAP transmission shall (in some examples) ultimately be given up, once RC exceeds an implementation-specific value.

For every failed transmission, the device shall (in some examples) double CW before attempting retransmission of the frame in the CAP. However, CW should not exceed aMaximumCapCw. For the retransmission, the device shall (in some examples) then wait again for a random number of CAP slots RS, drawn from [1, CW] and pursue retransmission at the start of the following CAP slot.

Following a CAP transmission, a device shall (in some examples) be continuously listening in the CFP in order to receive a potential response to the frame transmitted in the CAP.

5.2.3.1 Association Association Procedure in the CAP

As a device does not have GTS assigned prior to association, the association request frame must (in some examples) be transmitted in the CAP. Hence, the requesting device begins the CAP transmission procedure after preparing a frame containing the Association Request element as described in 5.4.5.

If the device supports the capMultiOfeFeedback capability, it shall (in some examples) include a Multi-OFE Feedback element, containing the CSI obtained from the latest beacon frame reception in the same frame. If the beacon does not contain additional multi-OFE channel estimation pilots, the device shall (in some examples) not include the Multi-OFE Feedback element.

Figure 33:
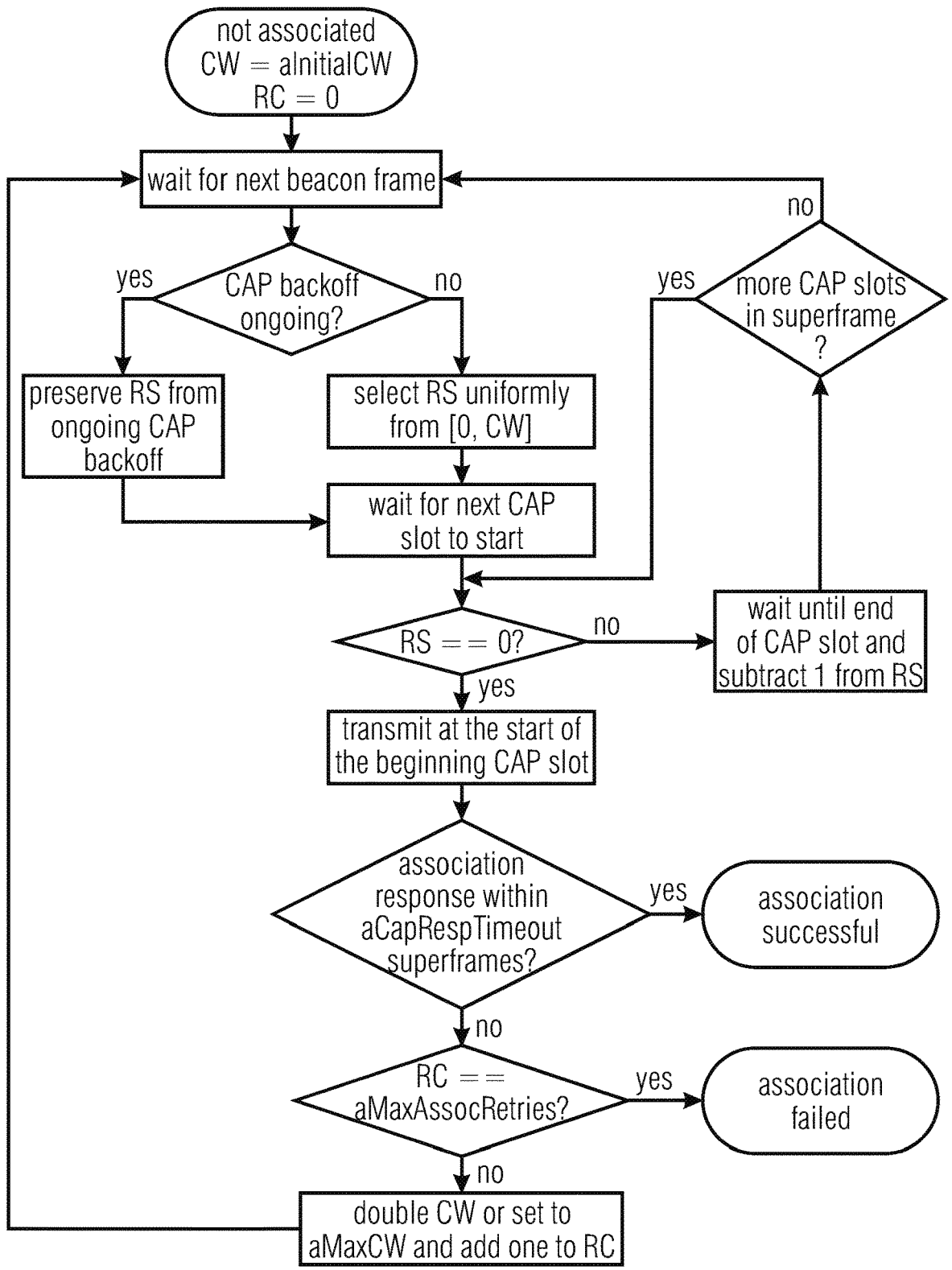

A flow chart of the association request procedure is given in FIG. 33.

If the associating device does not receive an Association Response after am implementation dependent number of superframes, it may infer that the transmission of the Association Request failed. In that case, the device shall (in some examples) attempt retransmission of the Association Request in the CAP as described in 5.2.3.

5.2.3.2 Resource Request Procedure in the CAP

When a device does not have any or only (in some examples) insufficient GTS time allocated for its transmissions, it may perform the resource request procedure. For example, this may be the case after the connectivity from coordinator was interrupted and the coordinator stopped allocating GTSs for the device.

In that case, the device may transmit a control frame in the CAP to signal the requirement for GTS time to the coordinator. If the capMultiOfeFeedback capability was negotiated during association, the control frame shall (in some examples) include the Multi-OFE Feedback element, containing the multi-OFE CSI obtained from the latest beacon frame reception.

Figure 34:
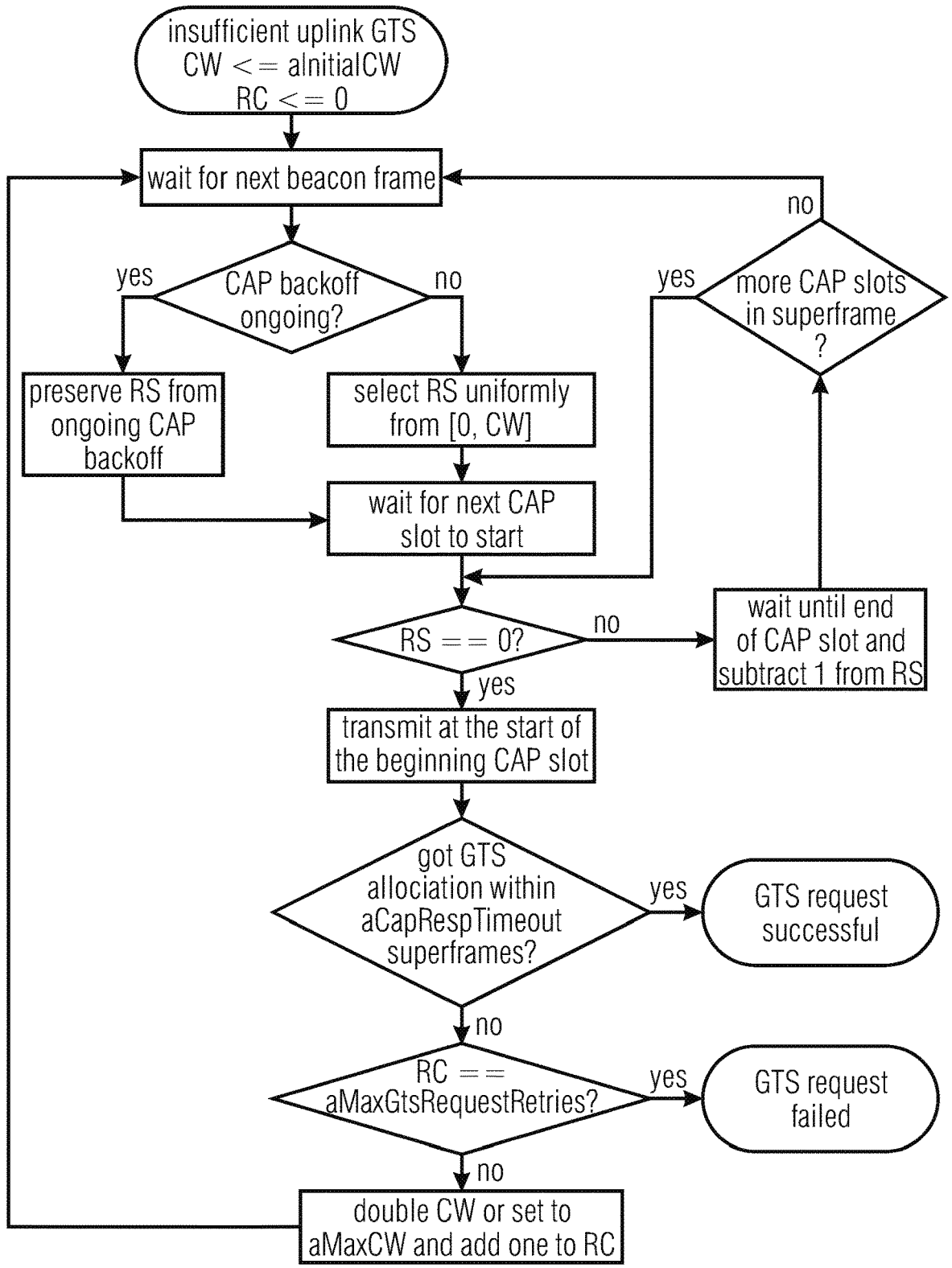

The procedure for a GTS request in the CAP is similar to the association procedure. The corresponding flow chart is depicted in FIG. 34.

5.2.4 Medium Access in the CFP

Channel access in the CFP is based on a dynamic TDMA principle. Superframe slots can be reserved on a per-device basis in order to allow contention-free medium access. A group of adjacent superframe slots that is reserved for a specific device is called guaranteed time slot (GTS). The first superframe slot and a duration, given in an integer number of superframe slots, define the position of a GTS in the superframe as described in clause 6.1.13.1. GTS shall only (in some examples) reside within the CFP.

A device shall (in some examples) keep a list of all its upcoming GTS after it received the corresponding GTS Descriptor element. A device shall only (in some examples) transmit in GTS that were assigned to it.

Devices should ensure that transmitted signals cannot interfere with transmissions in other GTS at any other device. This includes, for example, regarding for the total transmit delay introduced by the used PHY and the assumed propagation delay and range. A device shall (in some examples) ensure that its transmissions adhere to the rules for inter-frame spaces, as described in 5.2.7.

A device with a GTS may or may not make use of all the allocated time duration within the GTS. The selection of an MPDU for transmission is determined locally by the device depending on the number of pending frames in its queue and the value of their user priority fields and potentially other criteria.

The coordinator may perform transmissions to a device at any point in the CFP. Hence, all devices must (in some examples) listen for receptions during the whole CFP. Vice versa, the coordinator must (in some examples) be listening to the channel for receptions during each GTS.

5.2.5 GTS Allocation and Signaling

Only (in some examples) the OWPAN coordinator is entitled to (de-)allocate GTSs. Any allocated GTSs shall (in some examples) be located within the CFP.

If the coordinator supervises multiple spatially distributed OFEs, it may allocate the same superframe slots in different GTS for multiple spatially distant devices in order to facilitate spatial reuse of resources throughout the OWPAN's coverage area. However, the coordinator must (in some examples) ensure that transmissions from and to devices that share the same superframe slots do not interfere.

Devices aid the coordinator in the GTS allocation process through providing information about their queue states and making flow reservations.

Devices aid the coordinator to avoid interference in the GTS allocation process through providing information about the signal strengths by which they receive the nearest OFE.

The coordinator may move GTSs within the superframe on a superframe-by-superframe basis. This allows the coordinator the flexibility to rearrange GTS assignments, optimize the utilization of resources and prevent collisions of GTSs if visibility and signal strength varies among OFEs and devices due to mobility.

GTS allocations shall (in some examples) be advertised from the coordinator to the corresponding devices via control frames including GTS Descriptor elements. These control frames shall (in some examples) be unicasts and only (in some examples) be received by the devices for which the GTS allocations are designated. GTS allocations shall (in some examples) immediately override all existing GTS allocations in the device. Priorly allocated GTSs shall (in some examples) not be used after receiving new GTS allocations. GTS allocations get valid in the subsequent superframe or in the superframe indicated in the GTS allocation frame.

5.2.6 SYNCHRONIZATION

All devices, whether they are associated with a beacon-enabled OWPAN or attempting association, shall (in some examples) be synchronized to the coordinator's clock before they start transmission or reception. The beacon sent at the beginning of every superframe enables synchronization of the devices in the beacon-enabled OWPAN through time of arrival synchronization.

Figure 35:
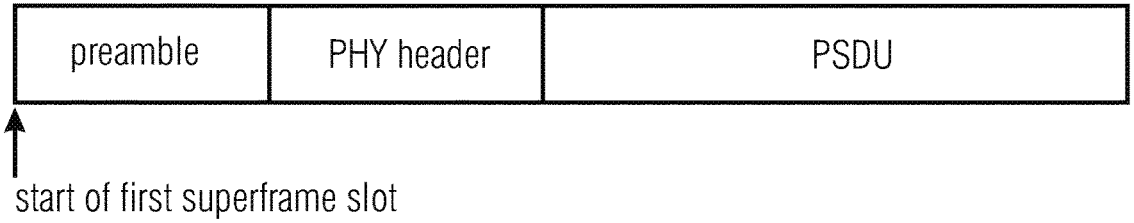

Each device in the OWPAN, including the coordinator, shall (in some examples) begin counting the first superframe slot at the beginning of the PHY preamble of the beacon, as shown in FIG. 35. All superframe slots and hence timings within the superframe are thus relative to the start of the beacon preamble.

A compliant device implementation shall (in some examples) maintain the accuracy of the local time to be at least as accurate as aClockAccuracy.

5.2.7 Interframe Spaces

The only (in some examples) IFS defined by this disclosure is the Turn Around Interframe Space (TAIFS). The TAIFS is used to ensure sufficient turnaround time between transmissions. The turn around time is defined as the maximum time a transceiver uses to switch from transmitting to being ready to receive or from receiving to starting a subsequent transmission. A transmitter has to ensure that its transmissions end at least a TAIFS before the end of the GTS in order to enable all receiving devices to fully utilize their GTSs from the beginning. The TAIFS shall (in some examples) be at least the maximum expected turn-around time as defined for each PHY.

If a device is able to ensure that all other devices are able to transmit and receive orderly in their GTSs, for example because they implement the capFullDuplex capability, it may disregard the requirement to finish transmissions at least a TAIFS before the end of its GTS.

Spaces between successive transmissions of a single transmitter are not strictly required. Receivers are expected to be able to process incoming frames fast enough to handle contiguous transmissions.

5.2.8 Guard Time

In a TDMA system, guard times are used to keep transmissions in adjacent GTS from colliding when local clocks of devices are imperfectly synchronized, e.g. through drift caused by frequency inaccuracies of device-local clocks. A GTS is defined by the start time and the duration, as specified in the GTS element (see clause 6.6.1.13). Guard time is the time between the end of one GTS and the start of the next GTS.

Figure 36:
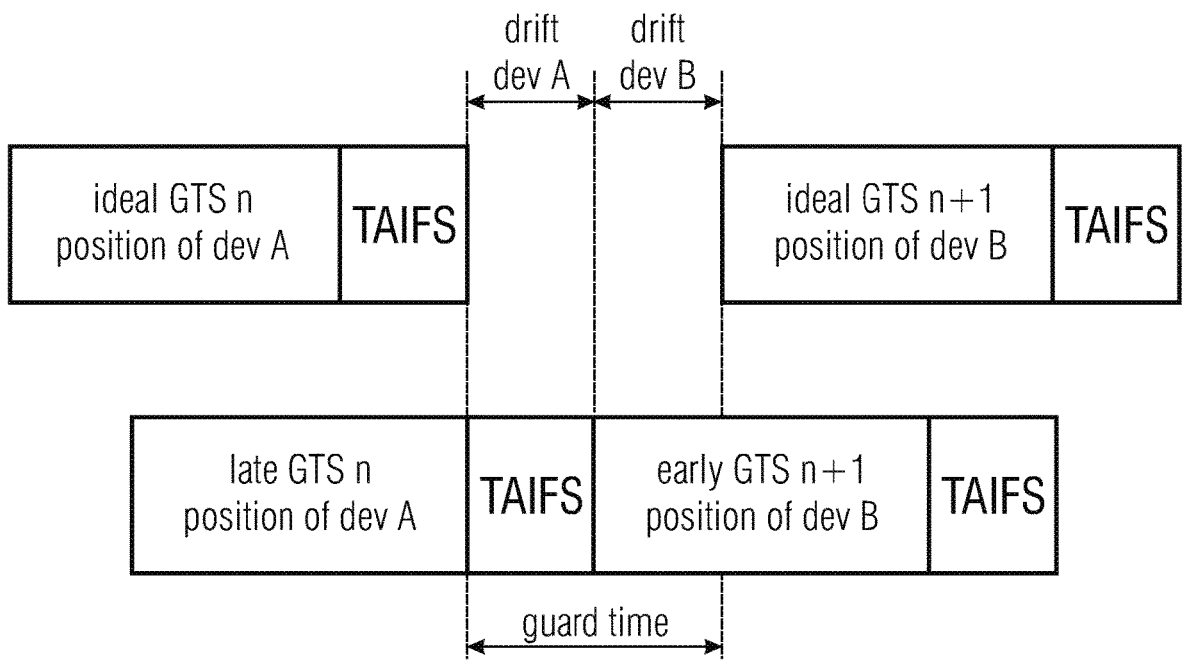

FIG. 36 depicts an illustration of the guard time such that consecutive transmissions are always separated by at least a TAIFS if the owners of adjacent GTS have drift towards the other GTSs.

The used guard time depends on the maximum drift MaxDrift between a device's local time and the ideal time. This drift is a function of the time elapsed since a synchronizing reference event, i.e. the beacon reception, and the precision of local oscillators in OFEs and devices defining the local sampling clock. In an IEEE 802.15.13 OWPAN, the synchronizing event is the start of the preamble of a beacon. The maximum drift MaxDrift can be calculated as follows:

$$MaxDrift=clock\ accuracy/super\ frame\ duration$$

The clock accuracy depends on the device implementation but shall (in some examples) not be worse than the value given by the aClockAccuracy PIB attribute. The superframe duration is the current duration of the superframe and hence periodicity of the synchronizing event.

The synchronization accuracy SyncAccuracy describes how accurately the devices can be synchronized to the coordinator's clock. This value depends on the coordinator implementation and shall (in some examples) be determined by the vendor. The value shall (in some examples) also include the uncertainty introduced through the varying propagation time of the beacon frame, based on which the synchronization is performed.

The coordinator shall (in some examples) ensure that a guard time of at least 2·(MaxDrift+SyncAccuracy) lies between two subsequent GTS that are not orthogonal in space.

5.3 Non-Beacon-Enabled Channel Access
[see document 15-18-0488-01-0013]
5.4 OWPAN Management This clause describes the scanning for existing OWPANs, starting of new OWPANs as well as the association and disassociation of devices with/from and existing OWPANs.

5.4.1 Scanning for OWPANs

A scan procedure is performed by a device to detect any OWPANs that are operating in its vicinity. In light communication, a single frequency range in the baseband is utilized for all transmissions. Hence, scanning for existing OWPANs reduces to the scanning of a single frequency channel. However, multiple OWPANs may be coordinated by a master coordinator and share the total available channel time.

IEEE 802.15.13 devices shall (in some examples) support passive scanning for OWPANs. During a passive scan, the device listens for incoming frames but also non-decodable signals whose received power exceeds the threshold of macEdScanThreshold. If a device makes use of multiple optical frontends, it shall (in some examples) listen on all frontends and try to decode receptions for each frontend individually.

The scan is started upon request by the DME through the MLME-SCAN.request primitive or by the MLME itself. A device instructed to scan for OWPANs shall (in some examples) listen for received beacon or RA frames during the scan period. During a scan, the MAC sublayer shall (in some examples) discard all other received frames.

For every successfully decoded beacon or RA frame in the scan period, the device shall (in some examples) add the corresponding OWPAN ID and OWPAN name to the scan result list. It shall (in some examples) furthermore add the received electrical SNR and security type as indicated in the frame to the result list. The returned list shall (in some examples) not contain duplicate entries.

If a device detects at least one non-decodable signal that has a received power of more than macEdScanThreshold during the scan time, the device shall (in some examples) add an entry with OWPAN ID=0xFFFF, OWPAN name="Unknown" and the received power level of the strongest received signal to the scan result list.

If the scan was initiated through the MLME-SCAN.request primitive, the results of the scan shall (in some examples) be returned via the MLME-SCAN.confirm primitive.

5.4.2 Starting an OWPAN

The process of starting a new OWPAN is initiated after a coordinator-capable device was instructed to do so through the MLME-START.request primitive of the MLME-SAP. This subclause describes the steps involved in starting and maintaining the OWPAN. If the prospective coordinator maintained an OWPAN before, the DME shall (in some examples) stop the OWPAN, according to 5.4.4, prior to starting a new OWPAN in order to reset all MAC and PHY state and disassociated potentially associated devices.

The DME shall (in some examples) issue a scan immediately before attempting to start a new OWPAN. The DME shall only (in some examples) issue the MINE-START.request primitive, if the corresponding scan reported an empty result list or if resource coordination between multiple OWPAN coordinators can be provided through a coordinated topology.

The DME of the prospective coordinator shall (in some examples) select an OWPAN ID and OWPAN name. If the coordinator implements the capShortAddressing capability, it shall (in some examples) adopt the selected OWPAN ID as its short address. The DME shall (in some examples) provide the selected OWPAN ID, OWPAN name and its short address as a parameter of the MLME-START.request. The MAC shall (in some examples) set the macSecurityType attribute to the security type conveyed via the MLME-START.request primitive.

NOTE—The OWPAN ID may be allocated by a master coordinator. Two neighboring OWPANs shall (in some examples) not use the same OWPAN ID. Two OWPANs may use the same OWPAN name.

On receipt of the MLME-START.request, the MLME of the prospective coordinator shall (in some examples) prepare operation as a coordinator and subsequently start transmitting frames in accordance with the configured channel access mode.

5.4.3 Maintaining an OWPAN

After successfully starting an OWPAN, the coordinator and associated devices shall (in some examples) support the primitives of the MCPS-SAP and the corresponding MAC data path functionality as well as the primitives of the MLME-SAP that implemented and part of the supported capabilities.

A coordinator may change parameters of a running OWPAN such that devices that are associated with the OWPAN need to modify their respective PIB attributes. To control PIB attributes of associated devices, the coordinator may transmit an Attribute Change Request element to the concerned device. The Attribute Change Request element shall (in some examples) contain the corresponding PIB attribute name and the new value to be set.

A device receiving the Attribute Change Request shall (in some examples) modify the value of the indicated attribute to reflect the requested change. Subsequently, it shall (in some examples) respond to the coordinator with an Attribute Change Response, indicating the result of the attempted attribute change.

5.4.4 Stopping an OWPAN

To stop an existing OWPAN, the DME of a coordinator shall (in some examples) issue the MLME-STOP.request through the MLME-SAP. Upon reception of the primitive, the coordinator shall (in some examples) disassociate all associated devices with an appropriate reason code. Successively, it shall (in some examples) purge all state that was introduced during the up time of the OWPAN.

5.4.5 Associating with an OWPAN

The association procedure involves multiple steps:
1. Request association with the goal to obtain (temporary) channel access
2. Optionally request authentication if required by the OWPAN

5.4.5.1 Association Request

A device MLME is instructed to attempt association with an existing OWPAN by the DME through the MLME-ASSOCIATE.request primitive. Before starting the association procedure, a device shall (in some examples) reset all state including queues and variables of its MAC.

After receiving the MLME-ASSOCIATE.request, the device shall (in some examples) prepare a management frame to be transmitted to the OWPAN coordinator. The management frame shall (in some examples) include the Association Request element by either being a dedicated Association Request frame or having the Association Request element included by other means.

The Association Request element shall (in some examples) include the capabilities supported by the device for the desired association. Furthermore, the request shall (in some examples) include the necessary information as detailed in clause 6.6.1.3.

The requesting device shall (in some examples) transmit the management frame to the coordinator of the OWPAN in accordance with the channel access rules for association. These differ depending on the applied channel access mode in the OWPAN as detailed in clauses 5.2 and 5.3 respectively. The frame shall (in some examples) be transmitted unprotected (refer to clause 5.7).

If the coordinator MLME decides to pursue association, it shall (in some examples) prepare a management frame containing the Association Response element. The Association Response element shall (in some examples) include a set of capabilities to be used during the prospective association. The set of capabilities shall (in some examples) include no other capabilities than previously indicated by the device in the Association Request element. The precise set of capabilities may be selected by the coordinator.

If the coordinator decides, not to pursue association, it shall (in some examples) an Association Response element with the appropriate Status Code set.

If the OWPAN is secured and requires further authentication, the Association Response element shall (in some examples) contain further information used for the subsequent authentication of the device as detailed in clause 8. After successful reception of an Association Response element, the device shall (in some examples) perform authentication with the OWPAN coordinator if necessary.

Figure 37:
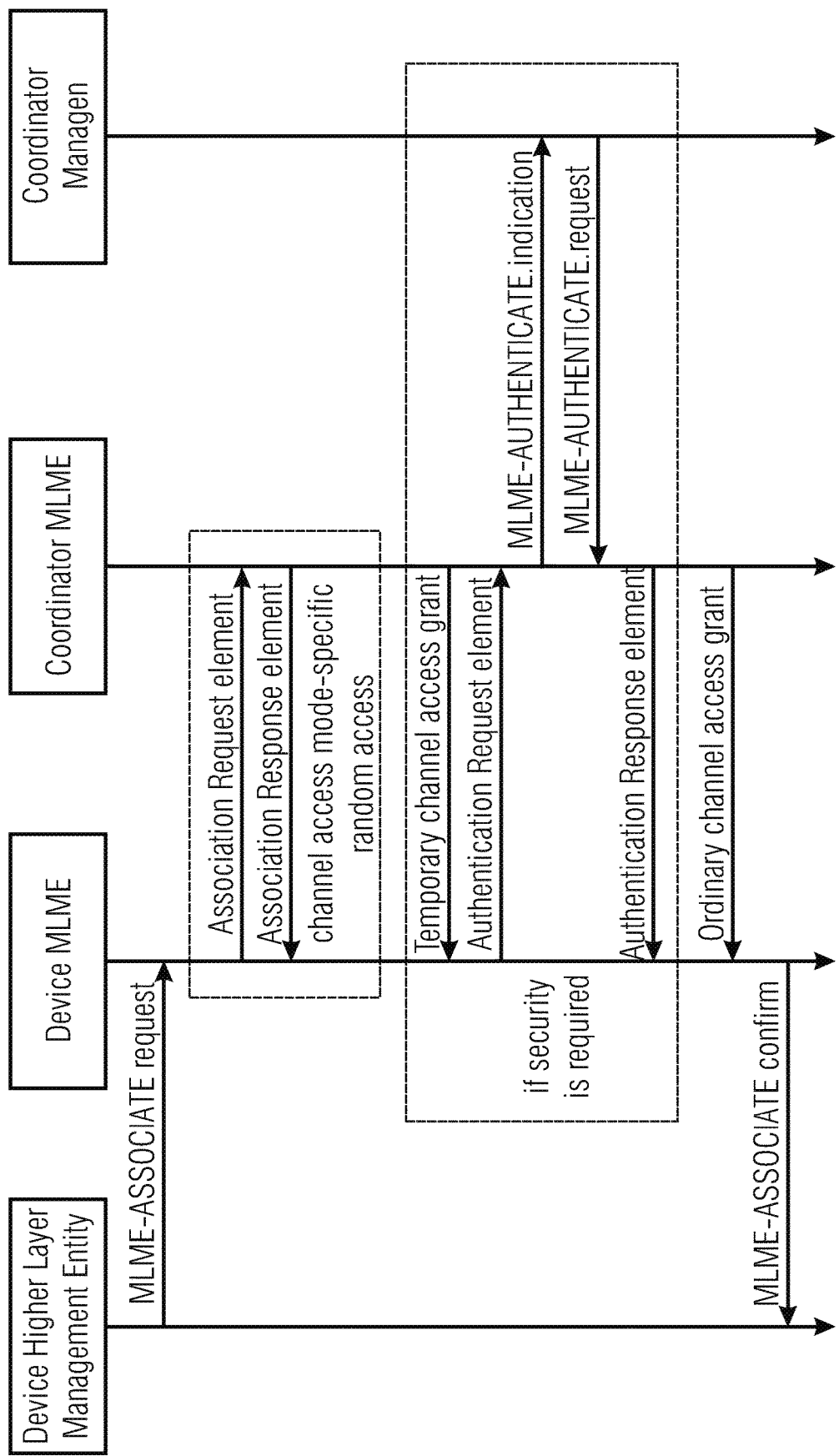

A sequence chart of a successful association procedure is depicted in FIG. 37.

5.4.5.2 Authentication Request

If the Association Response element received by the device indicates that further authentication is required, the device shall (in some examples) process the authentication material included in the Association Response element in correspondence with the applied security type. The resulting authentication data shall (in some examples) then be included in an Authentication Request element and transmitted via management frame to the coordinator.

For transmission of the Authentication Request element, the coordinator may grant temporary channel access to the associating device. If not, the device may transmit the Authentication Request element analogously to the association request in the CAP.

After receiving the Authentication Request element from the associating device, the coordinator MLME shall (in some examples) indicate to the DME that a device seeks authentication via the MLME-AUTHENTICATE.indication. The DME shall (in some examples) then authenticate the device and provide the result to the MLME via the MLME-AUTHENTICATE.request. The DME shall (in some examples) respond to the MLME-AUTHENTICATE.indication within 30 seconds.

The MLME shall (in some examples) transmit an Authentication Response element to the device attempting association. If the authentication was successful, the device shall (in some examples) consider being associated with the OWPAN. For the duration of the ongoing association, it shall (in some examples) make use of the security, i.e. encryption, integrity assurance and replay protection used by the OWPAN and detailed in the respective security type clause.

The coordinator may consider the device successfully associated after receiving an acknowledgment for the frame containing the Association Response element or Authentication Response element respectively.

5.4.6 Disassociating from an OWPAN

The disassociation of a single device from an OWPAN may be initiated by either the coordinator of the OWPAN or the affected device itself through the MLME-DISASSOCIATE.request primitive.

Figure 38:
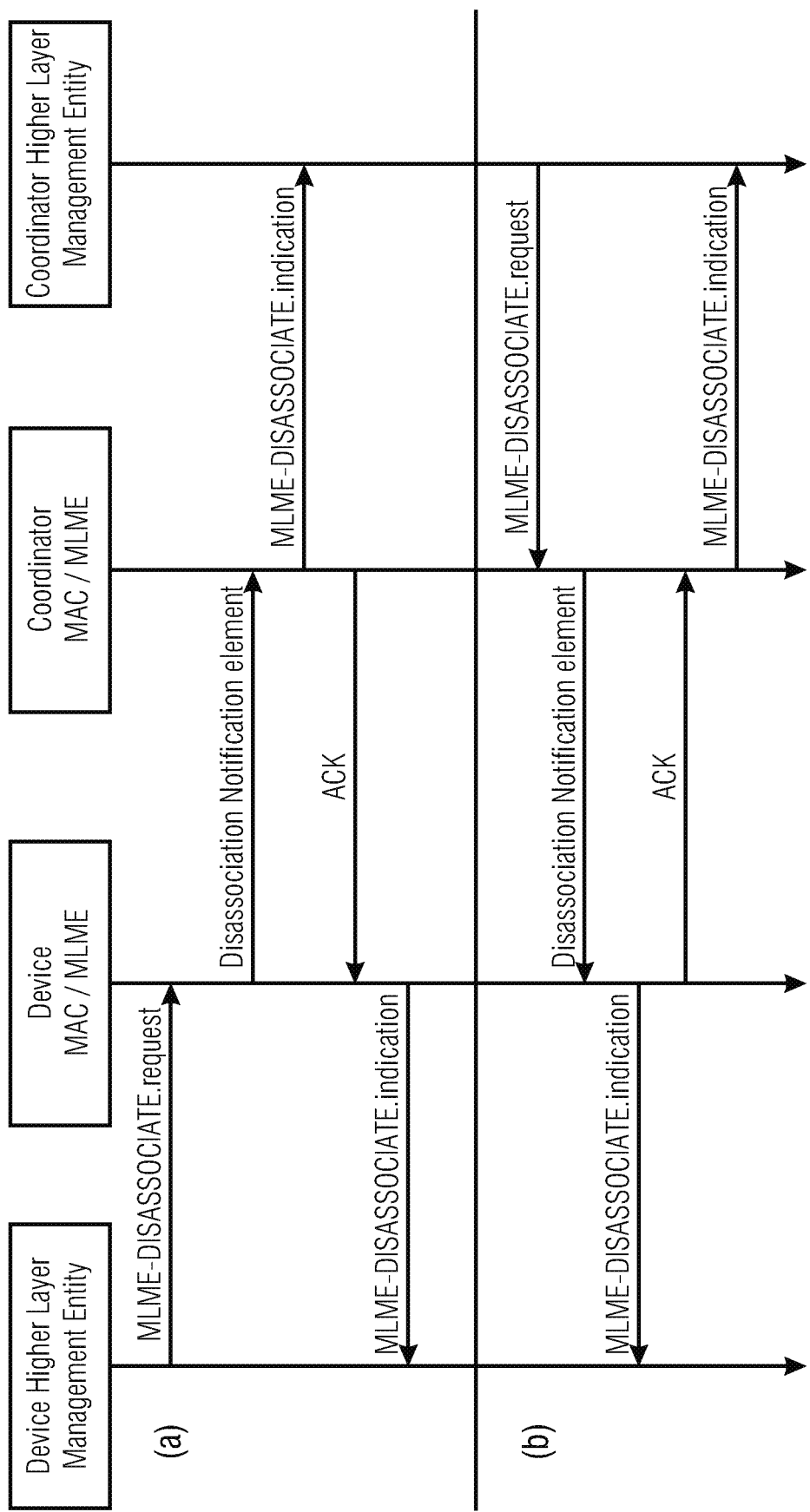

To disassociate a device from the OWPAN, the coordinator shall (in some examples) transmit a management frame, containing the Disassociation Notification element, to the device to be disassociated as depicted in FIG. 38a). If the coordinator does not receive a corresponding acknowledgment frame, it shall (in some examples) regard the device as disassociated after it did not receive further frames from the device for timeout provided as the Timeout primitive parameter.

A device that wants to disassociate from the OWPAN shall (in some examples) transmit a management frame containing the Disassociation Notification element to the coordinator of the OWPAN as depicted in FIG. 38(b). It shall (in some examples) assume to be disassociated after if received an acknowledgment for the transmitted management frame.

5.5 Fragmentation and Reassembly

Fragmentation may be performed by the transmitting device on a MSDU or A–MSDU. An (A–) MSDU shall (in some examples) be fragmented into 16 fragments at most. All fragments shall (in some examples) contain an even number of octets, except the last fragment, which may contain an odd number of octets. Once the (A–) MSDU is fragmented and a transmission attempted, it shall (in some examples) not be fragmented again. The smallest size of a fragment, excluding the last fragment, shall (in some examples) be at least aMinFragmentSize.

An MPDU containing a fragmented MSDU or A-MSDU shall (in some examples) have the Sequence Control element present. All fragments but the last fragment shall (in some examples) be sent with the Last Fragment field of the data MPDU set to 0. The last fragment shall (in some examples) have the Last Fragment field set to 1. Each subsequent fragment shall (in some examples) be sent with the Fragment Number field incremented. However, the Fragment Number field shall (in some examples) not be incremented when a fragment is retransmitted.

MPDUs containing fragments shall (in some examples) have a sequence number present in the Sequence Control element in the header. Hence, fragmented (A–) MSDUs shall (in some examples) always be transmitted protected. All fragments of the same (A–) MSDU shall (in some examples) have the same sequence number in the MPDU header. Defragmentation of an (A–) MSDU is the reassembly of the received fragments into the complete (A–) MSDU. The (A–) MSDU shall (in some examples) be completely reassembled in the correct order before delivering it to the higher layer.

The receiving device may discard the fragments of an MSDU if it is not completely received within a timeout determined by the receiving device. The destination device may also discard the oldest incomplete MSDU if otherwise a buffer overflow would occur. Fragments shall (in some examples) be transmitted in order of their fragment numbers. If the no-ACK policy is used, the destination device shall (in some examples) discard an MSDU immediately if a fragment is missing. A device shall (in some examples) support concurrent reception of fragments of at least three MSDUs.

5.6 Aggregation

A device may aggregate multiple MSDUs in a single MPDU in order to avoid the overhead of transmitting multiple MPDUs and corresponding PPDUs. Aggregated MSDUs (A-MSDUs) are transmitted in the payload of data frames of the A-MSDU subtype (see 6.3).

5.6.1 Aggregation Procedure

The aggregation procedure, as part of the transmit process detailed in FIG. 30, is applied when a device MAC decides to aggregate multiple MSDUs in a single MPDU.

A device shall only (in some examples) transmit multiple MSDUs in a single MPDU if the MSDUs have the same destination address as conveyed via the MCPS-DATA.request primitive. All MSDUs in an A-MSDU shall (in some examples) be either protected or unprotected. Protected MSDUs shall (in some examples) not be mixed with unprotected MSDUs. The total resulting MPDU size, resulting from all aggregated MSDUs and additional fields for aggregation, in octets shall (in some examples) not exceed phyMaxPsduSize of the used PHY.

Each MSDU to be part of an A-MSDU shall (in some examples) be wrapped in an MSDU Aggregation element. The MSDU Aggregation element shall (in some examples) include the total length of the wrapped MSDU in octets. Furthermore, the MSDU Aggregation element shall (in some examples) include the sequence number assigned to the MSDU.

If the MPDU containing aggregated MSDUs is transmitted reliably, it shall (in some examples) be assigned a single sequence number like an MPDU containing only (in some examples) a single MSDU. Upon reception of an acknowledgment by the receiver of the MPDU, all MSDUs contained in the MPDU shall (in some examples) be considered acknowledged and hence successfully transmitted.

Figure 39:
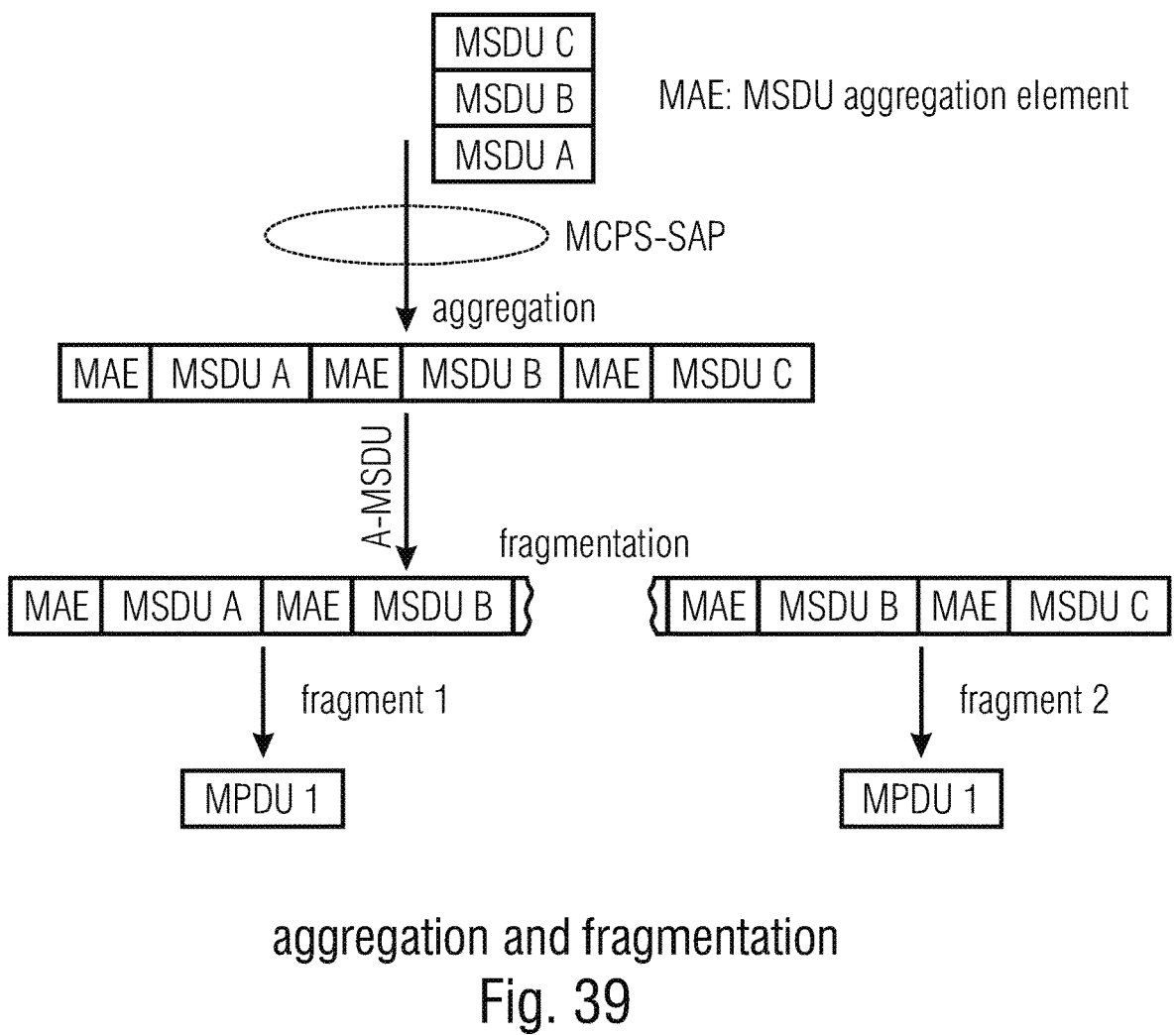

FIG. 39 depicts the aggregation and fragmentation during transmission of a frame. Three MSDUs, arriving at the MAC through the MCPS-SAP, are aggregated by being included in a MSDU Aggregation element (abbreviated as MAE). Aggregation is, however, optional.

An A-MSDU may optionally be fragmented. In the example, the A-MSDU, consisting of the three MSDUs A, B and C are divided into two fragments and wrapped in an MPDU each. The MPDU includes a new sequence number, serving reassembly of the A-MSDU at the receiver. That sequence number does not have to be acknowledged by the recipient device. However, each MSDU in an A-MSDU has its sequence number associated in the MSDU Aggregation element. These sequence numbers must (in some examples) be acknowledged by the receiver if the Frame Control element of the MPDU has the Ack Request bit set.

5.6.2 Disaggregation Procedure

If a device receives an A-MSDU data frame, it shall (in some examples) first check integrity of the whole MPDU based on the MPDU FCS field. If the MPDU was received without errors, the device shall (in some examples) acknowledge the corresponding sequence number of the MPDU.

Subsequently, the receiving device shall (in some examples) separate the payload of the A-MSDU frame into separate MSDU Aggregation elements based on the size given in the MSDU Aggregation element. The MAC shall (in some examples) then check the integrity of each MSDU based on the FCS included in the corresponding MSDU Aggregation element. If the MSDU was received without errors, the MAC shall (in some examples) acknowledge the corresponding sequence number included in the MSDU Aggregation element.

Figure 40:
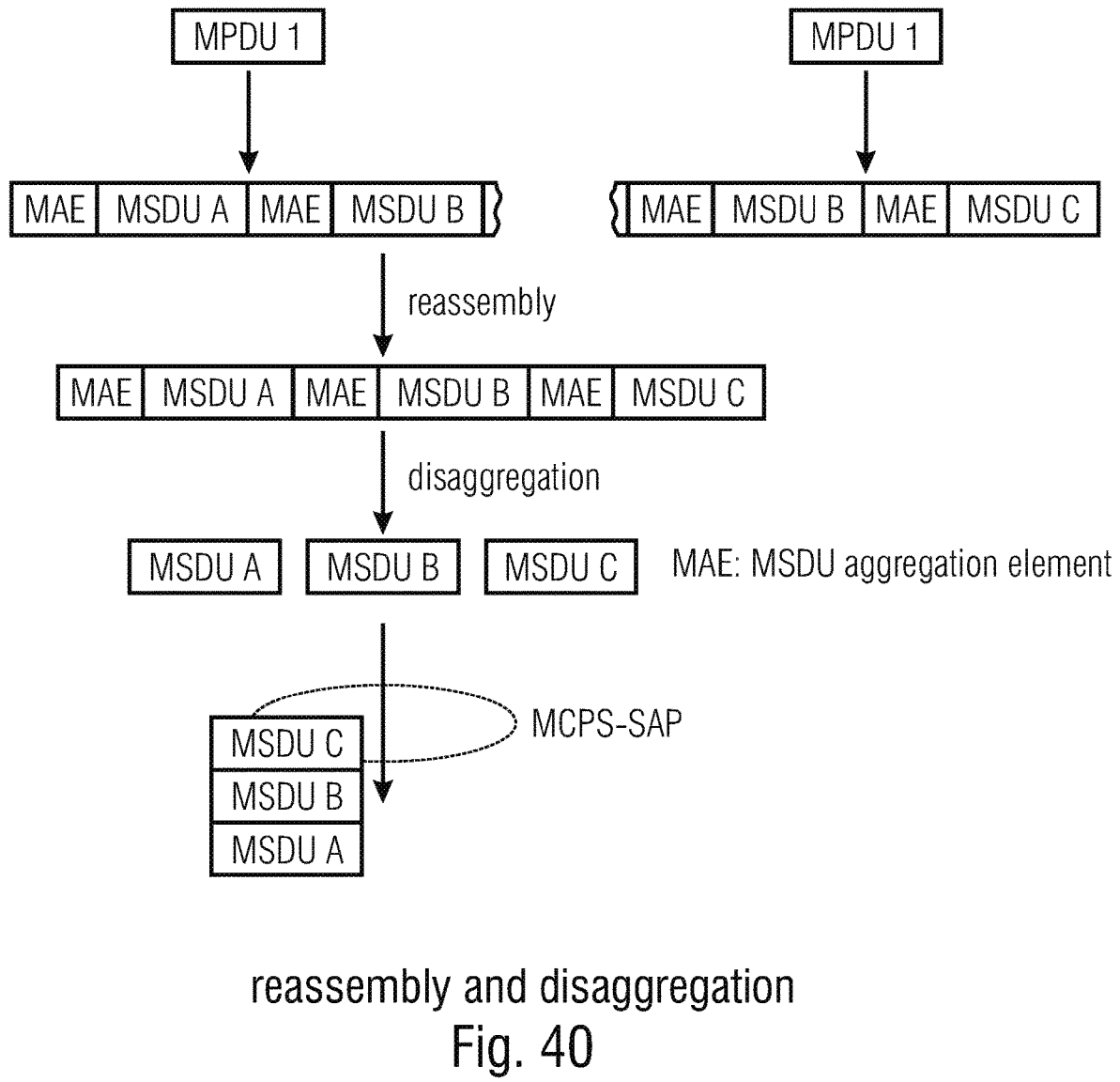

FIG. 40 shows the reassembly and disaggregation procedure. Two MPDUs 1 and 2 are received from the PHY. Both 5.7 Protected Transmission Transmissions between IEEE 802.15.13 devices may be protected. The protection ensures that MSDUs are neither duplicated nor changed in order during transmission between two MACs. Moreover, the protection prevents MSDU losses by an acknowledgment- and retransmission mechanism. For that purpose, every transmitted MSDU has a sequence number assigned.

Each device shall (in some examples) maintain an individual sequence number counter for transmissions towards every peer device. The sequence number is a 12 bit wide unsigned integer, which wraps to 0 after the highest possible value. Sequence numbers shall (in some examples) be assigned to every MSDU received through the MCPS-SAP based on the destination address.

Each outgoing MPDU shall (in some examples) have the Sequence Control element present if it contains an MSDU that requires protected transmission. For single MSDU data MPDUs, the Sequence Control element shall (in some examples) contain the sequence number assigned to the MSDU. For A-MSDUs, the MPDU shall (in some examples) contain a new sequence number, which maps to all sequence numbers of the included MSDUs. Nevertheless, each MSDU in an A-MSDU still has its own sequence number.

A transmitting device shall (in some examples) not have transmitted more than aProtectedWindow MSDUs that are unacknowledged.

The receiver of an (A–) MSDU is able to detect missing MSDUs by the fact of not receiving a certain sequence number. It is able to detect duplicate MSDUs by the fact of receiving an MSDU with the same sequence number multiple times. Two received MSDUs with the same sequence number shall (in some examples) not be regarded as duplicates if the receiver received more than aProtectedWindow unique sequence numbers since the reception of the first of the potential duplicate MSDUs. The receiver shall (in some examples) discard the last received duplicate.

If the MPDU indicates acknowledged transmission and has the ACK Request bit set in the Frame Control element as well as the Sequence Control element present, the receiver shall (in some examples) acknowledge successful transmissions with either of the following acknowledgment types:

Single acknowledgment (clause 5.7.1)
Block acknowledgment (clause 5.7.2)
Otherwise, it shall (in some examples) not transmit an acknowledgment.

5.7.1 Single Acknowledgement

The receiver of an MSDU may decide to acknowledge the successful reception by means of a single acknowledgement. Hence, the information returned to the transmitter contains solely information about the successful reception of a single MSDU.

The acknowledgment information shall (in some examples) be embedded in the Acknowledgement Information element as part of either of the following:

In the header of any data or management frame
In a dedicated Acknowledgement control frame, containing only (in some examples) the Acknowledgment Information element in its payload.
In any frame including the Variable Element Container element, containing the Acknowledgment Information element.

5.7.2 Block Acknowledgement

A receiver may acknowledge successfully received MSDUs by means of a cumulative acknowledgement. The corresponding block acknowledgment frame contains information about one or multiple successfully received MPDUs in an aggregated way through including the Block Acknowledgment element.

The receiver may transmit a block acknowledgment either unsolicited or upon request by the transmitter of received MPDUs through a Block Acknowledgment Request element.

The Block Acknowledgment element shall only (in some examples) be transmitted in frames having a unique source address. The source address of the frame, containing the Block Acknowledgment element identifies the acknowledging device.

5.7.3 Retransmission

A device shall (in some examples) retransmit a protected MSDU after it was not acknowledged after at least macRetransmitTimeout. The macRetransmitTimeout PIB attribute may be adjusted by the coordinator through the parameter management procedure described in 5.4.3.

5.8 Adaptive Transmission and Channel State Feedback

A device may select the rate, e.g. through choosing modulation and coding, for each outgoing PPDU based on available information about the channel between itself and the receiver. The information is typically obtained from each designated receiver via a feedback mechanism or inferred by the transmitter by other means.

5.8.1 Multi-Rate MCS

IEEE 802.15.13 PHYs are able to transmit frames under application of varying modulation and coding schemes (MCS). The specific definition of an MCS is dependent on the used PHY. It may contain details regarding the error coding, and modulation.

By default, a device may select the MCS for transmissions to another device freely. Rate selection algorithms are out of scope of this disclosure. However, for some frames, usage of specific modulation and coding schemes is mandatory (see 5.8.2).

If two devices support the capEffectiveChannelFeedback capability, the prospective receiver of frames may request the usage of a specific MCS from the future transmitter (see 5.8.3).

5.8.2 Transmission of Essential Frames

Some frames shall (in some examples) bet transmitted at the base rate, specific to the used PHY, defined in the respective clauses of each PHY.

The frames to be transmitted at the base rate are listed in Table 1.

TABLE 1

| Frames to be transmitted at base rate |
| --- |
| Control frames containing the ACK Information or Block Ack Response element |
| Association Request and Association Response frames |
| Disassociation Notification frames |
| Beacon frames |
| Random Access frames |

5.8.3 MCS Request Feedback

An IEEE 802.15.13 device supporting the capEffectiveChannelFeedback capability is able to measure the quality of signals received from other devices. Moreover, it shall (in some examples) be able to transmit MCS Request control frames and process received modulation request control frames as follows.

MCS Request control frames are transmitted from the prospective receiver of frames to the prospective transmitter. The prospective receiver may transmit an MCS Request element if it detects that the previously requested MCS may not be successfully decodable or that an MCS with a higher rate could be used.

If a device receives a MCS Request control frame from another device, it shall (in some examples) make use of the requested modulation and coding schemes for subsequent transmissions if transmissions do not comprise frames that entail special modulation and coding as defined in 5.8.2.

5.8.3.1 Bitloading MCS Request

If the capHbPhy was negotiated during association, a device (including coordinators) may request the usage of a certain BAT from a prospective transmitter. Moreover, each device shall (in some examples) measure the effective channel during each reception of a unicast frame to it. If the result indicates that an earlier requested BAT will not be successfully decodable, the device shall (in some examples) request usage of a new and sufficiently robust BAT from the transmitter. A device may also request usage of a new BAT in order to increase throughput, for example because the channel quality improved.

For the request, the device shall (in some examples) prepare a BAT Request element as follows:

The Valid Bat Bitmap field shall (in some examples) indicate the set of BATs that may be used for transmissions to the device. The bitmap shall only (in some examples) indicate the BATs for which the device is sure that the prospective transmitter assumes the same configuration as the device. For BATs which may potentially have different configurations at the device and the prospective transmitter, the device shall (in some examples) set the bit in the bitmap to 0. How to infer that the prospective transmitter has the same configuration for a BAT is described further in the text.

The Updated BAT field shall (in some examples) indicate a new and previously invalid BAT ID for which a new configuration is requested. The FEC Block Size field shall (in some examples) contain a block size for error coding and the FEC Code Rate field shall (in some examples) contain the code rate which is rested to be used for subsequent transmissions.

The device shall (in some examples) fill the BAT Group 1 . . . N fields with the requested bits per subcarrier. It may form multiple groups, containing varying number of subcarriers, to have the same modulation format. The total number of groups shall (in some examples) cover all available subcarriers of the PHY. The total number of subcarriers covered by the groups may be larger than the actual number of subcarriers. In that case, the excess subcarriers, contained in the last BAT Group shall (in some examples) be ignored.

The device shall (in some examples) transmit the BAT Request element in a control or management frame. In case the device transmits the element via a control frame, it cannot expect an acknowledgment and hence does not know whether the prospective transmitter has received the request.

5.8.4 Multi-OFE Channel Feedback

Coordinators supporting the capMultiOfeFeedback capability shall (in some examples) be able to transmit multi-OFE pilots whereas non-coordinator devices supporting the capMultiOfeFeedback capability shall (in some examples) be able to receive multi-OFE pilots and subsequently estimate the channels between each transmitter of multi-OFE pilots.

If a coordinator makes use of multiple OFEs, it may embed different divisions of the multi-OFE pilot symbol in the PPDU for every OFE as defined in 11 and 13. If the coordinator is part of a coordinated topology, the divisions and time slots to be used for multi-OFE pilot embedding shall (in some examples) be coordinated by the master coordinator for all coordinators.

The receiver of multi-OFE pilots is able to estimate the individual CSI between the transmitter of each pilot symbol and itself, although the signals of multiple transmitters may overlap in time. The gathered CSI comprises time domain taps, which are described by the respective optical signal power and delays relative to the very first received tap.

Upon reception of a PPDU containing multi-OFE pilot symbols, a device shall (in some examples) estimate the individual channels. The device shall (in some examples) then transmit a Multi-OFE Feedback element, containing the measured CSI for each identified transmitting OFE of orthogonal pilots, to the coordinator of the OWPAN.

A device shall (in some examples) not use a format that provides only (in some examples) smaller values for quantization than the actual strength value.

6 MAC Frame Formats

This clause provides specifications of frame formats that are used by the MAC.

6.1 Bit Order and Representation

Figures in clause 6 may represent the information contained in MAC frames. Figures may depict whole MAC frames, elements or fields. Elements are groups of fields for common usage. Elements aid the readability of the disclosure. MAC frames are described by the fields and elements it contains.

6.1.1 Bit Order

Figures 41, 42, 43:
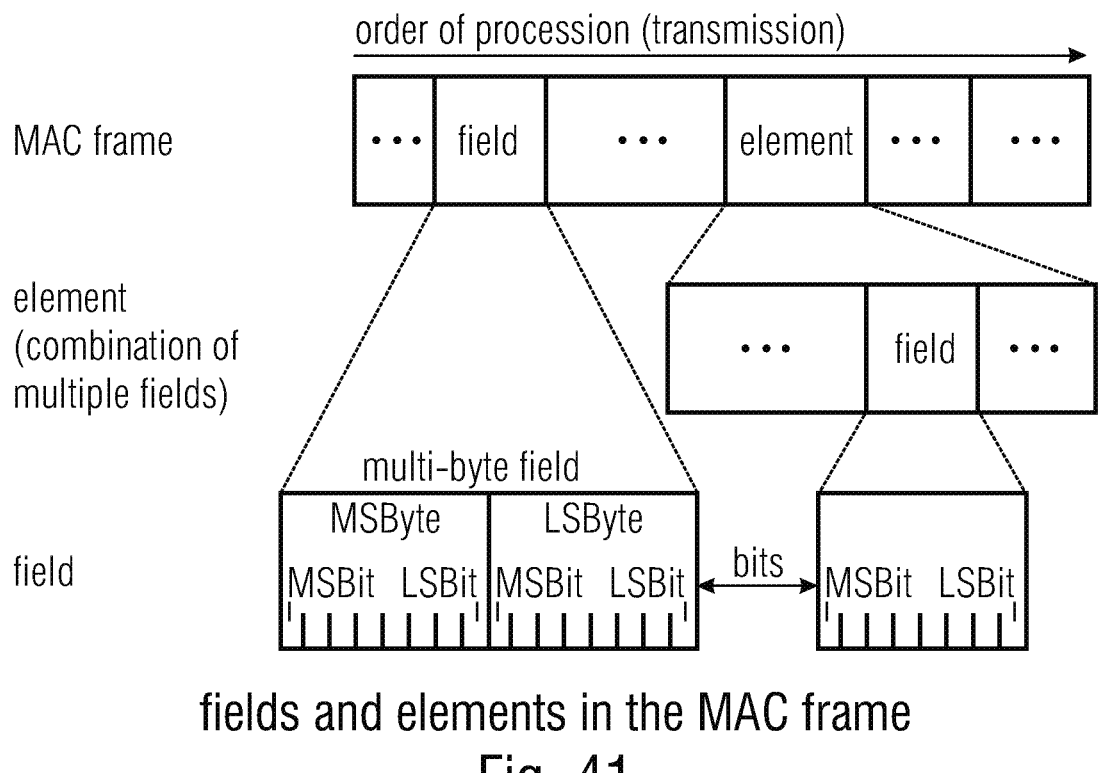

The relationship between processing (that means transmitting or interpreting) of MAC frames and their representation in this disclosure is as follows: bits, fields and elements are processed in their order of representation in figures from left to right. This relationship is depicted in FIG. 41.

If a field contains a numeric value, represented by a combination of multiple bits, bits are processed in MSBit first order. Hence, the bit with the highest value is processed first. If the numeric value is specified in binary representation within this disclosure, MSBit representation is used.

If a field's numeric value exceeds the length of an octet, it is stored within the field in big endian representation. Hence, the octet containing the MSBit of the numeric value is processed first.

Fields that are "reserved" do not carry meaningful information in the current version of the disclosure. This may be changed in later versions. Fields that are reserved shall (in some examples) be set to all zeros for transmission and shall (in some examples) be ignored on reception. The values of reserved fields shall (in some examples) not influence the behavior of devices.

6.1.2 Representation

MAC frames or elements in this disclosure are represented as figures in table format. The top line specifies the width of fields or elements. The second (middle) line provides a description of the field or a reference to an element specified elsewhere in the disclosure. The third (bottom) line is optional and may provide an alternate description of the fields or elements corresponding to its columns. The scheme is represented in FIG. 42.

Widths of fields are specified in both numbers of bits or numbers of octets if the total number of bits is representable by an integer number of octets.

In consecutive fields that include no variable widths from the start of the parent frame or element, fields can be described by the first and last bit in the field. The corresponding notion reads the word "Bit" and successively the specification of the first and last denoted bit. This is demonstrated for Field 1 in FIG. 44.

If an element or set of consecutive fields has variable width, its width is specified by the word "variable". If between the field and the start of the MAC frame lies a variable width field, the absolute bit specification cannot be used.

NOTE—To allow correct processing of MAC frames, the width of variable width elements must be deductible from other fields.

Widths can be given by their number of bits or octets. The corresponding notion includes the number of bits or octets followed by the word "Bits" or "Octets" as shown in Field 2, 3 and 5 in FIG. 43.

6.2 General MAC Frame Format

Each MAC frame starts with a Frame Control element, defined in 6.6.1.1, indicating the Type and Subtype of frame. This disclosure involves three basic frame Types for the transmission of data, management and control information.

Data, management and control frames have distinct MAC headers, detailed in clauses m 6.3, 6.4 and 6.5 respectively. The payload in turn differs for different Subtypes of data-, management- or control frames.

The payload contains the information to be conveyed via the MAC frame. For data frames, this may be one or multiple MSDUs received via the MCPS-SAP for transmission. For management frames, the payload constitutes of management information. Analogously, the payload of control frame comprises control information, aiding the MAC in its operation.

Each MAC frame shall (in some examples) end with the FCS field, containing a 32-bit CRC sum over all preceding information bits of the MAC frame.

The general MAC frame structure is depicted in FIG. 44.

6.2.1 The FCS Field

The FCS field is a 32-bit field containing a 32-bit CRC. The FCS is calculated over all the fields of the MAC header and the frame body field. These are referred to as the calculation fields. The FCS is calculated using the following disclosure generator polynomial of degree 32:

$$G(x)=x^{32}+x^{26}+x^{23}+x^{22}+x^{16}+x^{12}+x^{11}+x^{10}+x^8+x^7+x^5+x^4+x^2+x+1$$

The FCS is the ones complement of the sum (modulo 2) of the following:

a) The remainder of $x^k(x^{31}+x^{30}+x^{29}+\ldots+x^2+x+1)$ divided (modulo 2) by $G(x)$, where k is the number of bits in the calculation fields, and b) The remainder after multiplication of the contents (treated as a polynomial) of the calculation fields by $x^{32}$ and then divided by $G(x)$.

The FCS field is transmitted in order of the coefficient of the highest-order term first.

As a typical implementation, at the transmitter, the initial remainder of the division is pre-set to all ones and is then modified by division of the calculation fields by the generator polynomial $G(x)$. The ones complement of this remainder is transmitted, with the highest-order bit first, as the FCS field. At the receiver, the initial remainder is pre-set to all ones and the serial incoming bits of the calculation fields and FCS, when divided by $G(x)$, results in the absence of transmission errors, in a unique nonzero remainder value. The unique remainder value is the polynomial:

$$x^{31}+x^{30}+x^{26}+x^{25}+x^{24}+x^{18}+x^{15}+x^{14}+x^{12}+x^{11}+x^{10}+x^8+x^6+x^5+x^4+x^3+x+1$$

6.3 Data Frames

Data frames have serve the transmission of MSDUs that were received via the MCPS-SAP to a peer device. The MPDU structure of data frames is depicted in FIG. 45.

The Frame Control element is further described in 6.6.1.1. It contains multiple bits that determine the remaining structure of the frame header.

Data frames may carry an ACK Information element in their header. The presence of the ACK Information element is indicated by the ACK Info field in the Frame Control element of the frame. The ACK Information element may be used by the transmitter to acknowledge the successful reception of an earlier frame.

Each data frame has a Receiver Address and Transmitter Address field. These fields may comprise a either a 16 bit short MAC address or 48 bit full MAC address. The address format is indicated by the Short Addressing field in the Frame Control element as described in 6.6.1.1.

Data frames may have up to two additional address fields, Auxiliary Address 1 and Auxiliary Address 2 present. Whether these are present and what information they contain can be derived from the To Backhaul and From Backhaul fields in the Frame Control element as described in 6.6.1.1.

Management frames may be protected by a sequence number and retransmitted upon loss. The Sequence Control element is present in management frames that have the ACK Request bit set to 1 in the Frame Control element.

If the payload is secure, the data frame must have the Auxiliary Security Header present. The presence of the Auxiliary Security Header is indicated by the Security Enabled bit in the Frame Control element (6.6.1.1). The format of the Auxiliary Security Header is variable and depends on the details of the applied security type, as defined in clause 8.

The payload content of data frames is described by the subtype field of the Frame Control element. Currently, the payload may contain different formats, as listed in Table 2.

TABLE 2

| Data frame subtypes | |
| --- | --- |
| Data frame Subtype | Payload |
| 0000 | Null (zero length) |
| 0001 | MSDU |
| 0010 | A-MSDU |
| 1001-1111 | — |

For data frames with the Subtype 0000, the payload has a length of 0. These Null-Frames may be used to transmit MPDUs or corresponding PPDUs for various reasons.

The Subtype 0001 indicates that the payload of the data frame contains a single MSDU.

The Subtype 0010 indicates an A-MSDU in the payload of the data frame. The format of A-MSDUs is detailed in 5.6.

The FCS field of data frames contains the frame check sequence as defined in 6.2.1.

6.4 Management Frames

Management frames convey management information, aiding the communication of two MLMEs in different protocol exchange procedures. The MPDU format of management frames is depicted in FIG. 45.

Like every MAC frame, management frames start with the Frame Control element, which is further described in 6.6.1.1.

Management frames may carry an ACK Information element in their header. The presence of the ACK Information element is indicated by the ACK Info field in the Frame Control element of the frame. The ACK Information element may be used by the transmitter to acknowledge the successful reception of an earlier frame.

Each management frame has a Receiver Address and Transmitter Address field. These fields may comprise a either a 16 bit short MAC address or 48 bit full MAC address. The address format is indicated by the Short Addressing field in the Frame Control element as described in 6.6.1.1.

Management frames may be protected by a sequence number and retransmitted upon loss. The Sequence Control element is present in management frames that have the ACK Request bit set to 1 in the Frame Control element.

The payload of management frames contains one or multiple elements defined in clause 6.6. The subtype describes which elements reside in the payload field. For simple management frames, the payload consists solely of a single element. The element to be present for which subtype can be derived from Table 3.

TABLE 3

Management frame subtypes

| Management frame Subtype | Element in Payload | Payload Element ID | Payload Element Clause |
|---|---|---|---|
| 0000 | Association Request | | |
| 0001 | Association Response | | |
| 0010 | Disassociation Notification | | |
| 0011 | Authentication Request | | |
| 0100 | Authentication Response | | |
| 0101 | | | |
| 0110 | | | |
| 0111 | | | |
| 1000 | Variable Element Container | | |
| 1001-1111 | — | | |

By having the Variable Element Container element present in the payload, a single management frame is able to include more than a single element.

The FCS field of management frames contains the frame check sequence as defined in 6.2.1.

6.5 Control Frames

Control frames aid the lower MAC and PHY at their operation. The MPDU structure of control frames is depicted in FIG. 47.

As a MAC frame, each control frame starts with the Frame Control element, further described in 6.6.1.1.

Each management frame has a Receiver Address and Transmitter Address field. These fields may comprise a either a 16 bit short MAC address or 48 bit full MAC address. The address format is indicated by the Short Addressing field in the Frame Control element as described in 6.6.1.1.

Information conveyed via control frames is of ephemeral nature and quickly outdated. Hence, control frames are not retransmitted upon loss. Rather, a new control frame containing the most recent control information may be transmitted.

Due to their nature, control frames do carry sequence numbers. As a result, the frame header is kept very simple, containing only (in some examples) the Frame Control element, a Receiver Address and a Transmitter Address field.

TABLE 4

Control frame subtypes

| Control Frame Subtype | Element in Payload | Payload Element ID | Payload Element Clause |
|---|---|---|---|
| 0000 | Waveform Control | | |
| 0001 | Advanced Modulation Control | | |
| 0010 | Acknowledgment | | |
| 0011 | Modulation Request | | |
| 0100 | | | |
| 0101 | | | |
| 0110 | | | |
| 0111 | Superframe Descriptor + OWPAN Descriptor | | |
| 1000 | Variable Element Container | | |
| 1001-1111 | — | | |

6.6 Elements

Elements are collections of related fields that serve a common MAC functionality as defined in clause 6.1. Elements may be used to define the content of certain frames and aid the readability of the document. If an element contains a variable number of fields or other elements, the total length of the element must be deductible from its field contents in order to allow parsing.

Each element has an ID assigned, which identifies it in some frames. Table 3 lists the elements defined within this disclosure and their corresponding ID and definition clause.

TABLE 5

Elements and their IDs

| Element Name | ID | Clause |
|---|---|---|
| Association Request | 1 | |
| Association Response | 2 | |
| Disassociation Notification | 3 | |
| Authentication Request | 4 | |
| Authentication Response | 5 | |
| | 6 | |
| Superframe Descriptor | 7 | |
| OWPAN Descriptor | 8 | |
| Variable Element Container | 9 | |
| Clock Rate Change | | |
| Scan Over Backhaul Request | | |
| Scan Over Backhaul Confirm | | |

6.6.1.1 Frame Control Element

FIG. 48 shows an example of frame control element.

The Frame Control element comprises multiple bits that serve the determination of the further MAC frame structure or indicate properties of the payload. The Frame Control element is present at the beginning of each MAC frame.

Frame Version: The Frame Version subfield specifies the version number corresponding to the frame. This subfield shall (in some examples) be set to '00' to indicate a frame compatible with IEEE 802.15.13. All other values shall (in some examples) be reserved for future use.

Type: For management frames, the Type field shall (in some examples) be set to 00. For control frames, the field is 01. For data frames, the field is set to 00. The value 11 is reserved.

Subtype: Indicates the subtype of the frame, i.e. the contents of the payload.

To Backhaul/From Backhaul: These fields are needed for the correct interpretation of the addressing fields of data frames in a topology, where the OWPAN is integrated into a logical LAN. For example, this may be the case in the coordinated topology.

A data frame (MSDU) within a LAN has a source and destination address. In contrast, the receiver and transmitter address are the addresses of 802.15.13 devices to receive or transmit a MPDU respectively.

TABLE 6

To Backhaul and From Backhaul field description

| To Backhaul | From Backhaul | Description | Receiver address meaning | Transmitter address meaning | Auxiliary address 1 | Auxiliary address 2 |
|---|---|---|---|---|---|---|
| 0 | 0 | The MSDU originates from a device and is destined to another device. | Same as destination address. Optionally short. | Same as source address. Optionally short. | Coordinator address/ OWPAN ID | — |
| 1 | 0 | The MSDU originates from a device and is destined to a peer in the integrated LAN | Coordinator address/ OWPAN ID | Same as source address. Optionally short. | Destination address. | — |
| 0 | 1 | The MSDU originates from a peer in the integrated LAN and is destined to a device. | Same as destination address. Optionally short. | Coordinator address/ OWPAN ID | Same as source address. | — |
| 1 | 1 | Reserved Future use is bridging: both devices have multiple other LAN nodes connected | — | — | — | — |

Security Enabled: The Security Enabled field shall (in some examples) be set to 1 if the frame is protected by the MAC sublayer and shall (in some examples) be set to 0 otherwise. The Auxiliary Security Header field of the MHR shall be present only (in some examples) if the Security Enabled subfield is set to 1.

ACK Request: The Acknowledgment Request field specifies whether an acknowledgment is required from the recipient device on receipt of a data or MAC management/control frame. If this subfield is set to '1', the recipient device shall (in some examples) send an acknowledgment frame. If this subfield is set to '0', the recipient device shall (in some examples) not send an acknowledgment frame.

ACK Info: Specifies whether the ACK Information element is present in the remaining MAC header. If the ACK Information element is present, this field shall (in some examples) be set to 1. Otherwise, it shall (in some examples) be set to 0.

Short Addressing: Indicates whether short addresses are used in the address fields of the MAC header. If short addresses are used in the header, this field shall (in some examples) set to 1. Otherwise, it shall (in some examples) be set to 0. Some addresses, such as the OWPAN ID, are always in short representation. Long addresses may only (in some examples) be used for addresses that have a MAC-48 address equivalent.

More Fragments: In a data frame, this field shall (in some examples) be set to 1 if the payload contains a fragment of an (A–) MSDU, which is not the last fragment. It shall (in some examples) be set to 0 otherwise.

6.6.1.2 Sequence Control Element

FIG. 49 shows an example of sequence control element.

The Sequence Control element contains information for fragmentation and reliable transmission of a frame.

Fragment Number: If the MPDU contains a fragment of an (A–) MSDU, the field contains the respective fragment number.

Sequence Number: This field contains the assigned sequence number of the MPDU.

6.6.1.3 Association Request Element

FIG. 50 show an example of association request element.

The Association Request element is initially transmitted by a device to the coordinator of an OWPAN when it requests association.

Device MAC Address: The MAC-48 address of the device requesting association. Capability List: One Capability List element, describing the supported capabilities of the device requesting association.

OWPAN ID:

Supported Rates:

Extended Supported Rates:

6.6.1.4 Association Response Element

Figures 10, 11:
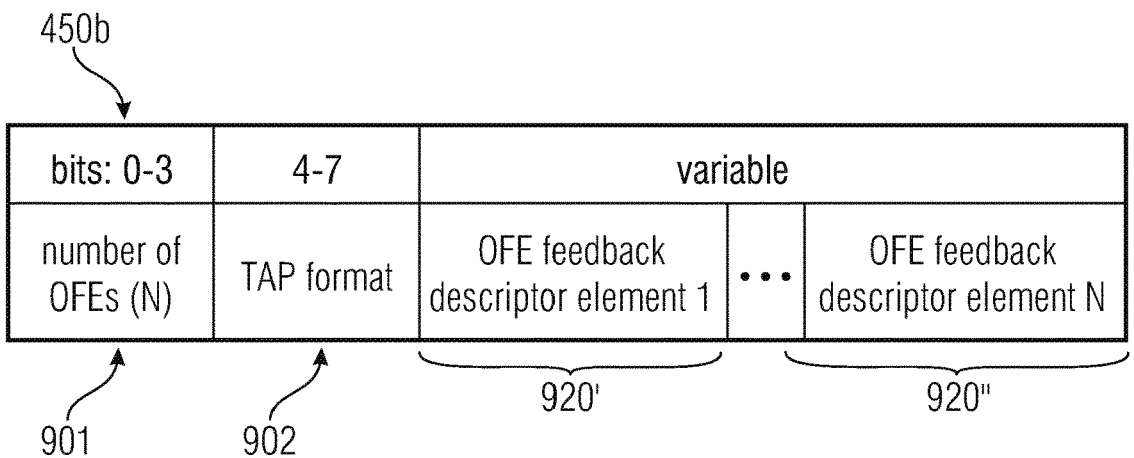
FIGS. 10-12 show examples of frames.
Figure 12:
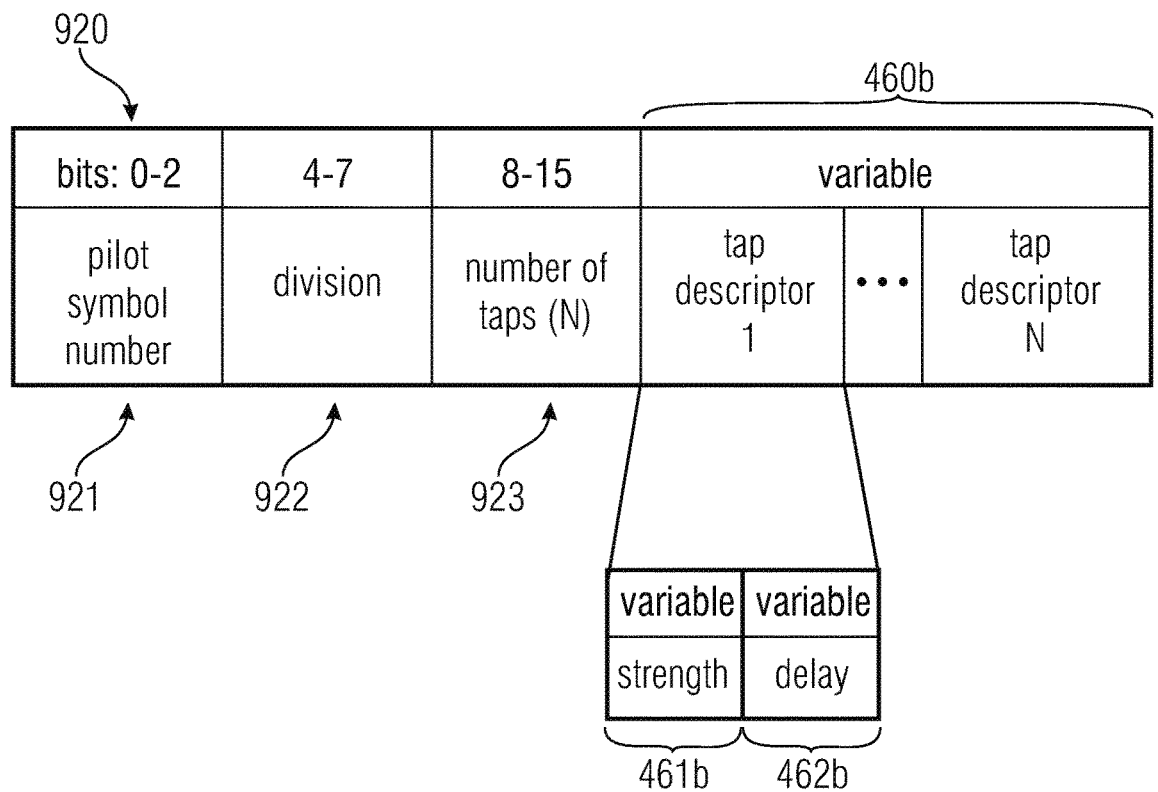

FIG. 11 shows an example of association response element.

The Association Response element is transmitted by a coordinator to a device requesting association.

Device MAC Address: The MAC-48 address of the device requesting association.

Status Code: The status code indicates the result of the preceding association request.

TABLE 7

Status codes of the Association Response element

| Value | Description |
| --- | --- |
| 0 | Denied |
| 2 | Success |
| 3 | Require further authentication |
| 4-255 | Reserved |

Capability List: This field contains a Capability List element, describing the set of capabilities to be used for further channel access if the association was not denied. If the association was denied, the field shall (in some examples) be ignored.

Short Address: The short address assigned to the device if the association was not denied. If the association was denied, the field shall (in some examples) be ignored.

Supported Rates:

Extended Supported Rates:

6.6.1.7 Disassociation Notification Element

FIG. 52 shows an example of disassociation notification element.

The Disassociation Notification element conveys information about the disassociation of a device from an OWPAN.

Reason Code: The reason code indicates a reason for disassociation.

TABLE 8

Reason codes of the Disassociation Notification element

| Value | Description |
| --- | --- |
| 0-1 | Reserved |
| 2 | Prior authentication is not valid |
| 3 | Device has left the OWPAN and is disassociated |
| 4 | Inactivity timer expired, and device was disassociated |
| 5 | Disassociated due to insufficient resources at the coordinator |
| 6 | Incorrect frame type or subtype received from unauthenticated device |
| 7 | Incorrect frame type or subtype received from disassociated device |
| 8 | Device has left the OWPAN and is disassociated |
| 9 | Association or reassociation requested before authentication is complete |
| 10-255 | Reserved |

OWPAN ID: The OWPAN ID from which to disassociate the device.

Device Short Address: The device to disassociate from the OWPAN.

6.6.1.8 Authentication Request Element

FIG. 53 shows an example of authentication request element.

The Authentication Request element is transmitted by a device to the coordinator of an OWPAN in order to request authentication if required to successfully associate with that OWPAN.

Authentication Algorithm: The authentication algorithm used for authentication.

Authentication Transaction Token: The authentication algorithm used for authentication.

Status Code: The authentication algorithm used for authentication.

Challenge: The authentication algorithm used for authentication.

6.6.1.9 Authentication Response Element

6.6.1.10 Superframe Descriptor Element

FIG. 54 shows an example of superframe descriptor element.

The Superframe Descriptor element conveys information about the beginning superframe.

Superframe Number: The number of the subsequent superframe. Wrapping integer as described in 5.2.2.

Total Superframe Slots: The number of superframe slots in the subsequent superframe. Devices associated with the OWPAN or attempting association shall (in some examples) set their macNumSuperframeSlots PIB attribute to the value contained in this field.

Superframe Slot Duration: The duration of a single superframe slot.

CAP Slot Width: The number of superframe slots per CAP slot.

CAP Slots: The number of CAP slots included in the subsequent CAP.

6.6.1.11 OWPAN Descriptor Element

FIG. 55 shows an example of OWPAN descriptor element.

The OWPAN Descriptor element conveys information about the OWPAN.

OWPAN Name: The name of the OWPAN as a null-terminated ASCII string. The length shall (in some examples) be between 3 and 32 octets, including the string termination.

OWPAN ID: The numeric ID of the OWPAN.

Coordinator Address: The MAC-48 address of the OWPAN coordinator.

Security Type: The security type applied in the OWPAN. Valid types are listed in Table 2.

6.6.1.12 Capability List Element

FIG. 56 shows an example of capability list element.

The Capability List element is used to transfer information about capabilities as described in clause 7.4 between two devices.

Bitmap Width: Specifies the subsequent Capability Bitmap field in octets. The Capability Bitmap field can thus include at most the capability with the ID Bitmap Width*8−1. The Bitmap Width 0 may be used to indicate an empty list of capabilities where needed.

Capability Bitmap: A bitmap indicating a subset of capabilities as given in Table 36. In the bitmap, the leftmost bit, i.e. the bit to be processed first, corresponds to the ID 0. The rightmost bit, i.e. the bit to be processed last by the definition given in 6.1.1, corresponds to the ID Bitmap Width*8−1. If a capability is included in the subset, the bit corresponding to the ID of the capability shall (in some examples) be set to 1. Otherwise, the bit shall (in some examples) be set to 0.

For example, a bitmap with a width of 1 octet (8 bits), indicating the presence of the capabilities with the IDs 1, 4 and 7 would be 01001001 (processing from left to right).

6.6.1.13 GTS Descriptor List Element

FIG. 57 shows an example of GTS descriptor list element.

The GTS Descriptor List element holds multiple GTS Descriptor elements for a device in the beacon-enabled channel access mode.

GTS Descriptor Count: This field includes the number of GTS descriptors that are subsequently included.

Validity Present: If set to 1, child GTS descriptors have the validity field present. Otherwise, it is set to 0.

Device Address Present: If set to 1, each child GTS Descriptor shall (in some examples) have the Device Short Address field present.

GTS Directions: If the Directions Present field is set to 1, this field indicates the directions of the subsequently included GTSs.

GTS Descriptor 1 . . . N: These fields contain one or multiple GTS Descriptor elements

6.6.1.13.1 GTS Descriptor Element

FIG. 58 shows an example of GTS descriptor element.

This element describes a single GTS allocation for a device in the beacon-enable channel access mode.

Device Short Address: This field is present if the parent GTS Descriptor List element has the Device Address Present field set to 1. This field contains the short address of the device for which the GTS was allocated.

GTS Start Slot: This field specifies the first slot of the allocated GTS.

GTS Length: This field specifies the duration of the GTS in superframe slots.

Validity: This field is present if the parent GTS Descriptor List element has the Validity Present field set to 1. The field indicates

6.6.1.14 Multi-OFE Feedback Element

FIG. 59 shows an example of multi-OFE feedback element.

The Multi-OFE Feedback element may be used to transfer multi-OFE channel feedback from a device to the coordinator of the OWPAN.

Number of OFEs: The number of distinct recognized OFEs. This may determine the number of totally included OFE Feedback Descriptor elements.

Tap format: This field may describe the format for taps included in the child Tap Descriptor elements.

TABLE 9

Tap formats in the Multi-OFE Feedback element

| Value | Strength | | | Delay | | |
|---|---|---|---|---|---|---|
| 0000 | Bits: | 8 | | Bits: | 16 | |
| | 0 value: | 0 dBm | | 0 value: | 0 ps | |
| | step: | 0.15 dBm | | step: | 30 ps | |
| 0001 | Bits: | 4 | | Bits: | 8 | |
| | 0 value: | 0 dBm | | 0 value: | 0 ns | |
| | step: | 2 dBm | | step: | 4 ns | |
| 0000 | Bits: | 8 | | Bits: | 8 | |
| | 0 value: | 0 dBm | | 0 value: | 0 ns | |
| | step: | 0.15 dBm | | step: | 4 ns | |
| 0000 | Bits: | 6 | | Bits: | 10 | |
| | 0 value: | 0 dBm | | 0 value: | 0 ns | |
| | step: | 0.625 dBm | | step: | 1 ns | |
| 0100-1111 | Reserved | | | Reserved | | |

OFE Feedback Descriptor Element 1 . . . N: OFE Feedback Descriptor elements which may be containing CSI for the channels between the device and each transmitting OFE. The number of elements N may be equal to the Number of OFEs field

6.6.1.14.1 OFE Feedback Descriptor Element

FIG. 60 shows an example of OFE feedback descriptor element.

The OFE Feedback Descriptor element may contain channel state information about a received signal from a given transmitter, i.e. a single multi-OFE pilot division.

Pilot Symbol Number: Specifies, in examples, the position (e.g., temporal) of the pilot symbol within the PPDU, from which the included feedback was measured, within the respective received PPDU. Values 1-7, 0 may be reserved.

Division: Specifies, in examples, the pilot division. This is for example the Hadamard coding or the subcarrier spacing and shift as indicated in the PPDU header.

Number of Taps: Specifies, in examples, the number of subsequent Tap Descriptor elements, also denoted by N.

Tap Descriptor 1 . . . N: it may refer to the Tap Descriptor elements for the respective taps. The first Tap Descriptor element shall (in some examples) correspond to the first received tap from that OFE.

6.6.1.14.2 Tap Descriptor Element

FIG. 61 shows an example of tap descriptor element.

The Tap Descriptor element may include the information about a single tap.

Strength: it may refer to optical signal strength of the given tap. The format may be specified in the Tap Format field of the parent Multi-OFE Feedback element.

Delay: it may refer to the integer delay in the format specified in the Tap Format field of the parent Multi-OFE Feedback element. The delay may be relative to the first received tap of all OFEs. The delay for the first tap shall be 0, in some examples.

6.6.1.15 MSDU Aggregation Element

The MSDU Aggregation element serves the aggregation of multiple MSDUs in an A-MSDU frame.

MSDU Length: The field contains the length of the subsequent MSDU in octets.

ACK Request: This field shall (in some examples) be set to 1 if the MSDU contained in the MSDU Aggregation element is protected and to 0 otherwise.

MSDU Sequence Number: The sequence number assigned to the MSDU by the transmitter. This field is only (in some examples) present of the ACK Request field is set to 1.

MSDU: This field contains the MSDU to be aggregated.

MSDU FCS: The MSDUs CRC checksum calculated according to clause 6.2.1.

6.6.1.16 ACK Information Element

FIG. 63 shows an example of ACK information element.

The ACK Information element is used by the receiver of an MPDU to signal successful reception of that MPDU to its transmitter.

Device Short Address: The short address of the acknowledging device, which received the MPDU.

Sequence Number: The sequence number of the MPDU to be acknowledged.

6.6.1.17 Block ACK Request Element

FIG. 64 shows an example of block ACK request element.

The Block ACK Request element is used by the transmitter of MPDU(s) to request an acknowledgment for the successful reception from the receiver.

Device Short Address: The short address of the acknowledging device, which received the MPDUs. This field shall only (in some examples) be included Sequence Number: The sequence number of the MPDU to be acknowledged.

6.6.1.18 Block ACK Element

FIG. 65 shows an example of block ACK element.

The Block ACK element is used by the receiver of multiple MPDUs to signal their successful reception to the transmitter in a collected manner. This element shall only (in some examples) be transmitted in frames having a source address, which is neither a multicast nor a broadcast address.

Bitmap Width: The maximum number of included acknowledgments. This field determines the width of the ACK Bitmap field in integer octets. The actual width of the bitmap is the integer contained in the Bitmap Width field plus one.

First Sequence Number: The sequence number corresponding to the first bit in the subsequent ACK Bitmap field.

ACK Bitmap: The actual acknowledgment information. The bitmap is Bitmap Width+1 octets wide. The transmitter of a Block ACK element shall (in some examples) select the width of the bitmap such that it can hold the desired number of acknowledgments.

In the bitmap, the rightmost bit, i.e. the bit to be processed last by the definition given in 6.1.1, corresponds to the first sequence number, as given in the First Sequence Number field. The leftmost bit, i.e. the bit to be processed last, corresponds to the sequence number First Sequence Number+(Bitmap Width+1)*8−1.

For every successfully received MPDU, the transmitter of a Block ACK element shall (in some examples) set the bit corresponding to its sequence number to 1. All other bits shall (in some examples) be set to 0.

An ACK Bitmap field with for the Bitmap Width of 00001 (1) and the first sequence number of 321 would look as follows if the sequence numbers 320, 321, 322, 324, 325, 326, 327, 328, 329, 330, 332, 333 were successfully received:

TABLE A

| processed first (left) | | | | | | | | | | | | | | | processed last(right) |
|---|---|---|---|---|---|---|---|---|---|---|---|---|---|---|---|
| bits in the bitmap: 1 | 1 | 1 | 0 | 1 | 1 | 1 | 1 | 1 | 1 | 1 | 0 | 1 | 1 | 0 | 0 |
| sequence number: 320 | 331 | 322 | 323 | 324 | 325 | 326 | 327 | 328 | 329 | 330 | 331 | 332 | 333 | 334 | 335 |

6.6.1.19 MCS Request Element

FIG. 66 shows an example of MCS request element.

The MCS Request element is used by the prospective receiver of a transmission to request the usage of a certain MCS by the prospective transmitter. The MCS Request element may be used with the PM-PHY.

Requested MCS ID: The ID of the requested MCS. The MCS ID shall (in some examples) be a valid MCS for the PM-PHY 6.6.1.20 BAT Request Element FIG. 67 shows an example of BAT request element.

The BAT Request element may be used by a receiving device using the HB-PHY to request a transmitter to use a certain bitloading and error coding scheme.

Valid BAT Bitmap: Specifies the BATs requested to be valid.

Updated BAT: Specifies the ID of the BAT to be updated.
FEC Block Size:

TABLE 10

FEC code rates for the HB-PHY

| Value | Block Size (Bits) |
|---|---|
| 001 | 168 |
| 010 | 960 |
| 011 | 4320 |
| 100-111 | Reserved |

FEC Code Rate: Specifies the requested FEC coding rate. Valid values and corresponding code rates are listed in Table 11.

TABLE 11

FEC code rates for the HB-PHY

| Value | Code rate |
|---|---|
| 001 | 1/2 |
| 010 | 2/3 |

TABLE 11-continued

FEC code rates for the HB-PHY

| Value | Code rate |
|---|---|
| 011 | 5/6 |
| 100 | 16/18 |
| 101 | 20/21 |
| 110-111 | Reserved |

BAT Group 1 . . . N: BAT Group elements describing the modulation for the nth group of subcarriers. There shall (in some examples) be enough groups to cover all subcarriers. The last group may be wider than the remaining number of subcarriers.

The requested modulation for those excess subcarriers shall (in some examples) be ignored.

6.6.1.20.1 BAT Group Element

FIG. 68 shows an example of BAT group element.

The BAT Group element contains information about a group of adjacent subcarriers, having the same number of bits loaded in a bit-loading capable PHY transmission.

Grouping: This field contains the number of subcarriers in this group. Valid values are:

1, 2, 4, 8, 16, 32, 64, 128, 256, 512, 1024, 2048, 4096

Loaded Bits: The number of bits loaded on each subcarrier of the group. Valid values are:

0, 1, 2, 3, 4, 5, 6, 7, 8, 9, 10, 11, 12

6.6.1.21 Queue State Element

FIG. 69 shows an example of queue state element.

The Queue State element is transmitted by a device in order to inform other devices about the state of its MSDU queues.

6.6.1.22 HCM Allocation Element

FIG. 70 shows an examples of HCM allocation element.

The HCM Allocation element is used to allocate one or more HCM rows to a device.

HCM Mask: The HCM rows assigned to the device. Each bit corresponds to a HCM row. The MSBit, i.e. the leftmost bit, corresponds to row 0, while the rightmost bit corresponds to row 7.

6.6.1.23 Alien Signal Element

FIG. 71 shows an example of alien signal element.

The Alien Signal element may contain information about a signal that was received but identified as not originating from a device that is a member of the same OWPAN (or same network more in general).

Signal Power: It may refer to the optical power in dBm of the alien signal.

Decodable: This bit shall only (in some examples) be set to 1, if the alien signal is decodable by the PHY and MAC. This should be the case if the signal originates from another IEEE 802.15.13 device.

Same MAC Mode: This bit shall only (in some examples) be set to 1 if the received frame originates from an IEEE 802.15.13 OWPAN that uses the same channel access mode as defined in 5.2 and 5.3 respectively.

OWPAN ID Clash: This bit shall (in some examples) be set to 1 if the received frame originates from an OWPAN that has the same OWPAN ID.

Foreign OWPAN ID: This field shall only (in some examples) be present, if the OWPAN ID Clash field was set to 0. This field contains the OWPAN ID of the foreign network, from which the alien frame was received.

Foreign Device Address: This field shall only (in some examples) be present, if the Decodable field was set to 1. This field contains the Device Short Address of the foreign transmitting device. If the address is unknown, the field shall (in some examples) be set to the broadcast short address.

6.6.1.24 Supported MCS Element

FIG. 72 shows an example of supported MCS element.

The Supported MCS element may be used to convey a set of supported rates of a device. The possible included values depend on the used PHY.

PHY ID: The ID of the PHY that the following PHY Rates element is specific to.

PHY Rates Element: A PHY-specific PHY Rates element as defined in the respective PHY clauses.

6.6.1.25 OFE Selection Element

FIG. 73 shows an example of OFE selection element.

The OFE Selection element contains sequential field that serve the measurement of channels between multiple OFEs and a device.

6.6.1.26 Waveform Control Element

FIG. 74 shows an example of advanced

6.6.1.26 Waveform Control Element.

The waveform control frame relates to the adaptive OFDM technique. Multiple waveforms such as eU-OFDM and RPO-OFDM may exist in the network. The control frame could be used when adaptive adjustment of the waveform is used.

Timestamp: The Timestamp field allows synchronization between the devices in an OWPAN. The master timekeeper for an OWPAN periodically transmits the number of microseconds it has been active. When the counter reaches its maximum value, it wraps around.

OWPAN ID: OWPAN ID field gives the ID for the OWPAN.

New Waveform: The 8 bits are to indicate the waveform to switch to among the supported waveforms by IEEE 802.15.13.

6.6.1.27 Advanced Modulation Control Element

FIG. 75 shows an example of Advanced Modulation Control Element Advanced modulation control frame indicates the advanced modulation capabilities of a communication node.

Adaptive Loading: A single bit indicates whether the communication node transmitting the advanced modulation control frame supports adaptive bit and energy loading:
"1" indicates: Adaptive bit and energy loading is supported.
"0" indicates: Adaptive bit and energy loading is not supported.

eU: The 4 bits indicate if the node supports eU-OFDM. The bit value at a given position out of the four positions indicates whether eU-OFDM implementation with the same number of streams as the bit position is supported. Positions are counted from left to right. For example:
"1000" indicates eU-OFDM with one stream only (in some examples) is supported.
"1100" indicates eU-OFDM with one and two streams only (in some examples) is supported.
"1010" indicates eU-OFDM with one and three streams only (in some examples) is supported.
"1111" indicates eU-OFDM with all possible streams is supported.
"0000" indicates eU-OFDM is not supported.

RPO: A single bit indicates whether the communication node transmitting the advanced modulation control frame supports RPO-OFDM:
"1" indicates: RPO-OFDM is supported.
"0" indicates: RPO-OFDM is not supported.

Relaying: The 4 bits indicate the types of relaying operations the communication node transmitting the advanced modulation control frame supports.

The first bit indicates whether relaying in FD is supported:
"1" indicates: Relaying in FD is supported.
"0" indicates: Relaying in FD is not supported.

The second bit indicates whether relaying in HD is supported:
"1" indicates: Relaying in HD is supported.
"0" indicates: Relaying in HD is not supported.

The third bit indicates whether AF relaying is supported:
"1" indicates: AF relaying is supported.
"0" indicates: AF relaying is not supported.

The fourth bit indicates whether DF relaying is supported:
"1" indicates: DF relaying is supported.
"0" indicates: DF relaying is not supported.

MIMO: A single bit indicates whether the communication node transmitting the advanced modulation control frame supports MIMO communication:
"1" indicates: MIMO is supported.
"0" indicates: MIMO is not supported.

MIMO Channel Number: The 4 bits indicate the maximum number of MIMO communication channels which the communication node transmitting the advanced modulation control frame supports.

A value of '0000' corresponds to 1 channel, and a value of '1111' corresponds to 16 channels.

6.6.1.28 Random Access Element

FIG. 76 shows an example of random access element.

The Random Access element contains information used to trigger the random access procedure in the non-beacon-enabled channel access mode.

Furthermore, Random Access frames announce the existence of a non-beacon-enabled network. They are transmitted at regular intervals (i.e., each random access interval) by coordinators to allow devices to find and identify a network and possibly join it. Random access frames are supposed to be transmitted exactly as the random access interval ends, at the so-called target Random Access transmission time (TBTT). In an infrastructure network, the coordinator is responsible for transmitting Random Access frames with information such as timestamp, OWPAN ID, and other parameters regarding the coordinator to devices that are within range.

Timestamp: The Timestamp field allows synchronization between the devices in an OWPAN. When coordinators prepare to transmit a Beacon frame, the coordinator timer is copied into the Beacon's timestamp field. Devices associated with a coordinator accept the timing value in any received Beacons, but they may add a small offset to the received timing value to account for local processing by the antenna and transceiver.

Random Access Interval: Each OWPAN can transmit Random Access frames at its own specific interval.

Capability Information: The 16-bit Capability Information field is used to advertise the network's capabilities. In this field, each bit is used as a flag to advertise a particular function of the network. Devices use the capability advertisement to determine whether they can support all the features in the OWPAN. Devices that do not implement all the features in the capability advertisement are not allowed to join.

OWPAN ID: OWPAN ID field gives the ID for the OWPAN.

Supported Rates: Several data rates have been standardized for each PHY in IEEE 802.15.13. When mobile devices attempt to join the network, they check the data rates used in the network. Some rates are mandatory and must be supported by the mobile device, while others are optional.

Country: The initial specifications were designed around the existing regulatory constraints in place in the major industrialized countries. Rather than continue to revise the specification each time a new country was added, a new specification was added that provides a way for networks to describe regulatory constraints to new stations. Maximum transmission power is specified using the country element in beacon frames. The information is available to any station wishing to associate to a network. The Country element specifies the regulatory maximum power, and the Power Constraint element can be used to specify a lower maximum transmission power specific to the network.

Extended Supported Rates: Extended Supported Rates element was standardized to handle more than eight data rates.

6.6.1.29 Attribute Change Request Element

FIG. 77 shows an example of attribute change request element.

The Attribute Change Request element may be used by the coordinator of an OWPAN to change the PIB attribute value of an associated device.

Attribute ID: This field indicates the attribute to be updated. The ID for a given attribute can be found in Table 34.

New Value: The new value to assign to the attribute. The field format is to be deducted from the in Table 34.

6.6.1.30 Attribute Change Response Element

FIG. 78 shows an example of attribute change response element.

The Attribute Change Response element is transmitted from a device to the coordinator as a response to the Attribute Change Request element to indicate whether the attribute change was successful.

Attribute ID: This field indicates the attribute to be updated. The ID for a given attribute can be found in Table 34.

New Value: The new value assigned to the attribute. The field format is to be deducted from the in Table 34.

Status: The result of the former attribute change request. Possible values are described in Table 12.

TABLE 12

Status codes for the attribute change request result.

| Value | Description |
| --- | --- |
| 0 | Success |
| 1 | Invalid attribute name |
| 2 | Invalid new value |
| 3 | Read-only |
| 4 | Other error |
| 5-255 | Reserved |

6.6.1.31 Variable Element Container Element

FIG. 79 shows an example of variable element container element.

The Variable Element Container element comprises one or multiple other elements.

Multiple Elements: This bit indicates whether multiple elements are contained in the subsequent fields.

Size Prefix:

Contained Element 1 . . . N: The contained element(s).

7 MAC services

The IEEE 802.15.13 MAC offers its service to the higher protocol layers and DME through the MCPS-SAP and MLME-SAP respectively. The MCPS-SAP includes primitives that support the integration of IEEE 802.15.13 networks in bridged LANs in accordance with IEEE 802.1AC. The MLME-SAP exposes basic management functions and further advanced functionality to the DME.

A primitive invocation originating from the service user, i.e. higher layer, carries the suffix .request. Hence, it requests the start of a service, i.e. action, on the service provider, which is the next lower layer. The immediate response to a .request is a .confirm primitive, returned by the service provider, i.e. the MAC or MLME.

Externally caused events at the MAC or MLME are indicated to the higher layer through primitives carrying the .indication suffix. Such events may originate from unrequested actions, e.g. the reception of a specific management frame, or as an asynchronous response to a finished service invocation through a preceding service request.

A number of PIB attributes defines the behavior of the MAC and reflects the current system state.

Moreover, capabilities indicate subparts of functionality in this disclosure that are supported by a given device implementation. Those capabilities are used to negotiate functionality that can be used while a device is associated with a given OWPAN.

7.1 MCPS-SAP

The MCPS-SAP supports the transport of MSDUs between the MACs of peer IEEE 802.15.13 devices through the primitives listed in Table 13.

TABLE 13

MCPS-SAP primitives

| MCPS-SAP primitive | Request | Confirm | Indication |
| --- | --- | --- | --- |
| MCPS-DATA | X | | X |

7.1.1 MCPS-DATA.request

The MCPS-DATA.request primitive is used by the higher layer to request the transfer of data to another device.

The parameters of the primitive are listed in Table 14.

TABLE 14

Parameters of the MCPS-DATA.request primitive

| Parameter name | Parameter description |
| --- | --- |
| destination_address | The destination address of the MSDU. MAC-48 format. |
| source_address | The source address of the MSDU. MAC-48 format. |
| mac_service_data_unit | The actual MSDU. |
| priority | The priority of the MSDU. |
| protected | Whether the associated MSDU shall be transmitted protected. |

7.1.2 MCPS-DATA.indication

MCPS-DATA.request primitive is issued by the MAC of a device upon reception of a MSDU from a peer device.

The parameters of the primitive are listed in Table 15.

TABLE 15

Parameters of the MCPS-DATA.indication primitive

| Parameter name | Parameter description |
|---|---|
| destination_address | The destination address of the MSDU. MAC-48 format. |
| source_address | The source address of the MSDU. MAC-48 format. |
| mac_service_data_unit | The actual MSDU. |
| priority | The priority of the MSDU |

7.2 MLME-SAP

The MLME-SAP supports the management and usage of a device's MLME functionality through the DME.

TABLE 16

MLME primitives

| MLME-SAP primitive | Request | Confirm | Indication |
|---|---|---|---|
| MLME-ASSOCIATE | X | | X |
| MLME-AUTHENTICATE | X | | X |
| MLME-DISASSOCIATE | X | | X |
| MLME-GET | X | X | |
| MLME-SET | X | X | |
| MLME-SCAN | X | X | |
| MLME-START | X | X | |
| MLME-STOP | X | X | |

7.2.1 MLME-Associate

The MLME-ASSOCIATE primitive serves the association process of a device with an OWPAN as described in clause 5.4.5.

7.2.1.1 Request

The MLME-ASSOCIATE.request is issued by the DME to the device MAC to initiate the association process with a given OWPAN. Upon reception of the primitive, the MLME shall (in some examples) start the association procedure as detailed in 5.4.5.

If the MLME of a device receives multiple MLME-ASSOCIATE.request primitives for different target OWPAN IDs, it shall (in some examples) discard the all but the first requests and wait for its completion or timeout before accepting another request.

The parameters of the primitive are listed in Table 17.

TABLE 17

Parameters of the MLME-ASSOCIATE.request primitive

| Parameter name | Type | Value range (Steps) | Parameter description |
|---|---|---|---|
| OwpanId | integer | [1, 254] (1) | The OWPAN ID as indicated in the beacon or RA frames of the target OWPAN. |
| SecurityType | integer | IDs as defined in Table 37 | The type of security as specified in clause 8. |
| AuthenticationDetails | variable | variable | The type-specific security information. Format depends on the SecurityType parameter. |
| Timeout | milliseconds | [1, 65535] (1) | Maximum time in ms until a corresponding indication primitive is expected. If none is received by the DME, the association is assumed to have failed. |

7.2.1.2 Indication

MLME-ASSOCIATE.indication primitive is issued by the MLME to report the result of a preceding MLME-ASSOCIATE.request primitive.

The parameters of the primitive are listed in Table 18.

TABLE 18

Parameters of the MLME-ASSOCIATE.indication primitive

| Parameter name | Type | Value range (Steps) | Parameter description |
|---|---|---|---|
| OwpanId | integer | [1, 254] (1) | The OWPAN ID for which the association was requested earlier. |
| Status | enumeration | SUCCESS, FAILURE | The result of the association process. |
| FailureReason | enumeration | UNAUTHORIZED, IS_COORDINATOR, OTHER | The reason for failure, if the association status is FAILURE. |

7.2.2 MLME-Authenticate

The MLME-AUTHENTICATE primitive allows the DME of an OWPAN coordinator to authenticate a device that previously requested authentication.

7.2.2.1 Request

The MLME-AUTHENTICATE.request primitive is issued by the coordinator DME in order to allow or deny authentication of a requesting device. The primitive is invoked following a preceding MLME-AUTHENTICATE.indication primitive.

The parameters of the primitive are listed in Table 19.

TABLE 19

Parameters of the MLME-AUTHENTICATE.request primitive

| Parameter name | Type | Value range (Steps) | Parameter description |
|---|---|---|---|
| Mac48Address | MAC-48 Address | valid addresses | The MAC-48 address of the device requesting to be authenticated. |
| DeviceId | device short address | [1, 254] (1) | The short address of the device requesting to be authenticated. |
| Status | enumeration | ACCEPT, DENY | The result of the authentication process. |

7.2.2.2 Indication

The MLME-AUTHENTICATE.indication primitive is issued to the DME by the coordinator MAC upon reception of an Authentication Request element from a device attempting association.

The parameters of the primitive are listed in Table 20.

TABLE 20

Parameters of the MLME-AUTHENTICATE.indication primitive

| Parameter name | Type | Value range (Steps) | Parameter description |
|---|---|---|---|
| Mac48Address | MAC-48 Address | valid addresses | The MAC-48 address of the device requesting to be authenticated. |
| DeviceId | device short address | [1, 254] (1) | The short address of the device requesting to be authenticated. |
| SecurityType | integer | IDs as defined in Table 37 | The type of security as specified in clause 8. |
| AuthenticationDetails | variable | variable | The type-specific security information. Format depends on the SecurityType parameter. |

7.2.3 MLME-Disassociate

The MLME-DISASSOCIATE primitive is invoked in order to disassociate a given device from an OWPAN. The primitive may be invoked by a participant device or the OWPAN coordinator, as described in 5.4.6.

7.2.3.1 Request

The MLME-DISASSOCIATE.request indicates to the MLME to begin with the disassociation procedure as described in 5.4.6.

The parameters of the primitive are listed in Table 21.

TABLE 21

Parameters of the MLME-DISASSOCIATE.request primitive

| Parameter name | Type | Value range (Steps) | Parameter description |
|---|---|---|---|
| OwpanId | integer | [1, 254] (1) | The OWPAN ID from which the device is supposed to be disassociated. |
| DeviceId | integer | [1, 254] (1) | The device short address of the device to be disassociated from the OWPAN. |
| Reason | enumeration | USER_REQUEST, AUTHENTICATION_END | The reason for disassociation |

7.2.3.2 Indication

The MLME-DISASSOCIATE.indication is invoked by the MAC to indicate the disassociation of a device from an OWPAN. It may be used by the MLME of a coordinator or participant device of an OWPAN.

The parameters of the primitive are listed in Table 22.

TABLE 22

Parameters of the MIME-DISASSOCIATE.indication primitive

| Parameter name | Type | Value range (Steps) | Parameter description |
|---|---|---|---|
| OwpanId | integer | [1, 254] (1) | The OWPAN ID as indicated in the beacon or RA frames of the target OWPAN. |
| DeviceId | integer | [1, 254] (1) | The short address of the device to be disassociated. |
| Reason | enumeration | USER_REQUEST, AUTHENTICATION_END | The reason for disassociation |

7.2.4 MLME-Get

The MLME-GET primitive allows the DME to obtain the value of certain readable MAC and PHY PIB attributes.

7.2.4.1 Request

Upon reception of a MLME-GET.request primitive, the MLME shall (in some examples) read the requested MAC or PHY PIB attribute from its information storage.

The parameters of the primitive are listed in Table 23.

TABLE 23

Parameters of the MLME-GET.request primitive

| Parameter name | Type | Value range (Steps) | Parameter description |
|---|---|---|---|
| AttributeId | integer | Valid attribute IDs as listed in Table 34. | The ID of the attribute to get. |

7.2.4.2 Confirm

The MLME-GET.confirm primitive is issued by the MLME as a response to a preceding MLME-GET.request primitive.

The parameters of the primitive are listed in Table 24.

TABLE 24

Parameters of the MLME-GET. confirm primitive

| Parameter name | Type | Value range (Steps) | Parameter description |
|---|---|---|---|
| Status | enumeration | SUCCESS, FAILURE | Indicates whether the preceding MLME-GET.request primitive was successful or not. |
| FailureReason | enumeration | NON_EXISTENT, OTHER ERROR | Indicates the reason for failure if the Status is FAILURE. |
| AttributeId | integer | Valid attribute IDs as listed in TABLE 34. | The ID of the attribute to get. |
| AttributeValue | variable | attribute-specific | The value of the attribute to get. |

7.2.5 MLME-Set

The MLME-SET primitive allows the DME to modify the value of certain writable MAC and PHY PIB attributes.

7.2.5.1 Request

Upon reception of a MLME-GET.request primitive, the MLME shall (in some examples) set the requested MAC or PHY PIB attribute to have the value provided with the AttributeValue parameter.

If a PIB attribute is set by the coordinator in accordance with the OWPAN operation configuration, it shall (in some examples) not be writable via the MLME-SET.request primitive.

If setting a read-only attribute is attempted, the MLME shall (in some examples) respond in the corresponding confirm with the FailureReason parameter set to READ_ONLY.

The parameters of the primitive are listed in Table 27.

TABLE 25

Parameters of the MLME-SET.request primitive

| Parameter name | Type | Value range (Steps) | Parameter description |
|---|---|---|---|
| AttributeId | integer | Valid attribute IDs as listed in Table 34. | The ID of the attribute to get. |
| AttributeValue | variable | attribute-specific | The value of the attribute to set. |

7.2.5.2 Confirm

Through issuing the MLME-SET.confirm primitive, the MLME responds to a previous MLME-SET.request.

The parameters of the primitive are listed in Table 26.

TABLE 26

Parameters of the MLME-SET.confirm primitive

| Parameter name | Type | Value range (Steps) | Parameter description |
|---|---|---|---|
| AttributeId | integer | Valid attribute IDS as listed in Table 34. | The ID of the attribute to set. |
| AttributeValue | variable | attribute-specific | The value of the attribute to set. |
| Status | enumeration | SUCCESS, FAILURE | Indicates whether setting the PIB attribute was successful or not. |
| FailureReason | enumeration | READ_ONLY, NON_EXISTENT | Indicates the reason for failure if the Status is FAILURE. |

7.2.6 MLME-Scan

The MLME-SCAN primitive supports the DME in requesting the MLME to issue a scan for existing OWPANs.

7.2.6.1 Request

The MLME-SCAN.request is issued by the DME in order to initiate the scanning procedure.

The parameters of the primitive are listed in Table 27.

TABLE 27

Parameters of the MLME-SCAN.request primitive

| Parameter name | Type | Value range (Steps) | Parameter description |
|---|---|---|---|
| ScanDuration | milliseconds | [1, 65535] (1) | Specifies for how long the device shall listen for incoming frames. |

7.2.6.2 Confirm

The MLME-SCAN.confirm primitive is used by the MLME to report the results of a scan to the DME.

The parameters of the primitive are listed in Table 28.

TABLE 28

Parameters of the MLME-SCAN.confirm primitive

| Parameter name | Type | Value range (Steps) | Parameter description |
|---|---|---|---|
| ResultList | a list of result entries | entries as specified in Table | The set of observed OWPANs. |
| EntryCount | integer | implementation-specific | The number of entries in the result list. |
| Status | enumeration | SUCCESS, FAILURE | The result of the association process. |
| FailureReason | enumeration | SCAN_IN_PROGRESS, OTHER | The reason for failure if the Status parameter is FAILURE. |

The ResultList parameter shall (in some examples) contain a list in which every entry has the elements listed in Table 29.

TABLE 29

Scan result entry elements

| Detail | Description |
|---|---|
| OWPAN ID | The ID of the observed OWPAN |
| OWPAN Name | The name of the observed OWPAN |
| Electrical SNR | The SNR during the reception of the OWPAN's frame |
| Security Type | The security required by the observed OWPAN |

7.2.7 MLME-Start

The MLME-START primitive is used to instruct a device MAC to serve as a coordinator and start operation of a new OWPAN.

7.2.7.1 Request

The MLME-START.request primitive is issued by the DME and received by the MLME and triggers the procedure to start an OWPAN.

The MLME-START.request primitive shall (in some examples) be confirmed by the MLME through a subsequent MLME-START.confirm primitive invocation.

The parameters of the primitive are listed in Table 30.

TABLE 30

Parameters of the MLME-START.request primitive

| Parameter name | Type | Value range (Steps) | Parameter description |
|---|---|---|---|
| OwpanId | 16 bit integer | [1, 65535] | The OWPAN ID as indicated in the beacon or RA frames of the target OWPAN. |
| OwpanName | 6-24 octet ASCII string | any | The OWPAN name serving as a human-readable ID for the OWPAN. |
| SecurityType | integer | IDs as defined in Table 37 | The type of security as specified in clause 8. |

7.2.7.2 Confirm

The MLME-START.confirm primitive is issued by the coordinator MLME to report the result of the preceding request to start a new OWPAN.

The parameters of the primitive are listed in Table 31.

TABLE 31

Parameters of the MLME-START.confirm primitive

| Parameter name | Type | Value range (Steps) | Parameter description |
|---|---|---|---|
| Status | enumeration | SUCCESS, FAILURE | Whether the preceding MLME-START.request primitive was successful or failed. |
| FailureReason | enumeration | PARAMETER_ CONTRADICT, OTHER | If stopping the OWPAN was not successful, the parameter indicates the reason. |

7.2.8 MLME-Stop

The MLME-STOP primitive is issued by the DME of a coordinator in order to cease operation of a running OWPAN.

7.2.8.1 Request

The MLME-STOP.request primitive is issued by the DME of an active coordinator to the MLME in order to stop a running OWPAN.

The parameters of the primitive are listed in Table 32.

TABLE 32

Parameters of the MLME-STOP.request primitive

| Parameter name | Type | Value range (Steps) | Parameter description |
|---|---|---|---|
| Timeout | 16 bit integer | [1, 65535] | The time in microseconds after which the OWPAN shall be stopped. If the given time has passes since invocation of the primitive, the MLME shall respond with the corresponding MLME-STOP.confirm primitive, indicating success or failure. |
| Force | Boolean | true, false | Whether to stop an OWPAN forcefully. If set to true, the coordinator MLME shall not wait for successfully disassociation of the associated devices. |

7.2.8.2 Confirm

The MLME-STOP.confirm primitive is issued by the MLME of a coordinator as a response to a preceding MLME-STOP.request primitive.

The parameters of the primitive are listed in Table 33.

TABLE 33

Parameters of the MLME-STOP.confirm primitive

| Parameter name | Type | Value range (Steps) | Parameter description |
|---|---|---|---|
| Status | enumeration | SUCCESS, FAILURE | The result of the preceding MLME-STOP.request primitive. |
| FailureReason | enumeration | DISASSOCIATION_ FAILED, OTHER | If stopping the OWPAN was not successful, the parameter indicates the reason. |

7.3 PIB Attributes

The MAC comprises variables and constants that define its behavior. The state of the MAC is defined through the situation of its queues as well as the current values of its variables and constants. Variables and constants are referred to as "PIB attributes".

Table 13 and Table 13 list variable and constant PIB attributes. It provides the attribute name, a description and information about the constant or space of possible values and associated units. Some variables shall (in some examples) be readable and writable via the MLME-GET.request and MLME-SET.request respectively. Whether a variable is can be read or written is indicated by a get for read or set for write In the get/set column. Attributes that are purely internal to the MAC are neither readable nor writable.

PHY PIB Attributes

PHY PIB attributes determine the behavior of the MAC, analogously to what MAC PIB attributes do for the MAC. As the PLME-SAP is unspecified, the management of PHY PIB attributes are left to the implementer. However, in order to make attributes accessible from the DME where necessary, some PHY PIB attributes can be read or written via the MLME-GET and MLME-SET primitives. The r/w column indicates whether an attribute is readable or writable this way.

| Name | Description | get/set | Value [Range] (Step) | Unit |
|---|---|---|---|---|
| phyTxDelay | The rounded up maximum time between starting the transmission of a PSDU on the MAC sublayer and transmission of the last PPDU signal sample at the point of transmission. | get | [1, 65535] (1) | µs |
| phyRxDelay | The rounded up maximum time between taking the first sample of the PPDU preamble at the point of reception and the complete PSDU being available to the MAC sublayer. | get | [1, 65535] (1) | µs |
| phyMaxPsduSize | The maximum supported PSDU size. | get | 65535 | octets |

TABLE 34

Variable MAC PIB attributes
Variable attributes

| Name | ID | Description | get/set | Bits | Unit |
|---|---|---|---|---|---|
| macOwpanId | x | The ID of the OWPAN with which the device is associated. | get | 16 | integer [1, 65535] |
| macSecurityType | x | The security type used by the OWPAN. | get | 8 | IDs from Table 37 |
| macDevShortAddress | x | The short address assigned to the dev during association. | get | 16 | integer [1, 65535] |
| macBeaconNumber | x | The number of the current superframe, embedded by the coordinator in the beacon frame. | get | 16 | integer [1, 65535] |
| macNumSuperframeSlots | x | The total number of superframe slots in a superframe | get | 16 | superframe slots [1, 65535] |
| macCapCw | X | The current value of CW in the CAP transmit process. | get | | |
| macCapSlotLength | x | The number of superframe slots that form a single CAP slot for the slotted ALOHA access in the CAP. | get | 8 | superframe slots [1, 255] |
| macRetransmitTimeout | x | The duration after which an ACK is required for a transmitted frame. Upon expiration, a MPDU is typically retransmitted. | get | 16 | µs [1, 65535] |
| macEdScanThreshold | x | The threshold for energy detection during a passive scan. | get set | [?] | dBm optical power [ |
| macDeviceTimeout | | The duration after which a coordinator assumes a device to be disassociated if it does not receive frames from that device. | get set | | |

TABLE 35

Constant MAC PIB attributes
Constant attributes

| Name | Description | Value | Unit |
|---|---|---|---|
| aSuperframeSlotDuration | The duration of a single superframe slot. | 1 | µs |
| aInitialCw | The value to select for the back off window for the first retransmission in the CAP. | 1 | CAP slots |
| aMaximumCapCw | The maximum value for CW in the CAP. | | implementation-specific |
| aCapRespTimeout | The maximum duration, a response in the CAP may take after the request. | | implementation-specific |
| aClockAccuracy | The accuracy of the device system-clock. | 1 | ppm |
| aMinFragmentSize | The minimum size of a MSDU fragment. | 64 | octets |
| aProtectedWindow | The maximum number of unacknowledged MSDUs to be in-flight. | 1024 | MSDUs |
| aMaxAssocRetries | The maximum number of retries for the association through random channel access. | 10 | retransmissions |
| aMac48Address | The device's MAC-48 address. | any valid MAC-48 address | MAC-48 address |

7.4 Capabilities

Capabilities formally indicate functionality that are supported, i.e. implemented, by a device. Each capability has a name and a numeric ID with a width of 16 bits. Some capabilities may use other capabilities to be implemented through the device. Capabilities are listen in Table 36.

TABLE 36

| \multicolumn{4}{c}{MAC capabilities} | | | |
|---|---|---|---|
| Name | ID | Description | Required capabilities |
| capHbPhy | 1 | The device supports the usage of the HB-PHY. | capMultipleInputFeedback, capEffectiveChannelFeedback, capVariableElements |
| capMultipleInputFeedback | 2 | The device supports orthogonal pilot channel estimation and feedback. | |
| capEffectiveChannelFeedback | 3 | The device supports requesting a modulation and a coding scheme to be used for transmission towards it. | |
| capShortAddressing | 4 | The device supports the use of short addresses. | |
| capFullDuplex | 5 | The device supports simultaneous transmission and reception. | |
| capBlockAcknowledgment | 6 | The device supports the block acknowledgment method. | |
| capVariableElements | 7 | The device supports parsing and transmitting of MAC frames containing a variable number of elements. | |

8 Security

The MAC sublayer is responsible for providing security services on specified incoming and outgoing frames. This disclosure supports the following security services:

Data confidentiality
Data authenticity
Replay protection

This disclosure supports the usage of different security types. For this purpose, every distinct security type has an ID assigned in order to facilitate differentiation between the approaches in the MAC protocol. Table 37 lists the different security types and their corresponding ID as well as the clause in which they are described.

TABLE 37

| Security types | | |
|---|---|---|
| Security Type | ID | Clause |
| Open System | 0 | 8.2 |
| AES-256 PSK | 1 | 8.3 |
| AES-256 EAPOL | 2 | 8.4 |
| ... | ? | ? |

Except the Open Systems security, each security type is denoted by the applied encryption algorithm and authentication method. Each security type may make use of the existing protocol procedures. For example, during association, generic fields for the authentication handshake are included in the exchanged frames.

8.1 Generic Security Description

In the IEEE 802.15.13 standard, security mainly affects two processes:

1. The association with an OWPAN if the latter is secured.
2. The transmission and reception of MSDUs and management MPDUs

[Maximum MPDU Size Including Security!]

8.2 Open Systems
8.3 AES-256 PSK
8.4 AES-256 EAPOL

9 PHY Functional Description

This clause describes the generic PHY functionality, common to all PHYs included in the 802.15.13 standard.

9.1 Generic PHY Functions

9.1.1 Base rate

Each PHY defines a base rate, which is used to transmit specific frames such as the beacon or RA control frames.

9.1.2 Turnaround Time

If a PHY operates in time division half-duplex mode, it is expected to require a certain time to switch between transmit and receive mode.

10 PHY Services

10.1 PHY-SAP
10.2 PLME-SAP
10.3 PHY PIB Attributes

PHY PIB attributes determine the behavior of the MAC, analogously to what MAC PIB attributes do for the MAC. As the PLME-SAP is unspecified, the management of PHY PIB attributes are left to the implementer. However, in order to make attributes accessible from the DME where necessary, some PHY PIB attributes can be read or written via the MLME-GET and MLME-SET primitives. The r/w column indicates whether an attribute is readable or writable this way.

TABLE 38

PHY PIB attributes

| Name | Description | get/set | Value [Range] (Step) | Unit |
|---|---|---|---|---|
| phyTxDelay | The rounded up maximum time between starting the transmission of a PSDU on the MAC sublayer and transmission of the last PPDU signal sample at the point of transmission. | get | [1, 65535] (1) | µs |
| phyRxDelay | The rounded up maximum time between taking the first sample of the PPDU preamble at the point of reception and the complete PSDU being available to the MAC sublayer. | get | [1, 65535] (1) | µs |
| phyMaxPsduSize | The maximum supported PSDU size. | get | 65535 | octets |

11 PM-PHY
[see document 15-18-0003-07-0013]
  12 LB-PHY
[see document 15-18-0267-05-0013]
  13 HB-PHY
[see document 15-18-0273-02-0013]

Some Summarizations

The Aspect I may be understood as being based on a solution obtained by arranging the arrangement 15 as an [e.g., optical] communication arrangement (15) [e.g., with multiple optical frontends (14), such as LEDs][e.g., an arrangement including a network coordinator]; and/or wherein the [e.g., optical] communication arrangement (15) is configured to transmit information in allocated [e.g., "granted"] time slots [e.g., GTS], [and/or signal and/or decide resource allocations between the communication devices in a network]; and/or wherein the [e.g., optical] communication arrangement (15) is configured to send a configuration information (700, 710) which is included in one or more management frames; and/or
wherein the [e.g., optical] communication arrangement (15) is configured to send a configuration information which is included in one or more control frames; and/or wherein the communication arrangement (15) is configured to send a [e.g., semi-static] first time slot granting [e.g., GTS] information (710), which is included in the management frames [and which e.g., does not expire and/or which remains valid until it is overridden by a new time slot granting information]; and/or
wherein the communication arrangement (15) is configured to send a [e.g., dynamic] second time slot granting [e.g., GTS] information (700) included in the control frames, which comprises a limited time validity [e.g. only one superframe or a specified number of superframes, wherein the limited validity may optionally be defined in a validity field of the second time slot granting information]; and/or wherein the communication arrangement (15) is configured to allocate one or more time slots for communication in dependence on the first time slot granting information (710) and in dependence on the second time slot granting information (700).

Further, a method has been developed which is an [e.g., optical] communication method [e.g., with multiple optical frontends, such as LED][e.g., for transmitting and/or signalling scheduling information and/or other resource allocations between different optical devices] including

[e.g., in the [e.g., optical] communication arrangement (15), sending information in allocated [e.g., "granted"] time slots [e.g., GTS],]; and/or
from the [e.g., optical] communication arrangement (15), sending a configuration information which is included in one or more management frames; and/or
from the [e.g., optical] communication arrangement (15), sending a configuration information which is included in one or more control frames; and/or
from the [e.g., optical] communication arrangement (15) sending a [e.g., semi-static] first time slot granting [e.g., GTS] information, which is included in the management frames [and which e.g., does not expire and/or which remains valid until it is overridden by a new time slot granting information]; and/or
from the [e.g., optical] communication arrangement (15) sending a [e.g., dynamic] second time slot granting [e.g., GTS] information included in the control frames, which comprises a limited time validity [e.g. only one superframe or a specified number of superframes, wherein the limited validity may optionally be defined in a validity field of the second time slot granting information]; and/or
from the [e.g., optical] communication arrangement (15), allocating one or more time slots for communication in dependence on the first time slot granting information and in dependence on the second time slot granting information.

At least one of the communication devices above (16, 16', 16" A, B, C, D) may be defined as an [e.g., optical] communication device (16) [e.g., a receiver that is to receive transmissions from the communication arrangement (15) such as above and/or which may be receive signalling regarding the scheduling and/or other resources allocations], wherein the [e.g., optical] communication device is configured to receive information in allocated [e.g., "granted"] time slots [e.g., GTS]; and/or
wherein the [e.g., optical] communication device is configured to receive a configuration information which is included in one or more management frames; and/or
wherein the [e.g., optical] communication device is configured to receive a configuration information which is included in one or more control frames; and/or wherein the [e.g., optical] communication device is configured to receive a [e.g., semi-static] first time slot granting [e.g., GTS] information, which is included in the management frames [and which e.g., does not expire and/or which remains valid until it is overridden by a new time slot granting information]; and/or
wherein the [e.g., optical] communication device is configured to receive a [e.g., dynamic] second time slot granting [e.g., GTS] information included in the control frames, which comprises a limited time validity [e.g. only one superframe or a specified number of superframes, wherein the limited validity may optionally be defined in a validity field of the second time slot granting information]; and/or
wherein the [e.g., optical] communication device is configured to allocate one or more time slots for communication in dependence on the first time slot granting information and in dependence on the second time slot granting information.

A method has been developed according to a method which is an [e.g., optical] communication method [e.g., in a, e.g. optical, receiver that is configured to receive transmissions from a communication arrangement (15) such as that above and/or which may receive signalling regarding the scheduling and/or resources allocations]
[e.g., In a [e.g., optical] communication device, receiving information in allocated [e.g., "granted"] time slots [e.g., GTS],]

in the [e.g., optical] communication device, receiving a configuration information which is included in one or more management frames; and/or in the [e.g., optical] communication device, receiving a configuration information which is included in one or more control frames; and/or in the [e.g., optical] communication device, receiving a [e.g., semi-static] first time slot granting [e.g., GTS] information, which is included in the management frames [and which e.g., does not expire and/or which remains valid until it is overridden by a new time slot granting information] and/or in the [e.g., optical] communication device, receiving a [e.g., dynamic] second time slot granting [e.g., GTS] information included in the control frames, which comprises a limited time validity [e.g. only one superframe or a specified number of superframes, wherein the limited validity may optionally be defined in a validity field of the second time slot granting information]; and/or in the [e.g., optical] communication device, allocating one or more time slots for communication in dependence on the first time slot granting information and in dependence on the second time slot granting information.

OTHER EMBODIMENTS

Different inventive examples, embodiments and aspects are described.

Also, further examples will be defined by the enclosed claims.

It should be noted that any embodiments as defined by the claims can be supplemented by any of the details (features and functionalities) described in the following chapters.

Also, the embodiments described in the following chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features of a mobile communication device and of a receiver and of a mobile communication system. Thus, any of the features described herein can be used in the context of a mobile communication device and in the context of a mobile communication system (e.g. comprising a satellite). Therefore, disclosed techniques are suitable for all fixed satellite services (FSS) and mobile satellite services (MSS). Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as described below.

Depending on certain implementation requirements, examples may be implemented in hardware. The implementation may be performed using a digital storage medium, for example a floppy disk, a Digital Versatile Disc (DVD), a Blu-Ray Disc (registered trademark), a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium. Other examples comprise the computer program for performing one of the methods described herein, stored on a machine-readable carrier. In other words, an example of method is, therefore, a computer program having a program-instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Description of examples above may comprise at least one element of:

A communication arrangement (e.g., including a network coordinator) including:
    A central unit and/or
    Frontends (e.g., optical frontends, such as light emitters, e.g., LEDs or other light transceivers) and/or
    A communication means (e.g., fronthaul) between the central unit and the frontends, which may be a wired network (e.g., PTPT, ethernet, internet)

A communication device (e.g. a mobile device) which may be in a plurality of communication devices, which may transmit and receive signals to and from the frontends (e.g., optically)

The examples may refer to:

Resource allocations between the communication devices (granted or contention-based resource, for example);

Time synchronization between different frontends of the communication arrangement;

Channel state information as collected by the communication device(s) More in general, MAC strategies (e.g., for optical communications).

The invention claimed is:

1. A first communication apparatus for the communication with a second communication device, configured to:
acquire a channel state information from the reception of one or more reference signals and/or beacon signals from one or more frontends of the second apparatus;
transform the channel state information from a frequency domain to a time domain, to acquire a time domain channel state information;
encode the time domain channel state information; and
transmit the time domain channel state information to one or more frontends, wherein the first communication apparatus is configured to transmit channel information for association and updated channel information for network coordination in a contention access period and collision-free period, CFP, respectively.

2. The first communication apparatus of claim 1, configured to receive one or more reference signals and/or beacon signals from one or more frontends;
wherein the first communication apparatus is configured to determine a channel information on the basis of the reception of the one or more reference signals and/or beacon signals;
wherein the first communication apparatus is configured to transmit the channel information,
wherein the first communication apparatus is configured to update the channel information in a collision-free period, CFP.

3. The first communication apparatus of claim 1,
wherein the first communication apparatus is configured to transmit the channel information in a contention access period, CAP at the association with a second communication apparatus which has transmitted the one or more reference signals and/or beacon signals.

4. The first communication apparatus of claim 1, wherein the channel information is bound to measured signal to noise ratio, SNR.

5. The first communication apparatus of claim 1, configured to:
receive a plurality of reference signals from a plurality of frontends;
acquire the channel state information, CSI, based on an evaluation of the received reference signals,
encode the CSI, in order to provide an encoded CSI; and
provide information describing a selection of an encoding resolution used for encoding the CSI, out of a plurality of possible encoding resolutions.

6. The first communication apparatus of claim 1, configured to find a resolution on the basis of the acquired CSI values and to provide information describing the selection of an encoding resolution, wherein the information describing the selection on the encoding resolution defines at least one of:
a tap format;
a step size of tap strength;
a step size of delay;
the strength, or a value associated thereto, of the received reference signal; and
the delay or a value associated thereto, of the received reference signal; and
an indication of the reference signal.

7. The first communication apparatus of claim 1, wherein the first communication apparatus and the second communication apparatus are devices for performing fiber-optical or optical wireless communications.

8. A second communication apparatus, coordinated by a coordinator connected to frontends,
wherein the second communication apparatus is configured to send one or more reference signals and/or beacon signals from one or more frontends;
wherein the second communication apparatus is configured to receive the channel information,
wherein the second communication apparatus is configured to receive channel information for association and updated channel information for network coordination in a contention access period and collision-free period, CFP, respectively.

9. The second communication apparatus of claim 8, configured to:
perform an initial, coarse synchronization among a plurality of frontends;
command a transmission of a reference signal and/or a beacon signal to the plurality of the frontends;
acquire a channel information measured by a first communication apparatus; and
subsequently, perform a second, fine synchronization on the basis of the channel information, by synchronizing the frontends.

10. The second communication apparatus of claim 9, further configured to finely synchronize the frontends by anticipating the transmissions of the frontends suffering of higher delays, and/or by increasing the delays for the frontends suffering of lower delays,
wherein the second communication apparatus is further configured to synchronize the frontends by anticipating and/or delaying the transmissions from the frontends in proportion to their observed delays.

11. The second communication apparatus of claim 10, wherein the first, coarse synchronization is acquired by using an internet-based protocol or by synchronizing the clock of the central unit.

12. The second communication apparatus of claim 9, wherein the one or more reference signals and/or beacon signals comprise a pilot signal which is characteristic for the first communication apparatus and known by a second communication apparatus which has received the one or more reference signals and/or beacon signals and has transmitted the channel information.

13. The second communication apparatus of claim 9 configured to:
receive the encoded channel state information, CSI;
receive an information describing a selection of an encoding resolution used for encoding the CSI, out of a plurality of possible encoding resolutions;
decode the encoded CSI in dependence on the information describing a selection of an encoding resolution used for encoding the CSI.

14. The second communication device of claim 13, configured to schedule the communications on the basis of a reconstructed version of the CSI.

15. The second communication apparatus of claim 13, comprising a plurality of frontends and configured to cause them to transmit the reference signal.

16. The second communication apparatus of claim 13, configured to decode a strength and/or delay of multiple propagation paths from the CSI according to a tap format indicated in the information describing the selection of the encoding resolution.

17. The second communication apparatus of claim 8, wherein the frontends are configured to use the reference signal and/or a beacon signal based on different orthogonal sequences.

18. A method for the communication between a first communication apparatus and a second communication apparatus, the method comprising:
- from the second communication apparatus, sending one or more reference signals and/or beacon signals from one or more frontends;
- at the first communication apparatus, receiving the one or more reference signals and/or beacon signals from the one or more frontends;
- at the first communication apparatus, determining a channel information on the basis of the reception of the one or more reference signals and/or beacon signals;
- from the first communication apparatus, transmitting the channel information;
- at the second communication apparatus, receiving channel information for association and updated channel information for network coordination in a contention access period and collision-free period, CFP, respectively.

19. The method of claim 18, further comprising, at the second communication apparatus:
- performing an initial, coarse synchronization among a plurality of frontends;
- commanding a transmission of a reference signal and/or a beacon signal to the plurality of frontends;
- acquiring a channel information measured by a first communication apparatus on the basis of the reference signal and/or a beacon signal; and
- on the basis of the channel information, synchronizing the frontends.

* * * * *